United States Patent [19]
Fujiwara

[11] Patent Number: 5,897,110
[45] Date of Patent: Apr. 27, 1999

[54] DATA PROCESSING APPARATUS HAVING A MOVABLE HOPPER TABLE

[75] Inventor: Tatsuo Fujiwara, Kawasaki, Japan

[73] Assignee: Fujitsu Limited, Kawasaki, Japan

[21] Appl. No.: 08/692,132

[22] Filed: Aug. 5, 1996

[30]    Foreign Application Priority Data

Aug. 28, 1995 [JP] Japan ................................. 7-218671

[51] Int. Cl.⁶ ................................................ B65H 5/22
[52] U.S. Cl. ........................ 271/4.01; 271/4.1; 271/164; 271/207; 271/145; 271/258.01; 414/790.3; 395/111
[58] Field of Search ................................. 271/4.01, 4.08, 271/4.1, 3.14, 162, 164, 207, 213, 145, 258.01; 414/789.9, 790.3; 395/111

[56]           References Cited

U.S. PATENT DOCUMENTS

| 5,270,841 | 12/1993 | Watanabe | 358/496 |
| 5,413,409 | 5/1995 | Arai | 271/162 |
| 5,662,320 | 9/1997 | Fujiwara et al. | 271/4.1 |

FOREIGN PATENT DOCUMENTS

| 0 621 719 | 10/1964 | European Pat. Off. . | |
| 0 400 674 A2 | 12/1990 | European Pat. Off. . | |
| 0 438 348 A1 | 7/1991 | European Pat. Off. . | |
| 0 577 141 A1 | 1/1994 | European Pat. Off. . | |
| 0 621 719 A1 | 10/1994 | European Pat. Off. . | |
| 361243760 | 10/1986 | Japan | 271/4.1 |
| 403192045 | 8/1991 | Japan | 271/3.14 |
| 405270669 | 10/1993 | Japan | 271/164 |
| 2245886 | 1/1992 | United Kingdom | 271/162 |

Primary Examiner—H. Grant Skaggs
Attorney, Agent, or Firm—Armstrong, Westerman, Hattori, McLeland, & Naughton

[57]                ABSTRACT

A data processing apparatus including a drawable hopper table with a hopper and an image reading head. Sheets are conveyed from the hopper to a stacker arranged below the hopper table, and the stacker includes a pusher for discharging sheets. The hopper table and the pusher are moved by a common motor and a gear mechanism. The gear mechanism includes a partially toothed gear, so as to drive one of the hopper table and the pusher. A cam mechanism is incorporated with the gear mechanism to prohibit the movement of the not driven one. Also, a top cover is pivotally attached to the hopper table about a pivot arranged on one side of the top cover remote from the hopper, the image reading head is pivotally attached to the top cover about a fulcrum arranged on one side of the top cover near the hopper.

61 Claims, 51 Drawing Sheets

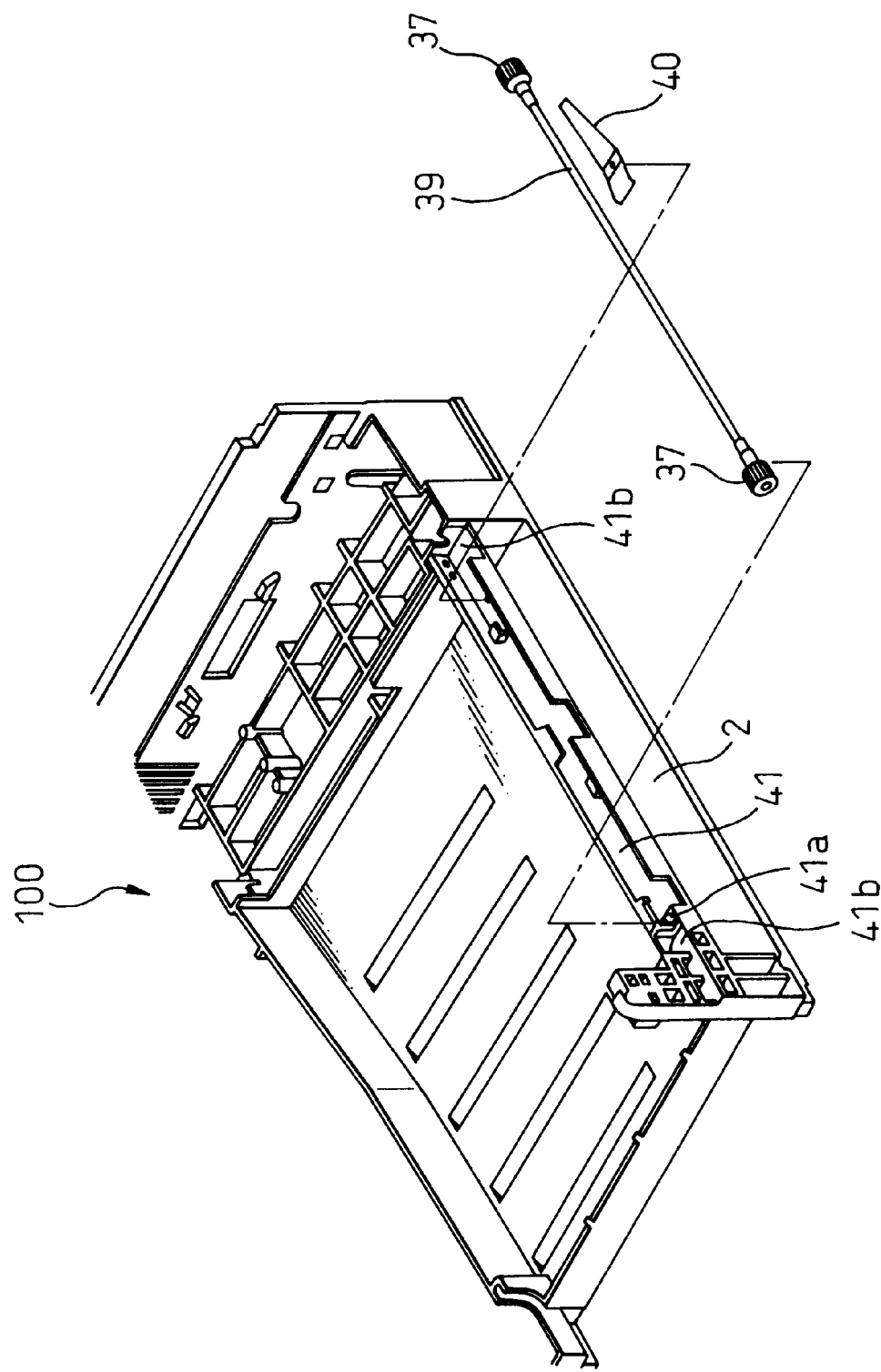

DATA PROCESSING APPARATUS HAVING A MOVABLE HOPPER TABLE

BACKGROUND OF THE INVENTION

1. Field of the Invention

The present invention relates to a data processing apparatus such as an image reading apparatus or an image forming apparatus or the like devices.

2. Prior Art

Conventional image reading apparatuses can be roughly classified into an ADF (automatic document feeder) type, a flat bed type, and a composite type. FIG. 57 in the attached drawings illustrates an image reading apparatus of the ADF type. As shown, the image reading apparatus of this type comprises a hopper 74 onto which documents or sheets to be read are set, a reading head 73 for reading information on the document, and a stacker 75 onto which the documents are discharged after they are read. A plurality of documents can be set onto the hopper 74 and are automatically and successively conveyed through the image reading apparatus by conveying rollers 76. The reading head 73 such as an image sensor, and information recorded on the document can be read by the reading head 73. The documents are discharged onto the stacker 75. As described above, the image reading apparatus of the ADF type can operate automatically and continuously, and the efficiency of the operation is higher than that of the other type of image reading apparatuses. Therefore, the image reading apparatus of the ADF type is suited for the applications where large amounts of documents must be read at high speed.

An image reading apparatus of the flat bed type is shown in FIG. 58 in the attached drawings. The image reading apparatus of this type is provided on its upper surface with a flat bed unit having a reading window 72, and a reading head 73 is arranged within the reading window 72. A cover 76 is attached to the flat bed. To read the documents using the image reading apparatus of the flat bed type, the documents are set onto the reading window 72. When the reading operation is started, the reading head 73 moves to scan the document, whereby information on the document is read. To read another document following thereto, the document that has been read is removed from the reading window 72, and a new document is placed on it.

The image reading apparatus of the flat bed type requires replacement of the document after every reading operation, and is not suited for reading the documents at high speed and, hence, does not have a high reading efficiency. However, it has a simple structure and a low cost because it does not have a document feeding mechanism, so the image reading apparatus of the flat bed type has been widely used for the applications where large amounts of documents need not be read at one time. The documents such as books cannot be set to the hopper and cannot be read by the image reading apparatus of the ADF type, but they can be read by the image reading apparatus of the flat bed type.

There is proposed an image reading apparatus of a combination of the ADF type and the flat bed type, by which it is possible to select the reading operation depending upon the kind of documents to be read.

In addition, the data processing apparatus in the form of a printer comprises a hopper for setting the printing papers and a stacker onto which the papers will be discharged after printing. Some printers have a plurality of hoppers onto which papers of different sizes can be set to cope with a plurality kinds of the printing papers.

The conventional equipment, however, has problems as described below. In the image reading apparatus of the ADF type or in the printer equipped with the hopper and the stacker as shown in FIG. 57, the hopper and the stacker project from its casing to the exterior thereof. Therefore, much space must be maintained for holding them, so that the hopper and the stacker do not interfere with other apparatuses.

Recently, it has been urged to efficiently utilize the space in offices, and available space for setting office equipments such as personal computers, keyboards, image reading apparatuses and/or printers are decreasing. To meet this demand, equipments are becoming smaller in size, but there are limitations. In particular, the hoppers and stackers of the image reading apparatuses and printers have their sizes determined depending upon the sizes of the documents (printing papers), and cannot be made small.

EP-A1-0621719, filed by the same assignee as for the present case, discloses a data processing apparatus having a box-shaped casing having parallel and horizontal cavities and a hopper table arranged in the upper cavity. The hopper table has a hopper onto which a plurality of sheets can be set and a reading head, and the lower cavity of the casing serves as a stacker. Sheet conveying rollers are arranged for conveying the documents from the hopper through the reading head to the stacker. A plurality of documents can be handled at a time, and yet, the hopper and the stacker do not project from the casing. Therefore, this apparatus can solve the above described problems.

SUMMARY OF THE INVENTION

The object of the present invention is to provide an improved data processing apparatus of the type having a drawable hopper plate.

The object of the present invention is to provide a data processing apparatus having a discharge member in a stacker thereof intended so that documents can be easily discharged from the stacker.

Another object of the present invention is to provide a data processing apparatus having a drawable hopper plate and a movable discharge member in the stacker which can be moved by a common actuator.

A further object of the present invention is to provide a data processing apparatus having a top cover pivotally attached to a hopper plate so that a reading head and conveying rollers can be easily revealed when a jam occurs.

A further object of the present invention is to provide a data processing apparatus having guide rails and guide members to stably guide the hopper table.

According to the present invention, there is provided a data processing apparatus comprising, a casing having a first cavity and a second cavity arranged in a vertically spaced relationship, and a hopper table drawably arranged in the first cavity, the hopper table having a hopper for accommodating sheets stacked thereon and data processing means. The second cavity is a stacker and has a discharge member therein for discharging the sheet from the stacker. The apparatus further comprises sheet conveying means for conveying sheets from the hopper through the data processing means to the stacker along a predetermined conveying path, an actuator for moving the hopper table and the discharge member, and movement transferring means for transferring the actuating force of the actuator to the hopper table and the discharge member.

According to this arrangement, the hopper table and the stacker discharge member are moved by the common actuator. Therefore, it is possible to decrease the number of parts such as motors and the like.

Preferably, the movement transferring means comprises means for changing the transfer of the actuating force of the actuator to the hopper table and to the discharge member.

In this case, preferably, the actuator comprises a motor, and the movement transferring means comprises a partially toothed gear having an outer circumference and teeth only on a portion of the outer circumference, a first gear for engagement with the partially toothed gear for moving the hopper table, and a second gear arranged at a different position from the first gear for engagement with the partially toothed gear for moving the discharge member, the partially toothed gear and the first and second gears being constructed so that when one of the first and second gears is engaged with the teeth of the partially toothed gear, the other of the first and second gears is not engaged with the teeth of the partially toothed gear.

In this case, preferably, the partially toothed gear and the first and second gears are constructed so that the teeth of the partially toothed gear have a first position in which the teeth of the partially toothed gear are not engaged with the first and second gears, a second position in which the teeth of the partially toothed gear are engaged only with the first gear, and a third position in which the teeth of the partially toothed gear are engaged only with the second gear.

In this case, preferably, the movement transferring means includes a first sensor for detecting whether the partially toothed gear is at the first position or not, or the movement transferring means includes a first sensor for detecting whether the partially toothed gear is at the first position or not, and a second sensor for detecting whether the partially toothed gear is at a position corresponding to a front end of one of the hopper table and the discharge member or not.

Preferably, the hopper table has a rack for engagement directly or indirectly with the first gear for moving the hopper table, and the discharge member has a rack for engagement directly or indirectly with the second gear for moving the discharge member.

In this case, preferably, the forward and reverse movement of the hopper table and the forward and reverse movement of the discharge member are changed by changing the moving direction of the actuator.

Preferably, the rack of the hopper table is operatively connected to the partially toothed gear via at least one first intermediate gear including the first gear, and the rack of the discharge member is operatively connected to the partially toothed gear via at least one second intermediate gear including the second gear, the number of the first intermediate gear being different from that of the second intermediate gear.

Preferably, the stacker has a bottom having at least one groove, and the discharge member has a bottom having at least one protrusion in correspondence with the at least one groove.

Preferably, the data processing means comprises one of a reading head for reading information on the sheet and a printing head for printing data onto the sheet.

In addition, the partially toothed gear has a first cam, the first and second gears have respective second and third cams engagable with the first cam of the partially toothed gear depending upon the position of the partially toothed gear, the second cam of the first gear being engagable with the first cam of the partially toothed gear to prohibit the rotation of the first gear when the teeth of the partially toothed gear are not engaged with the first gear, the third cam of the second gear being engagable with the first cam of the partially toothed gear to prohibit the rotation of the second gear when the teeth of the partially toothed gear are not engaged with the second gear.

In addition, the apparatus further comprises a pressure sensor provided on the hopper table for detecting whether an abnormal pressure is exerted on the hopper table or not, the actuator being stopped or driven in reverse when the pressure sensor detects an abnormal pressure. Or, the apparatus further comprises detecting means for detecting a current flowing through the actuator, the actuator being stopped or driven in reverse when the detecting means detects a current higher than a predetermined value.

In addition, the hopper table includes guide rails attached to the sides thereof, one of the guide rails being pivotally attached to the hopper table by a pivot. In this case, preferably, a stopper is provided for restricting the amount of the pivotal movement of the guide rail.

In addition, the hopper table has a pair of parallel racks parallel to the rack driven by the partially toothed gear, a freely rotatable pinion shaft being provided in the casing and having pinions engaged with the parallel racks. The apparatus further comprises means for urging the pinion shaft to bias the pinions toward the parallel racks.

Preferably, each of the racks is formed as a double-row rack comprising a first row of teeth and a second row of teeth, and each of the pinions is formed as a double-toothed pinion having two threads of teeth corresponding to the first and second rows of the teeth.

Preferably, the rack driven by the partially toothed gear comprises a first portion having a first width and a second portion heaving a second width. Preferably, the first portion remains in the casing when the hopper table is in the open position, the first width being greater than the second height.

Preferably, the hopper table has a top cover for covering at least the data processing means. In this case, the top cover is pivotally attached to the hopper table and carries the data processing means.

Preferably, the top cover has an upper surface with a tapered portion to facilitate the insertion of the hopper table into the first cavity when the hopper table is closed. Preferably, the casing has urging means in the first cavity for biasing the top cover downward. In this case, a portion of the upper surface of the top cover contacting the urging means is higher than the other portion of the upper surface of the top cover. Also, the portion of the upper surface of the top cover contacting the urging means is on the front side of the top cover, and the other portion of the upper surface of the top cover that is lower than the portion is on the inner side of the top cover.

In addition, the casing has an access opening at the side wall thereof and a manually operable member arranged in the access opening, the manually operable member being engaged with one of the gears in the movement transferring means, whereby the hopper table can be moved front and rear by operating the manually operable member. The manually operable member comprises a gear.

Preferably, the hopper table includes guide rails attached to the sides thereof, and the casing includes guide members to guide the guide rails with the hopper table in the casing, at least one of the guide members being removably attached to the casing. Preferably, the at least one of the guide members can be attached to the casing after the hopper table is arranged in the casing. The hopper table has a rack for engagement with a gear belonging to the movement transferring means, the at least one of the guide members being attached to the casing after the hopper table is arranged in the casing and the rack is positioned relative to the gear belonging to the movement transferring means.

In addition, the hopper table has a top cover for covering at least the data processing means, the top cover being pivotally attached to the hopper table about a pivot arranged on one side of the top cover remote from the hopper, the data processing means being pivotally attached to the top cover about a fulcrum arranged on one side of the top cover near the hopper. The data processing means is biased by an urging means toward a sheet to be processed.

Preferably, the top cover has a fulcrum having a triangular cross section and the data processing means has a pair of ribs arranged to pinch the fulcrum. The data processing means has a sheet detecting sensor for detecting the passage of a sheet therethrough.

In addition, the casing has an upper surface and a side cover pivotally attached to the casing about a pivot arranged at a lower portion of the casing, the side cover having an upper edge arranged so that the upper edge is lower than the upper surface of the casing.

BRIEF DESCRIPTION OF THE DRAWINGS

The other objects and features of the present invention will become more apparent from the following description of the preferred embodiments, with reference to the accompanying drawings, in which:

FIG. 32 is a perspective view of the apparatus having the pinion shaft and the leaf spring of FIG. 31;

DESCRIPTION OF THE PREFERRED EMBODIMENTS

Figure 1A:
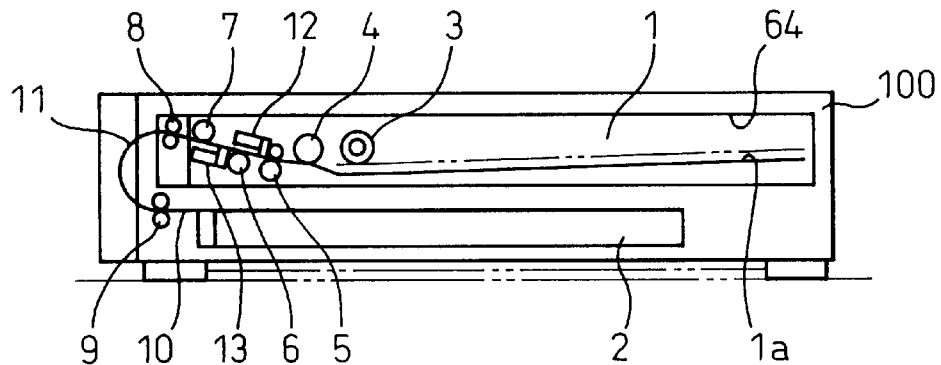
FIG. 1A is a diagrammatic cross-sectional view of the image reading apparatus according to the embodiment of the present invention.
Figure 1B:
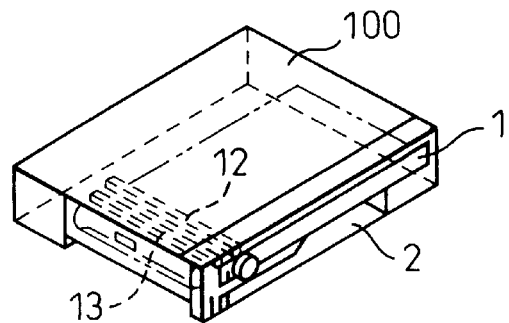
FIG. 1B is a perspective view of the apparatus of FIG. 1.
Figure 1C:
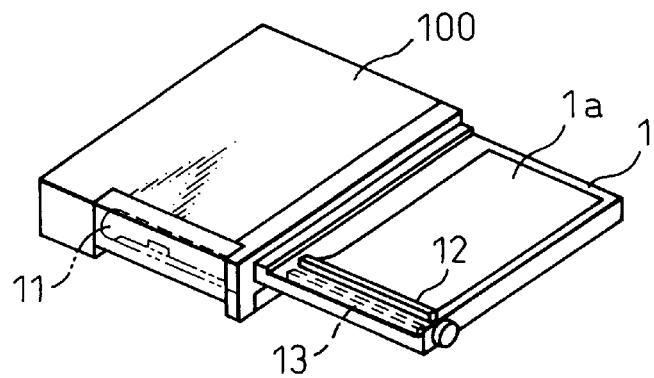
FIG. 1C is a perspective view of the apparatus of FIG. 2 when the hopper table is drawn out.

FIGS. 1A to 1C show an image reading apparatus as an embodiment of a data processing apparatus according to the present invention.

The image reading apparatus has a rigid box-shaped casing 100 which has two wide cavities 64 and 2 in the front of the casing 100 in a vertically spaced relationship. The apparatus includes a front loading type hopper table 1 drawably inserted in the upper cavity 64. The hopper table 1 provides a hopper 1a on which documents or originals to be processed can be set. The hopper table 1 can be pushed into the closed position in the casing 100, as shown in FIG 1B, and can be pulled forward, as shown in FIG. 1C. When the documents are being read or when the apparatus is not used, the hopper table 1 is brought into the closed position. When the documents are set on the hopper 1a, the hopper table 1 is brought into the open position.

The lower cavity 2 comprises a stacker into which the documents are successively conveyed and stacked, after they have been read. Hereinafter, the lower cavity 2 is called a stacker. Since the stacker 2 is provided in the lower portion of the apparatus and the stacker 2 is not pulled out, it is possible to place and use any less tall device such as a keyboard or the like in front of the casing 100. It is of course possible to construct the stacker drawably, in a manner similar to the hopper table 1.

Figure 2:
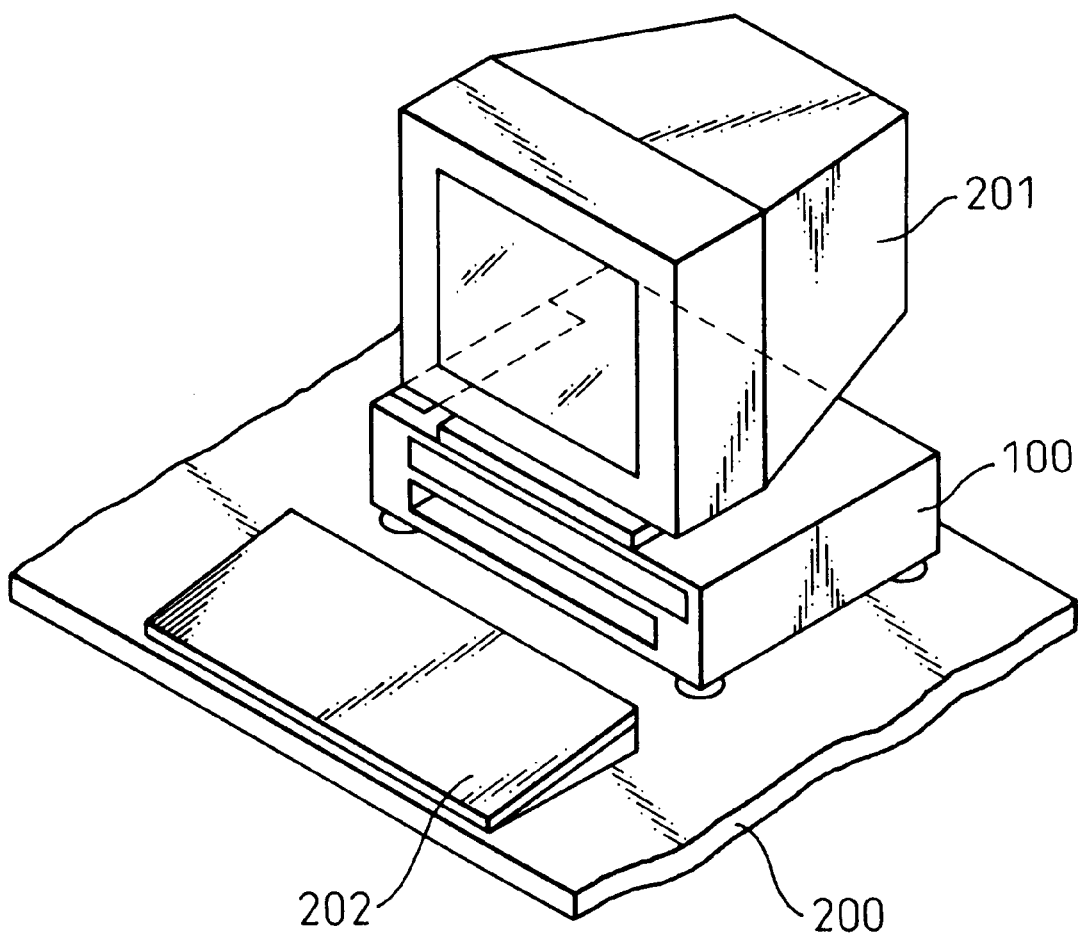
FIG. 2 is a perspective view of the apparatus of FIGS. 1A to 1C and a personal computer placed on the apparatus.

FIG. 2 shows an example of the use of the image reading apparatus of FIGS. 1A to 1C. In FIG. 2, the image reading apparatus casing 100 is placed on a desk 200 and a personal computer or the like 201 is put on the the image reading apparatus casing 100 so that space around the image reading apparatus can be effectively utilized. A keyboard 202 is also placed on the desk 200 in front of the the image reading apparatus casing 100. The image reading apparatus casing 100 does not have upwardly or laterally projecting members, which may be provided in the ADF type image reading apparatus. Therefore, the image reading apparatus of the present invention permits much space around it to be effectively used.

The image reading apparatus includes a document conveying means such as a pick roller 3 for feeding the documents set on the hopper 1a along a predetermined conveying path one by one. A separator roller 4 and a separator pad (not shown) under the separator roller 4 are arranged to prevent a plurality of documents from being fed at a time. If a plurality of documents are simultaneously fed along the conveying path, the documents may be jammed or the overlapped portions of documents may not be read. Therefore, when a plurality of the documents are picked up by the pick roller 3, the documents are separated by the separator roller 4 and the separator pad and fed along the conveying path one by one. Frictional force exists among the documents, but the separator roller 4 and the separator pad function to separate the documents based on a difference in the frictional force between the separator roller 4 and the paper, between the paper and the separator pad, and between the papers.

The image reading apparatus also includes further conveying rollers 5 to 9. In this embodiment, the conveyer rollers 5 to 8 are mounted to the hopper table 1. Reference numeral 10 denotes a conveying path along which the documents are conveyed, and reference numeral 11 denotes a portion of the conveying path 10 formed in the U-turn shape. The conveying path 10 is inverted at this portion 11. Therefore, the documents can be conveyed from the hopper 1a along the conveying path 10 to the stacker 2. The documents are stacked in the stacker 2 one upon another in the identical order to that on the hopper 1a. Therefore, there is no need to rearrange the order of the documents after they have been read.

Reference numerals 12 and 13 denote reading heads arranged along the conveying path 10 for reading the documents. The reading head 12 can read information on the front surface of the document, and the other reading head 13 can read information on the back surface of the document.

Figure 3A:
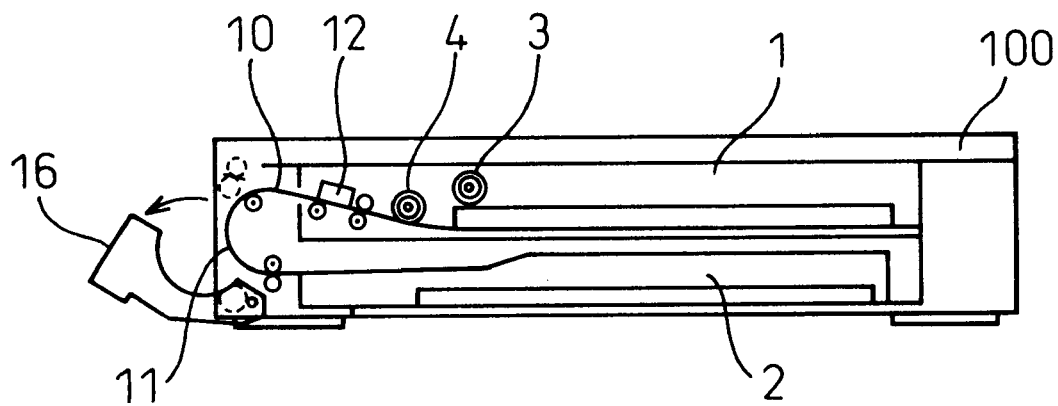
FIG. 3A is a diagrammatic view of a modified example of the image reading apparatus of FIG. 1A.
Figure 3B:
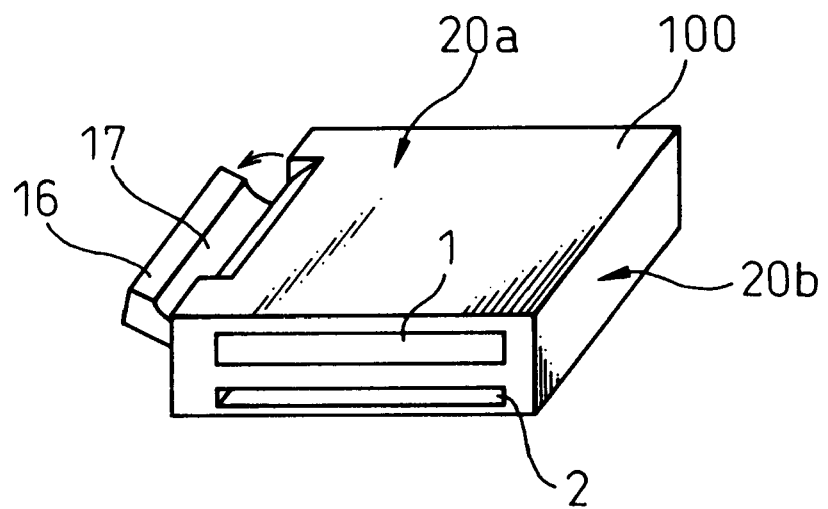
FIG. 3B is a perspective view of the apparatus of FIG. 2 when the side cover is opened.

FIGS. 3A and 3B show a modification of the image reading apparatus, in which only one reading head 12 is arranged. Accordingly, two reading heads 12 and 13 can be used when it is desired to read information on both surfaces of one document at a time, but it is sufficient to equip only one reading head 12 when it is desired to read information only on one surface of the document.

The image processing apparatus of the present invention can be realized as the image reading apparatus, as shown. However, the image processing apparatus of the present invention can be also realized as a printer. In this case, it is possible to arrange a printing head or printing heads in place of the reading head 12 or the reading heads 12 and 13, with the other elements for conveying the documents identically arranged to those of the image reading apparatus. The printing head(s) may be any one of known types such as an ink-jet head, a thermal head or an impact head, which can be selected depending upon the size of the apparatus and the printing function. Therefore, the description is made only to the image reading apparatus having a single reading head 12 in order to avoid repetitive explanation, but it will be appreciated that the description is also applicable to the printer or other like devices.

The pick roller 3, the separator roller 4, some of the conveying rollers 5 to 8 and the reading head 12 are carried by the hopper table 1, and an actuating mechanism (for example, shown by the arrow 20a in FIG. 1C) including a motor for driving the rollers is also carried by the hopper table 1. Therefore, the reading head 12 is operable and the rollers provided in the hopper table 1 can be driven even when the hopper table 1 is in the open position. Accordingly, the documents set on the hopper 1a can be read even when the hopper table 1 is in the open position.

For example, when the document to be read is too large and the hopper table 1 having the document set therein cannot be inserted into the cavity 64 of the casing 100, it is preferable to read the document with the hopper table 1 in the open position. Also, when the document is too hard or thick and may be broken if it is passed through the U-turn portion 11 of the conveying path 10, it is preferable to read the document with the hopper table 1 in the open position. The casing 100 includes a pivotable side cover 16 which can be opened, as shown in FIG. 1C. The side cover 16 includes a curved inner surface 17 which forms the U-turn portion 11. Therefore, when the side cover 16 is in the open position, the document can be conveyed straight through the conveying path from the hopper to the discharge cavity formed after the side cover 16 is opened.

The side cover 16 can be also used to deal with the jammed documents in the conveying path 10, since it provides for an access to the conveying path 10. It is possible to take out the jammed documents, by opening the side cover 16. The image reading apparatus according to the embodiment is formed in a box-like shape and it is difficult to remove the documents if they are jammed in the apparatus. The documents may be damaged if the hopper table 1 is opened when the documents are jammed between the hopper table 1 and the casing 100, and it may become no longer possible to read the documents if the documents are badly damaged. The side cover 16 can solve the problem of the jammed documents.

The remaining roller 9 is arranged in the casing 100 and can be driven with the rollers 5 to 8 carried by the hopper table 1 when the hopper table 1 is brought into the closed position, whereby the driving force of the motor mounted to the hopper table 1 is transmitted to the roller 9 in the casing 100. A knob (not shown) is provided on the front side of the hopper table, the knob being connected to one of the conveying rollers so that the conveying rollers can be rotated by turning the knob to remove the document when the document is jammed in the apparatus.

FIGS. 4A to 4G are perspective views of the image reading apparatus, illustrating the typical operation thereof.

Figure 4A:
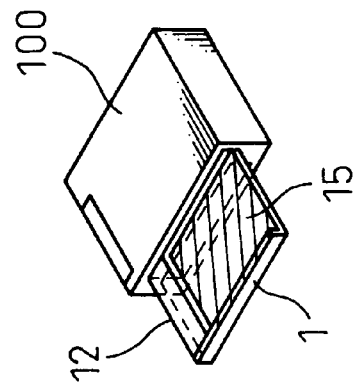
FIGS. 4A to 4G are views illustrating the typical operation of the image reading apparatus of FIGS. 1A to 3B.
Figure 4B:
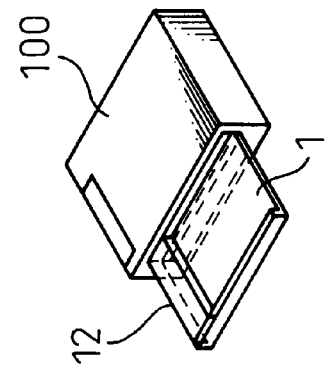
Figure 4C:
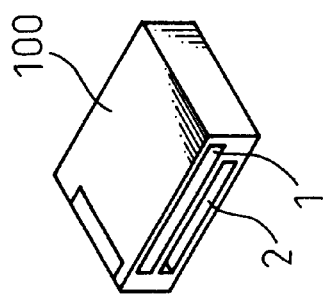
Figure 4D:
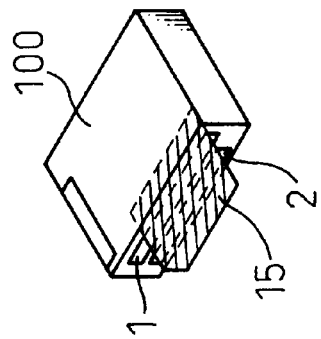
Figure 4E:
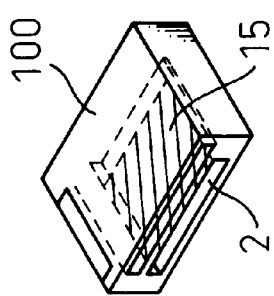
Figure 4F:
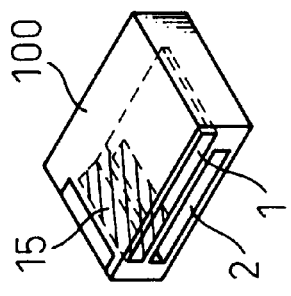
Figure 4G:
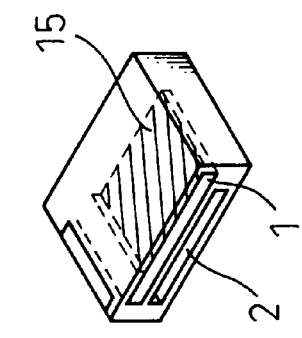

In FIG. 4A, the hopper table 1 is closed. The hopper table 1 is usually inserted in the apparatus, and the hopper table 1 should be opened to set the documents onto the hopper 1a. In FIG. 4B, the hopper table 1 is opened, and the reading head 12 and the hopper 1a are revealed. The documents 15 to be read are set on the hopper 1a in FIG. 4C, and the hopper table 1 is closed and the apparatus is ready to read the documents in FIG. 4D. The image reading apparatus can read the documents, while the document 15 are conveyed along the conveying path 10 through the reading head 12 one by one, as shown in FIG. 4E. The documents 15 are conveyed into the stacker 2, as shown in FIG. 4F, and the documents 15 can then be taken out from the stacker 2, as shown in FIG. 4G.

FIGS. 5A to 5F are plan views of the stacker 2. The stacker 2 has a discharge member in the form of a pusher member 18 which is driven by a motor and can push the documents to conveniently discharge the documents from the stacker 2. If the pusher member 18 is not arranged in the stacker 2, the user must discharge the documents from the stacker 2 by hand, but it is sometimes difficult to insert the finger in the stacker 2, since the depth of the stacker 2 is small to realize the compact image reading apparatus although the size of the stacker 2 is large enough to accommodate a document of B4-size, for example. Therefore, it is difficult to deeply insert the finger into the stacker 2 to take out the documents, especially the small documents. If the finger is big, it is also difficult to insert the finger into the stacker 2.

Figure 5A:
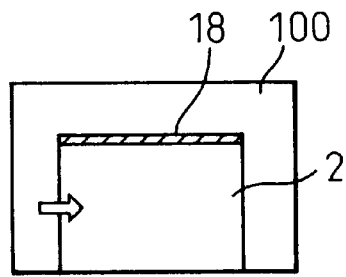
FIGS. 5A to 5F are views illustrating the typical operation of the pusher member arranged in the stacker of the apparatus.
Figure 5B:
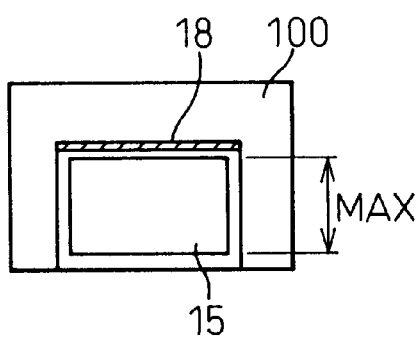
Figure 5C:
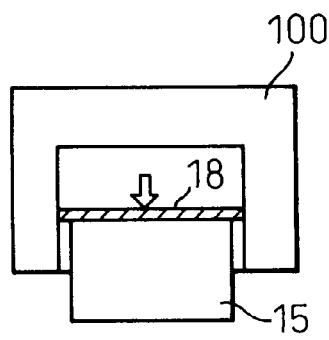
Figure 5D:
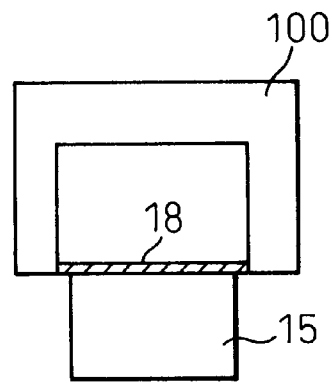
Figure 5E:
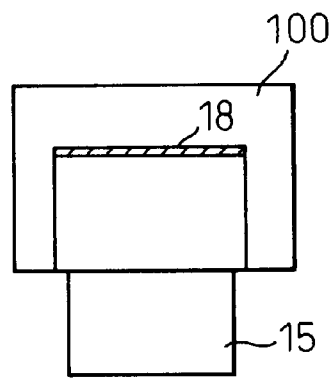
Figure 5F:
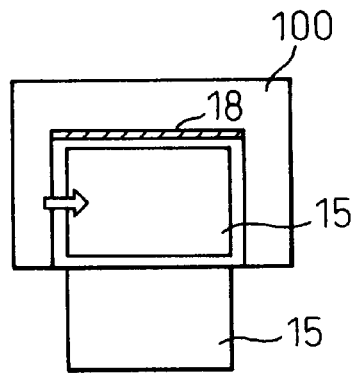

FIG. 5A illustrates a state where no documents are in the stacker 2. The documents are then conveyed in the stacker 2 in the direction indicated by the arrow in FIG. 5A, and the documents 15 are stacked in the stacker 2, as shown in FIG. 5B. The maximum size of the documents to be stacked may be of B4-size. The pusher member 18 is then moved toward the front of the image reading apparatus, as shown in FIG. 5C (in the direction of the arrow) to push the rear end of the documents 15. The documents are then gradually discharged from the stacker 2 and finally discharged from the stacker 2, as shown in FIG. 5D. After the document is discharged, the pusher member 18 is retracted, as shown in FIG. 5E, and then the pusher member 18 is ready to push a subsequent set of documents, as shown in FIG. 5F.

The pusher member 18 may be advanced and retracted in response to the user's instruction, or may be automatically controlled by detecting arrival of the documents in the stacker 2.

Figure 6:
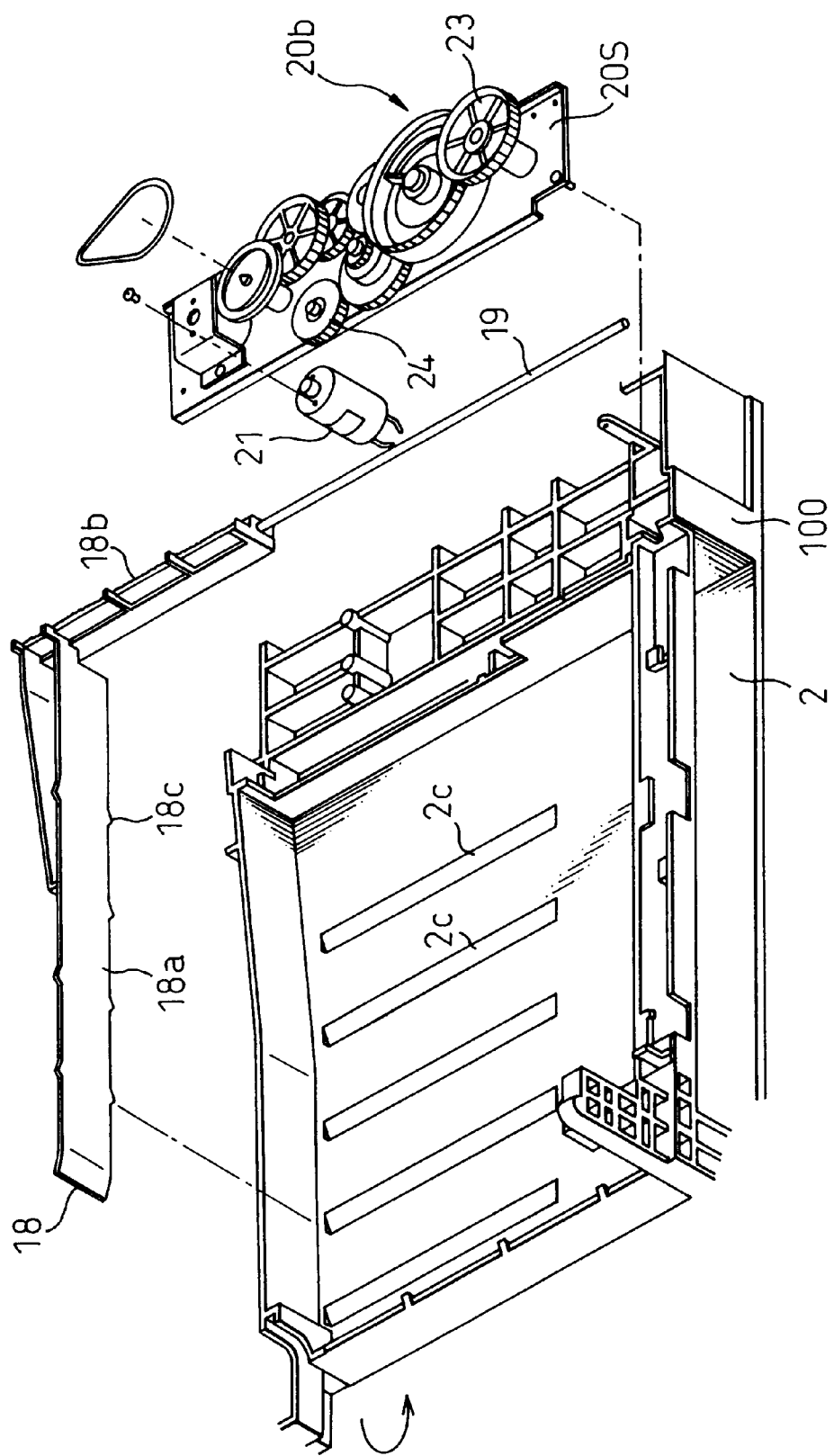
FIG. 6 is a perspective view of the housing of the apparatus, illustrating the stacker, the pusher member and the actuating mechanism.

FIG. 6 illustrates the pusher member 18 in greater detail. The pusher member 18 is formed by an L-shaped plate, which comprises a pusher plate 18a for pushing the document and a rack 18b. The pusher member 18 is slidably supported and guided by a shaft 19 attached to the casing 100 for front and rear movement. A loading mechanism 20b can drive the hopper table 1 and the pusher member 18. The loading mechanism 20b comprises a motor 21 and a plurality of gears including two output gears 23 and 24. The rack 18b is engaged with the gear 24, so that the driving force of the motor 21 is transmitted to the rack 18b of the pusher member 18 to move the pusher member 18 front and rear.

The pusher plate 18a has at the bottom thereof triangular protrusions 18c which can engage in grooves 2c arranged in the bottom of the stacker 2 at corresponding positions to the protrusions 18c. If the bottom of the pusher plate 18a is flat, it is likely that the document may be clogged in the gap between bottom of the pusher plate 18a and the surface of the stacker 2 and the document may not be reliably discharged from the stacker 2 when the pusher member 18 advances If the documents are thick they may not clog so often, but if the documents are thin it is likely that they may be caught in the gap. If the documents are caught in the gap, the document may be damaged or the documents may not be discharged from the stacker 2. According to this embodiment, the protrusions 18c and grooves 2c serve to eliminate any gap and to prevent the documents from being clogged in the stacker 2.

Figure 7:
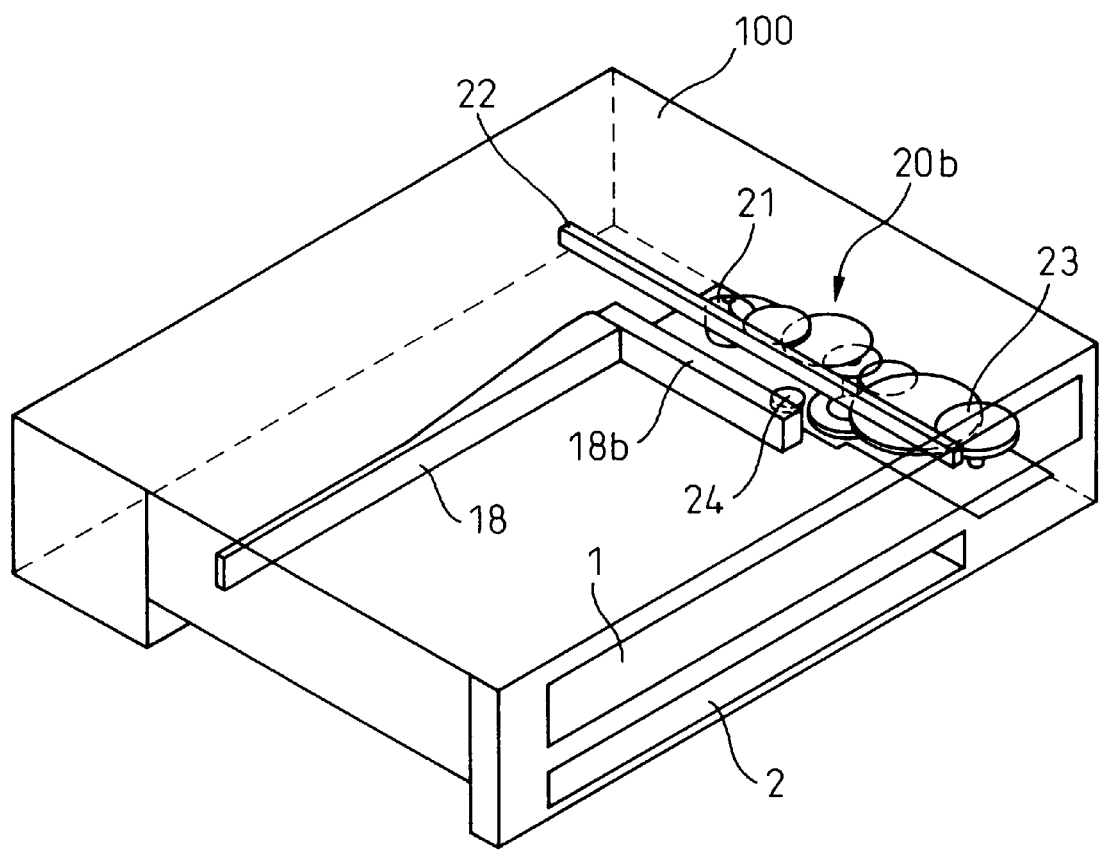
FIG. 7 is a diagrammatic perspective view of the apparatus, illustrating the rack of the hopper table, the pusher member having its rack, and the actuating mechanism.

The loading mechanism 20b includes gears to transfer the driving force of the motor 21 to the hopper table 1 and the pusher member 18, as shown in FIGS. 7 to 19. FIG. 7 diagrammatically illustrates the hopper table 1 in the closed position and the pusher member 18 in the retracted position, although the hopper table 1 is not fully shown in FIG. 7 but a rack 22 thereof is shown. The rack 22 is arranged on the bottom surface of the hopper table 1 and is engaged with the gear 23 in the loading mechanism 20b, as shown in FIG. 10. (The rack 22 is shown at a position on the left side of the hopper table 1 in FIG. 10 to clearly show the rack 22 and the gear 23, but the rack 22 is positioned on the right side of the hopper table 1 in the other figures.)

Figure 8:
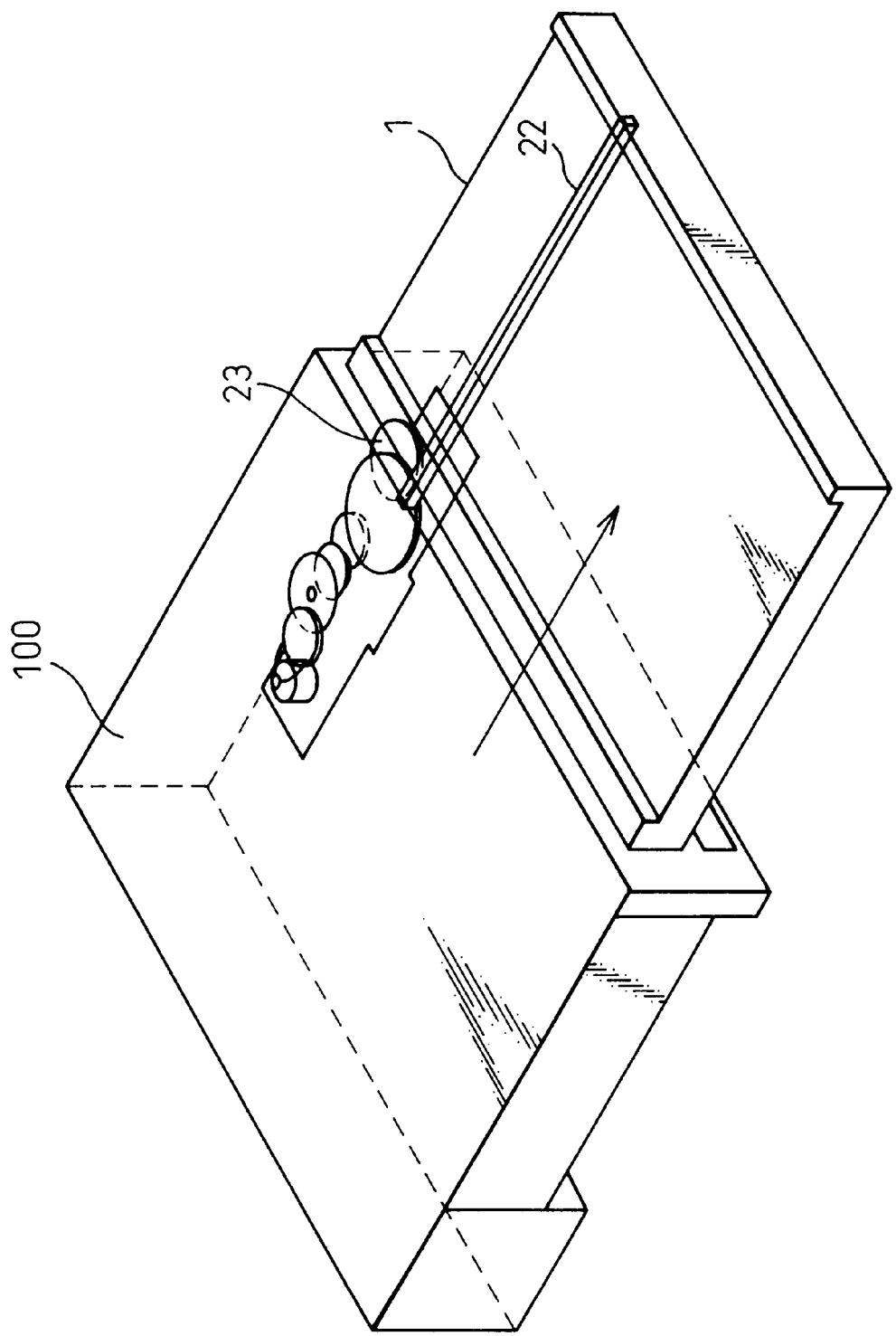
FIG. 8 is a perspective view of the apparatus with the hopper table in the open position.

FIG. 8 shows the hopper table 1 in the open position. The hopper table 1 is opened in the direction of the arrow by transferring the rotation of the gear 23 to the rack 22. The hopper table 1 can be closed by the rotation of the gear 23 in reverse. The pusher member 18 is maintained in the retracted position.

Figure 9:
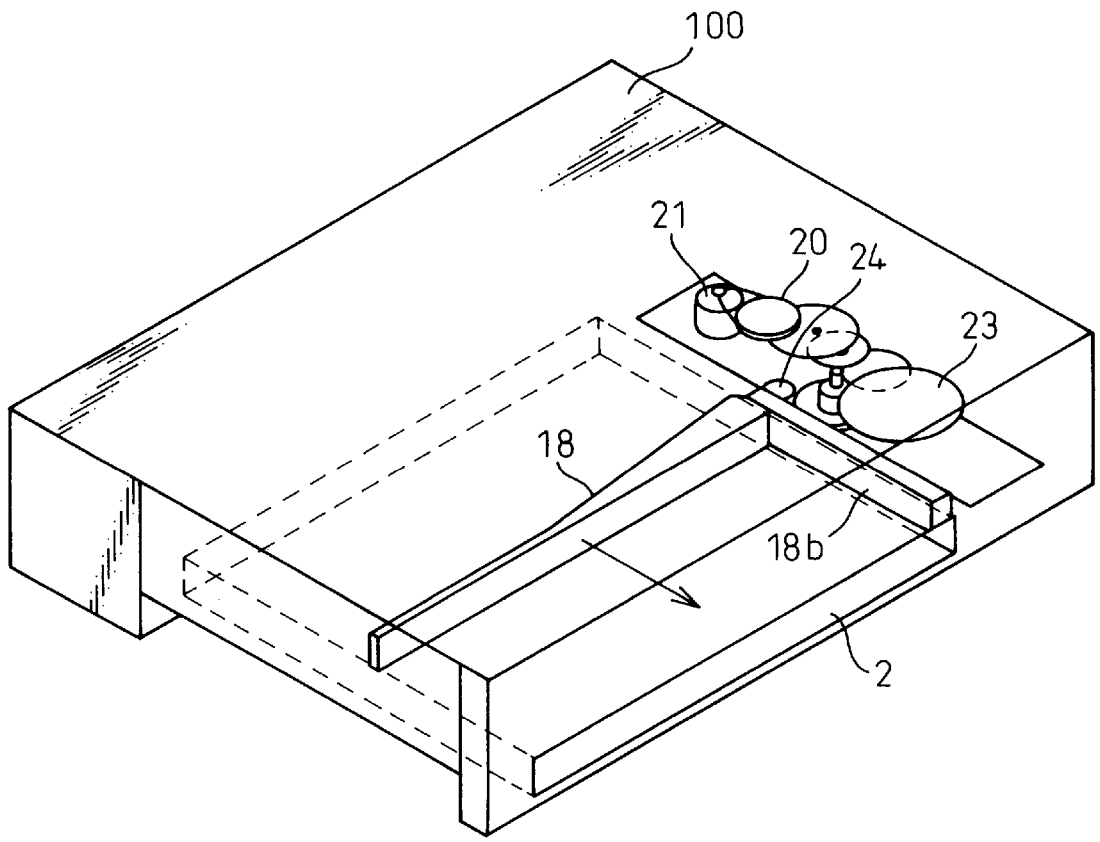
FIG. 9 is a perspective view of the apparatus with the pusher member in the advanced position.
Figure 10:
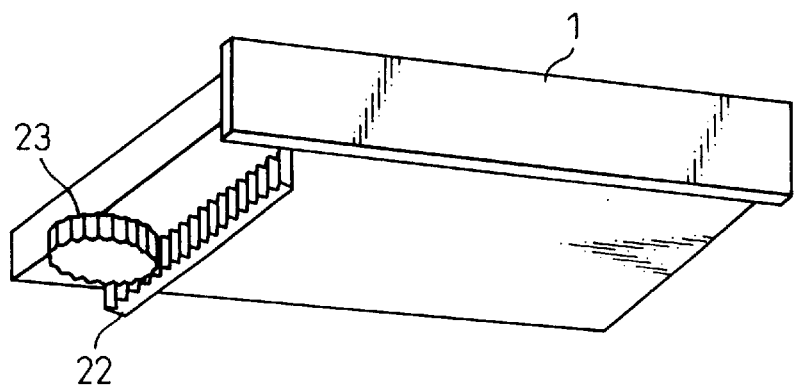
FIG. 10 is a perspective bottom view of the hopper table having the rack.
Figure 11:
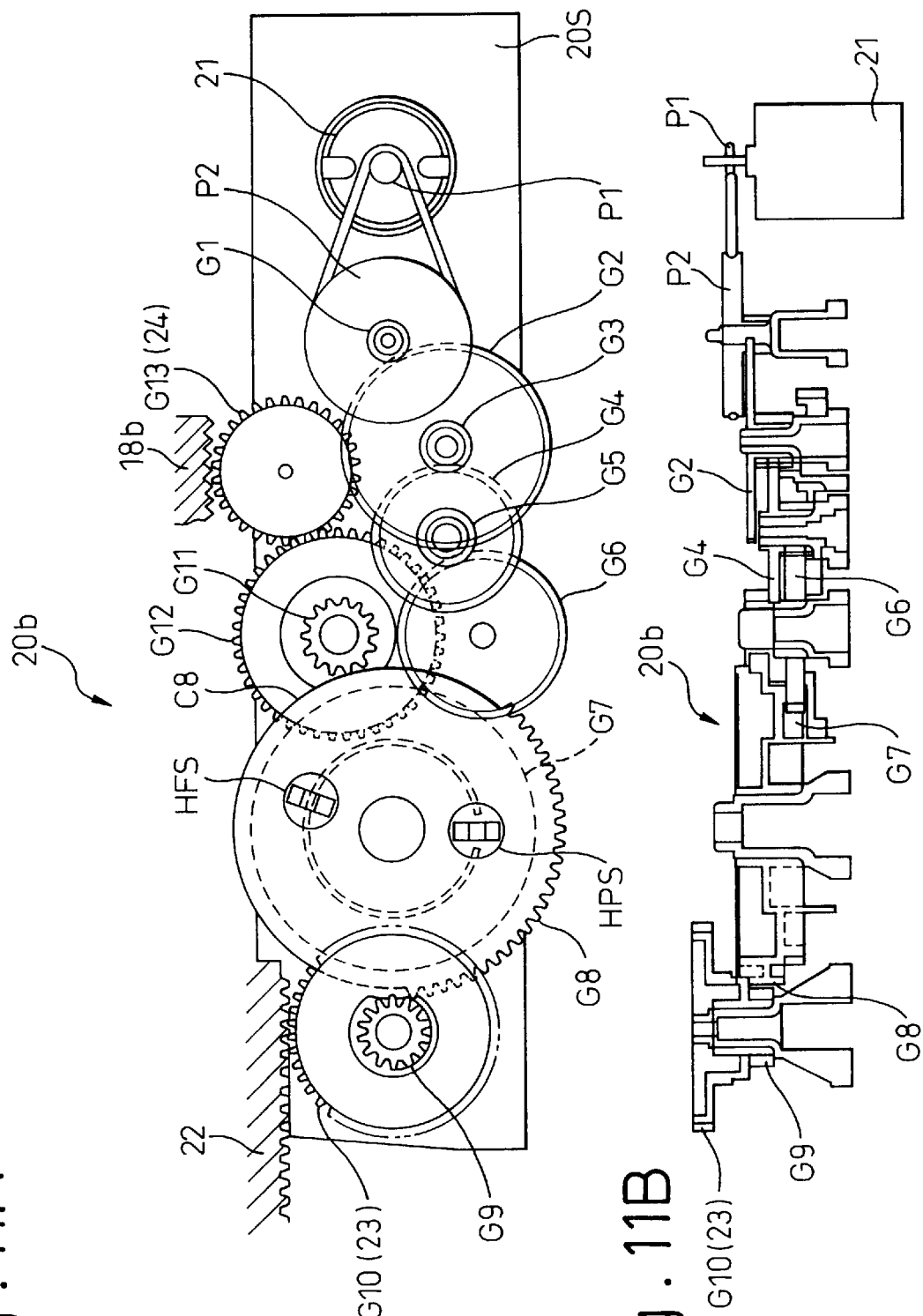
FIG. 11A is a plan view of the actuating mechanism.
FIG. 11B is a side view of the actuating mechanism of FIG. 11A.

FIG. 9 shows the pusher member 18 is in the advanced position. The pusher member 18 can be advanced in the direction of the arrow by transferring the rotation of the gear 24 to the rack 18b. The pusher member 18 can be retracted by the rotation of the gear 24 in reverse. The hopper table 1 is in the closed position and does not move with the pusher member 18. In the embodiment, the hopper table 1 and the pusher member 18 move front and rear independently of each other, that is, they are not opened or closed simultaneously. A mechanism for independently moving them will be described later in detail.

The loading mechanism 20b is arranged in the casing 100 on one side thereof remote from the side cover 16 (shown in FIG. 3B), as shown in FIG. 7. The motor 21 of the loading mechanism 20b may be, for example, a DC motor. It is also possible to use a stepping motor or any other motor as desired. In the image reading apparatus of this embodiment, the hopper table 1 and the pusher member 18 are driven by a common drive system.

FIGS. 11A and 11B illustrate the loading mechanism 20b in greater detail, wherein FIG. 11a is a top view and FIG. 11b is a side view. The loading mechanism 20b has a base plate 20s to which the motor 21, pulleys and gears are mounted. A pulley P1 is attached to the rotatable shaft of the motor 21 and is coupled to a pulley P2 through a belt. The pulley P2 has a coaxial gear G1 which is engaged with a gear G2 having a coaxial gear G3. The gear G3 is engaged with a gear G4 having a coaxial gear G5 which is engaged with a gear G6 which is further engaged with a gear G7.

The gear G7 has a coaxial gear G8 which is a partly toothed gear. The partly toothed gear G8 has teeth only on a portion of the outer circumference thereof. Therefore, the teeth of the partly toothed gear G8 can selectively engage with the next gears. The partly toothed gear G8 can engage, on one hand, a gear G9 having a coaxial gear G10 which corresponds to the gear 23 of FIGS. 6 to 9. The gear G10 (23) is engaged with the rack 22 of the hopper table 1. The partly toothed gear G8 can engage, on the other hand, a gear G11 having a coaxial gear G12 which is further engaged with a gear G13. The gear G13 corresponds to the gear 24 of FIGS. 6 to 9 and is engaged with the rack 18b of the pusher member 18. Therefore, the driving force of the motor 21 is transmitted to the rack 22 of the hopper table 1 to move the latter front and rear while the teeth of the partly toothed gear G8 are engaged with the gear G9; and the driving force of the motor 21 is transmitted to the rack 18b of the pusher member 18 to move the latter front and rear while the teeth of the partly toothed gear G8 are engaged with the gear G11. The directions of the movement of the hopper table 1 and the pusher member 18 change depending on the rotational direction of the motor 21.

The partly toothed gear G8 is constructed such that the teeth of the gear G8 are not engaged with the gear G11 while the teeth of the partly toothed gear G8 are engaged with the gear G9, and the teeth of the partly toothed gear G8 are not engaged with the gear G9 while the teeth of the partly toothed gear G8 are engaged with the gear G11. Accordingly, the driving force is not transmitted to the gear G11 while the driving force is transmitted to the gear G9, and the driving force is not transmitted to the gear G9 while the driving force is transmitted to the gear G11. Therefore, when the hopper table 1 is moved to open or close, the pusher member 18 is maintained stationary, and when the pusher member 18 is moved to open or close, the hopper table 1 is maintained stationary.

In addition, the gear G10 is engaged with the partly toothed gear G8 via one gear G9, but the gear G13 is engaged with the partly toothed gear G8 via two gears G11 and G12. Therefore, the rotational direction of the motor 21 for advancing the hopper table 1 is opposite to the rotational direction of the motor 21 for advancing the pusher member 18. By changing the rotational direction of the motor 21, it is possible to change the direction of the movement of the hopper table 1 or the pusher member 18 to open or close, respectively.

In particular, the motor 21 is turned in the clockwise direction in FIG. 11A (hereinafter referred to as a forward direction) to advance the hopper table 1 into the open position, and the motor 21 is turned in the counterclockwise direction in FIG. 11A (hereinafter referred to as a reverse direction) to retract the hopper table 1 into the closed position. On the other hand, the motor 21 is turned in the reverse direction to advance the pusher member 18 into the discharge position, and the motor 21 is turned in the forward direction to retract the pusher member 18 is into the retract position. In this manner, the partly toothed gear G8 can selectively drive one of the hopper table 1 and the pusher member 18.

Figure 12:
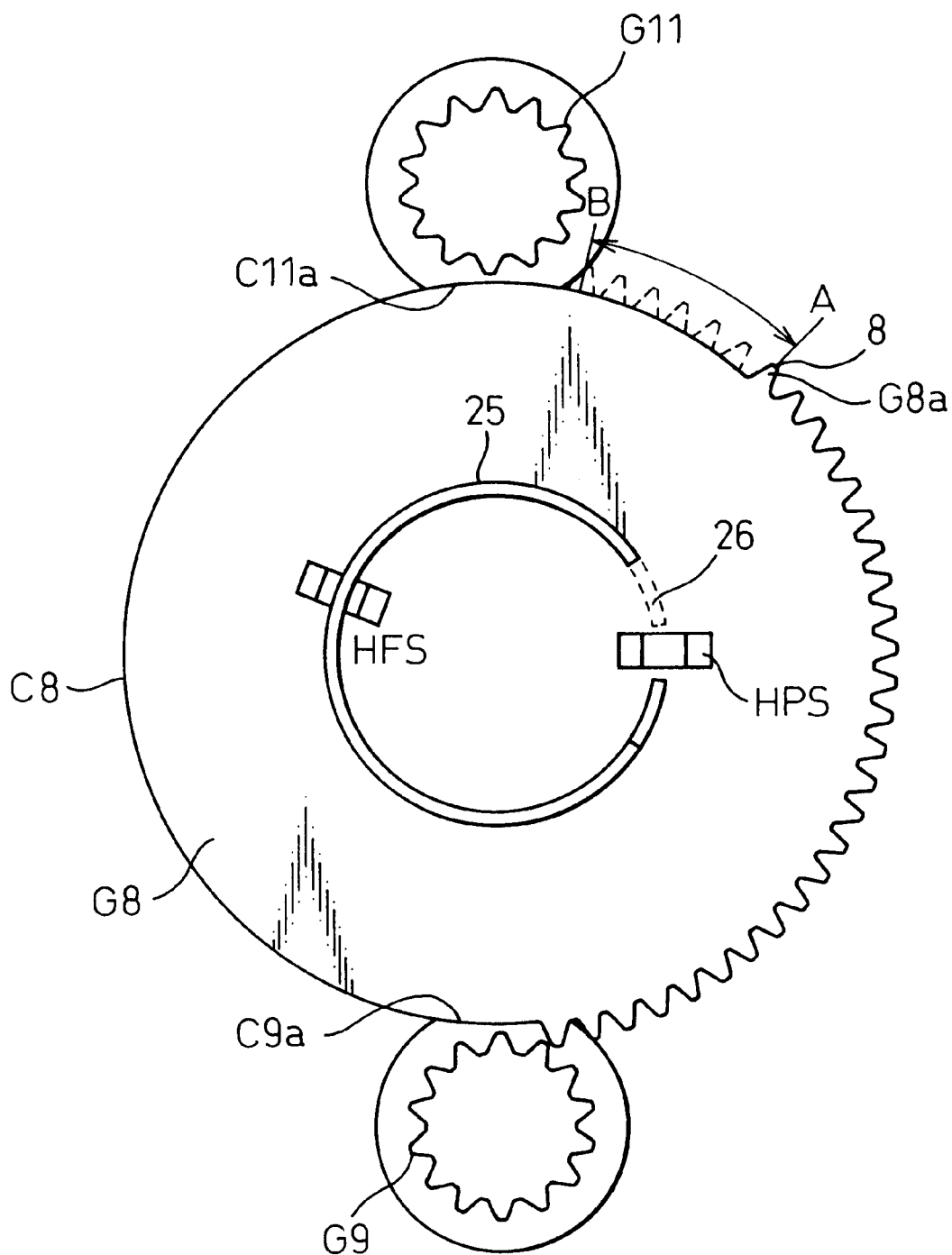
FIG. 12 is a plan view of the partially toothed gear and the associated two gears of the actuating mechanism.
Figure 13:
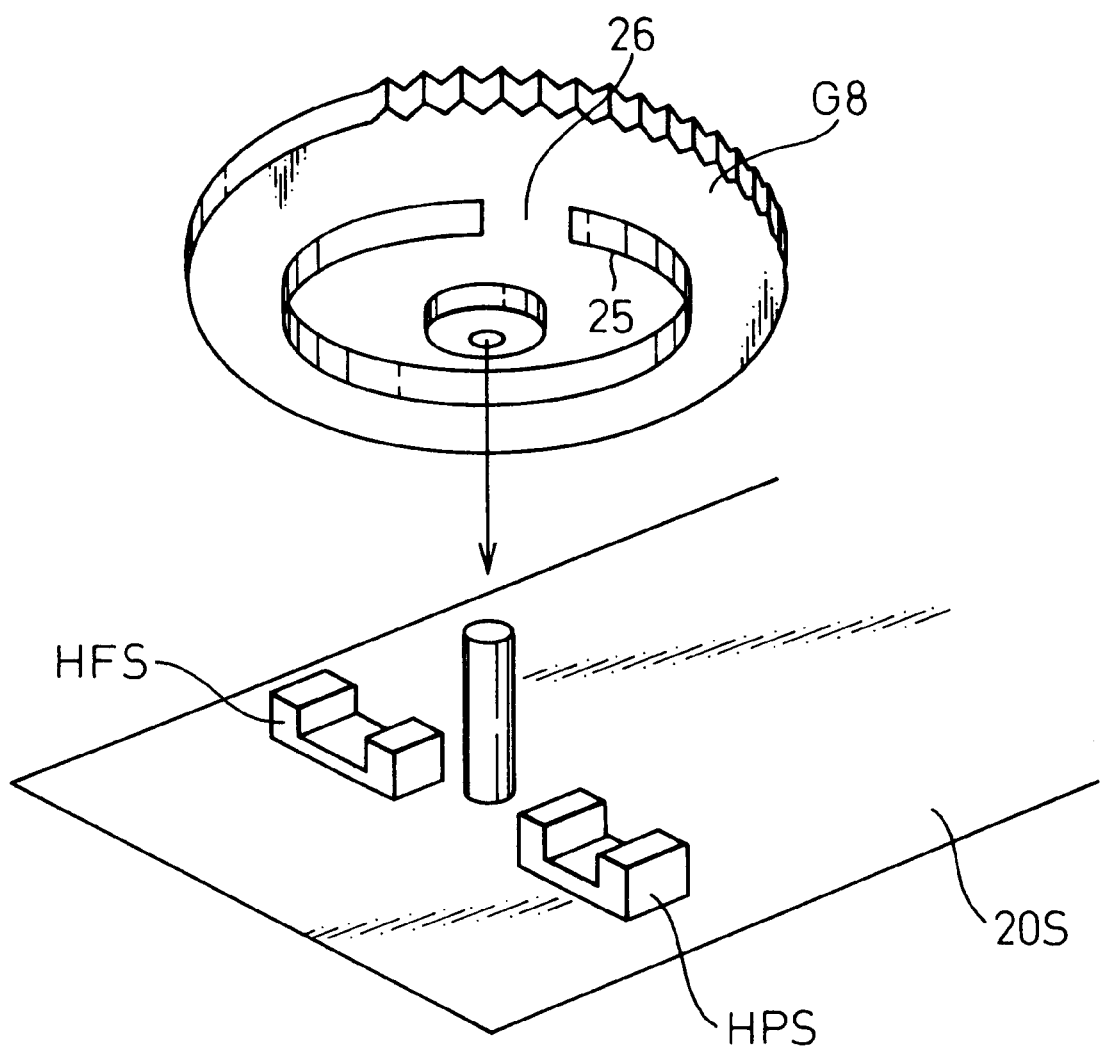
FIG. 13 is a perspective view of the partially toothed gear and the base plate of the actuating mechanism.

FIGS. 12 to 15B show the gears 8, 9 and 11 in greater detail. The partly toothed gear G8 has a semicircular shading plate 25 on the lower surface thereof, and the base plate 20s of the loading mechanism 20b has a home position sensor (HPS) and a hopper front end sensor (HFS), as shown in FIGS. 12 and 13. HPS and HFS are of a photocoupler type sensor and the shading plate 25 acts to interrupt the light in HPS and HFS. The timing for driving the motor 21 is controlled by the outputs from HPS and HFS.

HPS detects the home position in which the teeth of the partly toothed gear G8 is not engaged with any of the gear G9 and the gear G11. At the home position, the hopper table 1 is in the closed position and the pusher member 18 is in the retract position. Therefore, HPS provides a signal representing whether the hopper table 1 and the pusher member 18 are opened or closed.

HFS provides a signal representing that the hopper table 1 is at the most advanced position, i.e., the front end position. HFS also provides a signal representing that the pusher member 18 is at the front end position, and also act as a stacker front end sensor (SFS, FIG. 17).

Referring to FIG. 12, when one end G8a of the teeth of the partly toothed gear G8 is at a position A, the teeth of the partly toothed gear G8 is brought into engagement with the gear G9. When the end G8a of the teeth of the partly toothed gear G8 is at a position B, the teeth of the partly toothed gear G8 is brought into engagement with the gear G11. When the end G8a of the teeth of the partly toothed gear G8 are located between the positions A and B, the teeth of the partly toothed gear G8 are not engaged with any of the gear G9 and the gear G11. This region is referred to as the home position region.

Referring to FIGS. 12 and 13, the shading plate 25 forms a slit 26 between the edges thereof. The slit 26 has a length that corresponds to the home position region A–B. When the slit 26 is brought into the position of the HPS, it is determined that the partly toothed gear G8 is at the home position.

Figure 14:
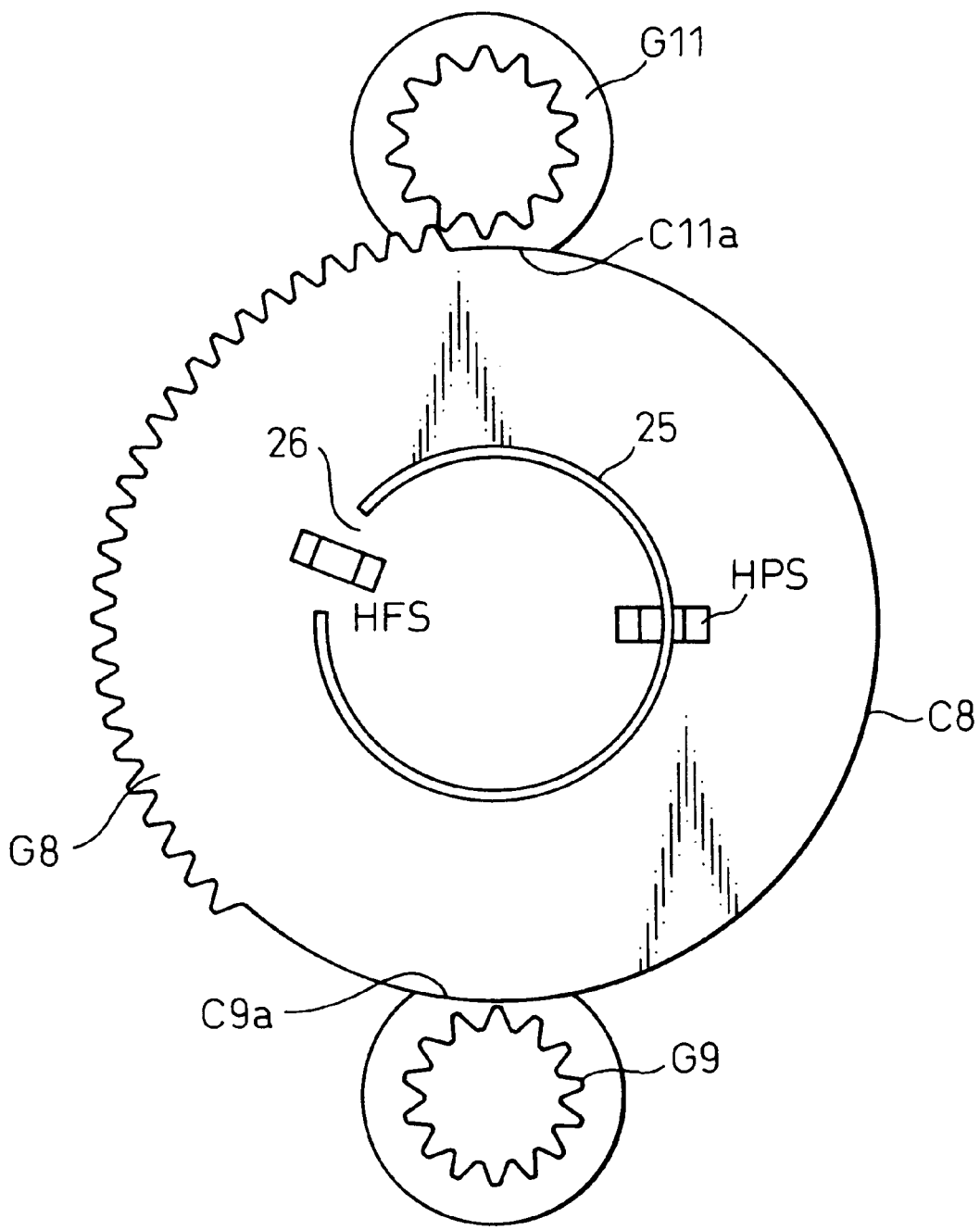
FIG. 14 is a view similar to FIG. 12 when the partially toothed gear is rotated from the position of FIG. 12.

Similarly, HFS is arranged at a portion corresponding to the position of the partly toothed gear G8 in a state where the hopper table 1 or the pusher member 18 is at the front end. When the slit 26 is brought into the position of the HFS, it is determined that the hopper table or the pusher member is at the front end. FIG. 14 illustrates the state of the partly toothed gear G8 of when the slit 26 is brought into the position of HFS.

Figure 15A:
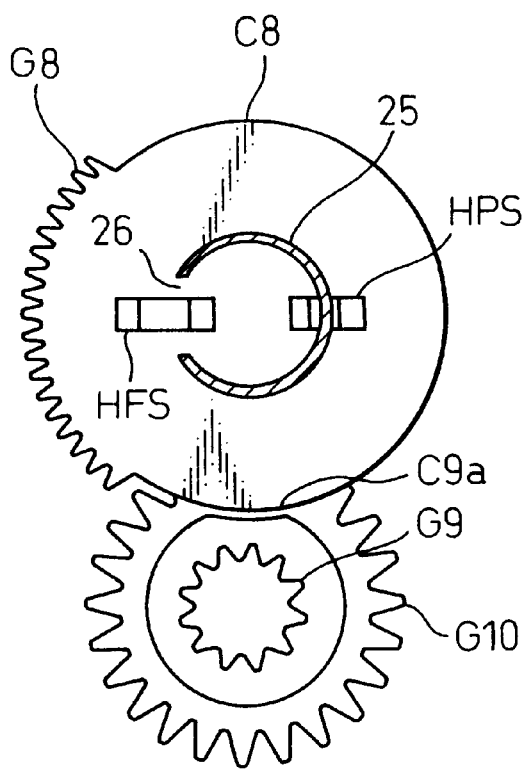
FIG. 15A is a plan view of the partially toothed gear and one of the associated two gears in the hopper front end position.
Figure 15B:
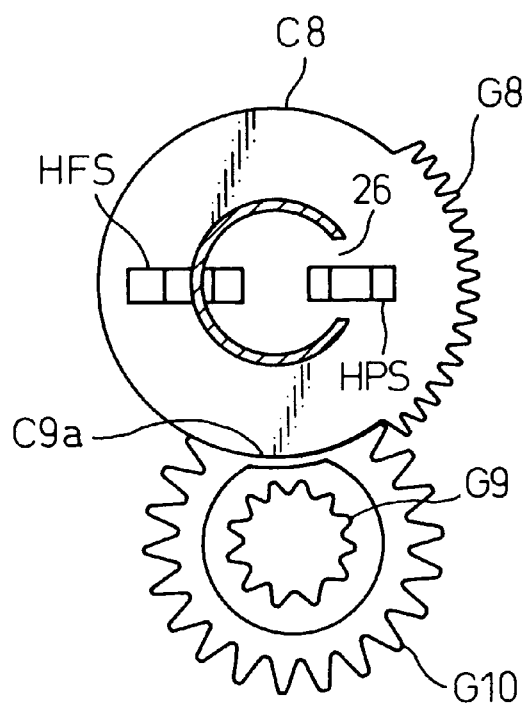
FIG. 15B is a plan view of the partially toothed gear and one of the associated two gears in the home position.

FIG. 15A shows the partly toothed gear G8 and the slit 26 of the shading plate 25 located at the hopper front end, and FIG. 15B shows the partly toothed gear G8 and the slit 26 of the shading plate 25 located at the home position. When the partly toothed gear G8 is at the home position, as shown in FIG. 15B, the slit 26 is at the position of HPS and the teeth of the partly toothed gear G8 are positioned on the right side. In the hopper front end, the teeth of the partly toothed gear G8 are positioned on the left side in the drawing, and the slit 26 of the shading plate 25 is at the position of HFS. In this manner, it is possible to detect the position of the partly toothed gear and thus the positions of the hopper table 1 and the pusher member 18, by detecting the slit position by HPS and HFS.

Figure 16:
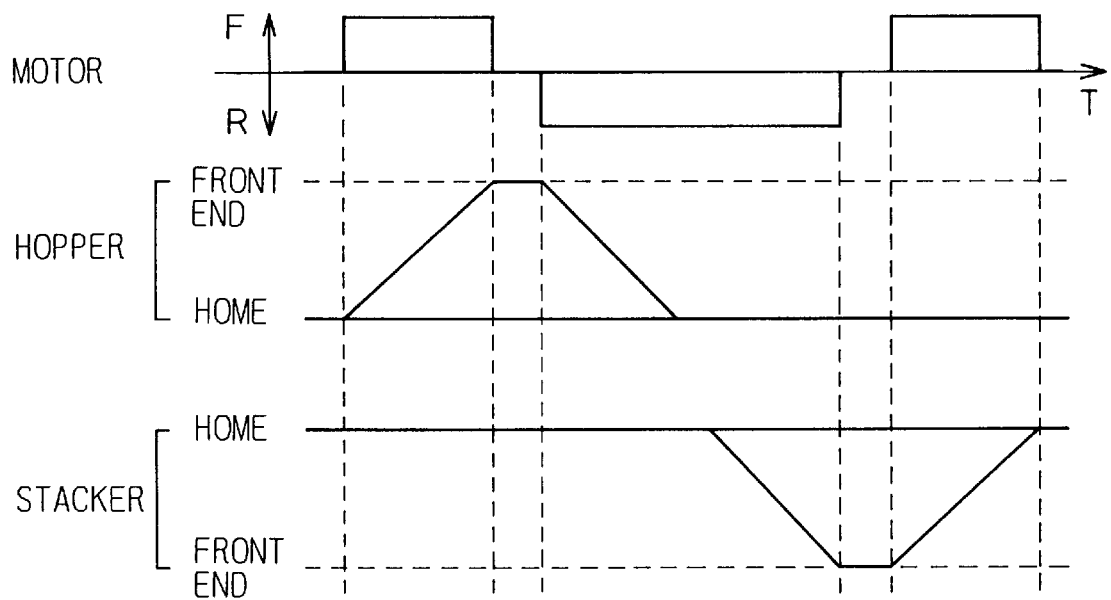
FIG. 16 is a timing chart illustrating the operation of the hopper table and the pusher member.

The control of the motor 21 which moves the hopper table 1 and the pusher member 18 is now described with reference to FIG. 16. FIG. 16 shows the rotational direction of the motor 21 and the operation of the hopper table 1 and the pusher member 18. When the motor 21 starts to rotate in the forward direction, the hopper table 1 moves forward from the home position to the front end. When the motor is turned in the reverse direction, the hopper table 1 is gradually retracted from the front end to the home position.

In this state, when the motor 21 is further turned in the reverse direction, the hopper table 1 stops at the home position, and the pusher member 18 is moved from the home position to the front end. When the motor 21 is turned in the forward direction, the pusher member is retracted from the front end to the home position.

In this embodiment, the DC motor 21 is used, and HPS and HFS detect the positions of the partially toothed gear G8. However, it is possible to use a stepper motor, and in this case, the motor can be controlled by counting the number or steps thereof.

Figure 17:
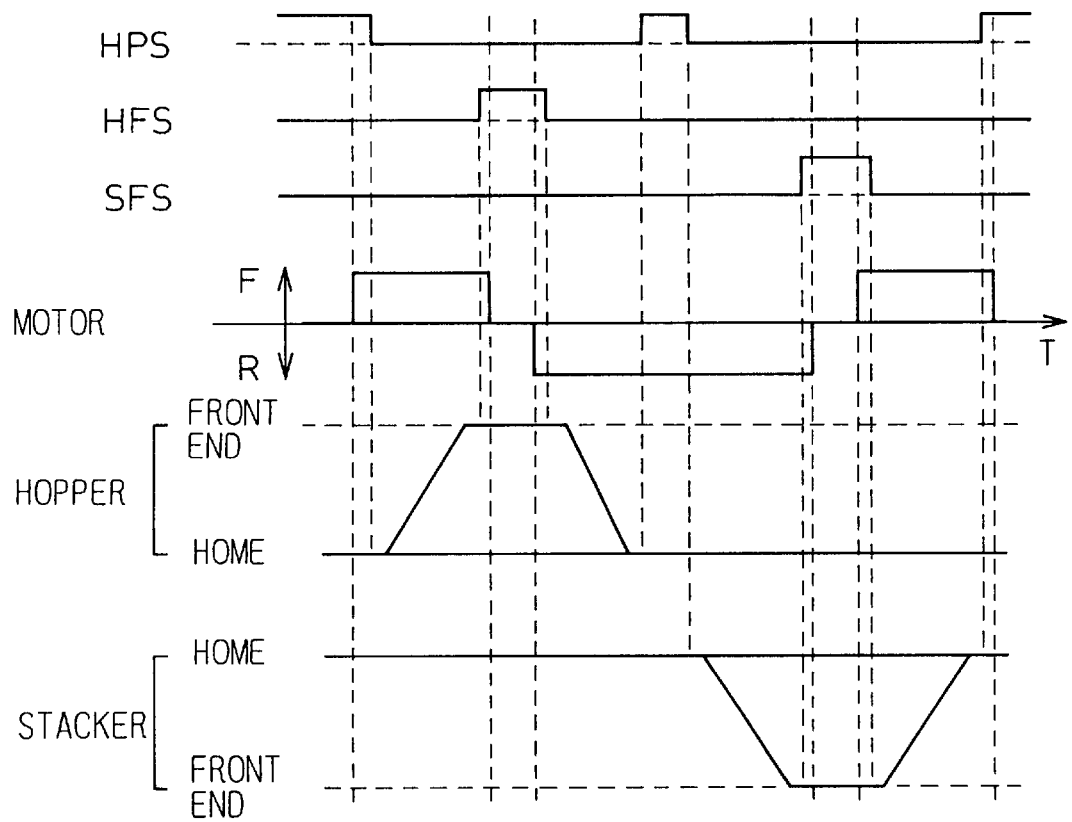
FIG. 17 is a timing chart illustrating the operation of the hopper table and the pusher member in response to the sensor outputs.

FIG. 17 shows a time chart for controlling the motor for operating the hopper table 1 and the pusher member 18, based upon detecting the slit 26 of the shading plate 28 by HPS and HFS. The sensors output "ON" signals when the slit 26 is at the position of HPS or HFS. The sensor outputs are turned off when the sensors are shielded by the shading plate 25.

HPS outputs "OFF" signal when both the hopper table 1 and the pusher member 18 are at the home position. To move the hopper table 1 toward the open position, the motor is turned in the forward direction. Therefore, the driving force of the motor 21 is transmitted to the rack 22 of the hopper table 1 via the gear G10 (23), and the hopper table 1 starts to move forward. When the hopper table 1 arrives at the front end, the slit 26 of the shading plate 25 arrives the position of HFS, whereby the output of HFS is turned on. The motor 21 is thus stopped in response to this signal, and the hopper table 1 is stopped at the open position.

Then, to close the hopper table 1, the motor 21 is turned in the reverse direction, and the hopper table 1 starts moving backward and arrives the home position. The slit 26 of the shading plate 25 thus arrives the position of HPS, whereby the output of HPS is turned on. The motor 21 is then stopped in response to this signal, and the movement of the hopper table 1 is finished. In FIG. 17, however, the motor 21 continues to rotate in the reverse direction.

To move the pusher member 18 forward, the motor 21 is turned in the reverse direction while the output of HPS is turned on. This causes the pusher member 18 to move forward. When the pusher member 18 arrives the front end, the slit 26 of the shading plate 25 is detected by HFS and the output of HFS is turned on. The motor 21 is thus stopped in response to this signal.

To move the pusher member 18 backward, the motor 21 is turned in the forward direction while the output of the HFS is turned on. This causes the pusher member 18 to start moving backward to the home position. When the pusher member 18 arrives the home position, the slit 26 of the shading plate 25 is detected by HPS and the output of HPS is turned on. The motor 21 is stopped in response to this signal, and the retracting motion of the pusher member 18 is finished.

The operation of the hopper table 1 and the pusher member 18 are thus monitored, and operation of the motor is controlled based the output from the sensors. Accordingly, the operation for opening and closing the hopper table 1 and the pusher member 18 can be controlled by an inexpensive DC motor, instead of an expensive stepping motor.

The hopper table 1 and the pusher member 18 can be controlled by a single common motor, and there is no need to employ an increased number of motors. When the hopper table 1 is moved, furthermore, the pusher member 18 is maintained stationary in the retracted position, and when the pusher member 18 is moved, the hopper table 1 is maintained stationary in the closed state. Therefore, it is sufficient move only one of the hopper table 1 and the pusher member 18 that is needed to be opened or closed. Thus, either one of them is opened or closed at one time, and there is no inconvenience that may otherwise occur so that the hopper table 1 moves forward while pusher plate 18 also moves forward with the result that the discharge of the documents from the stacker 2 may be obstructed by the open hopper table 1.

Figure 35A:
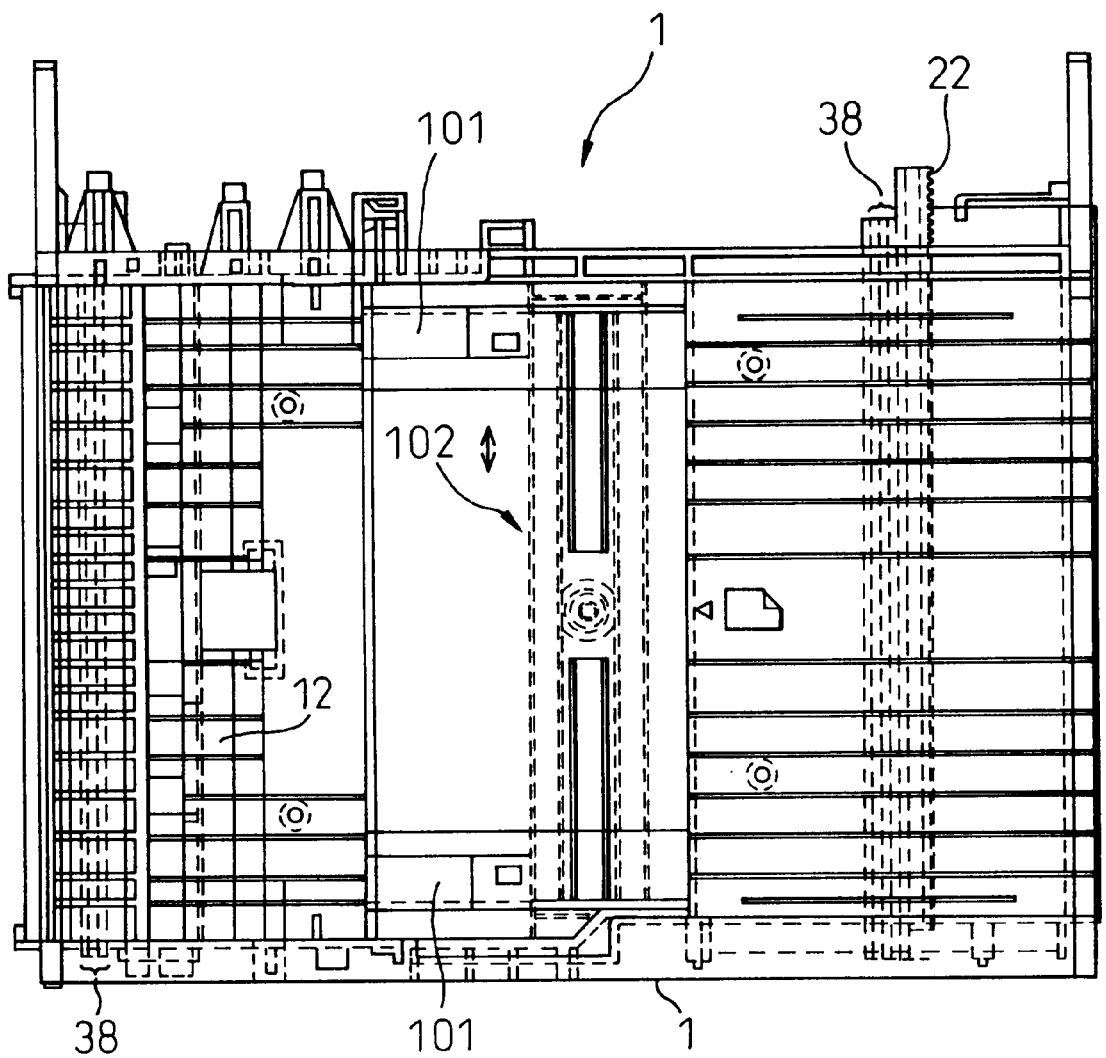
FIG. 35A is a plan view of the hopper table having the drive rack and the additional racks.
Figure 35B:
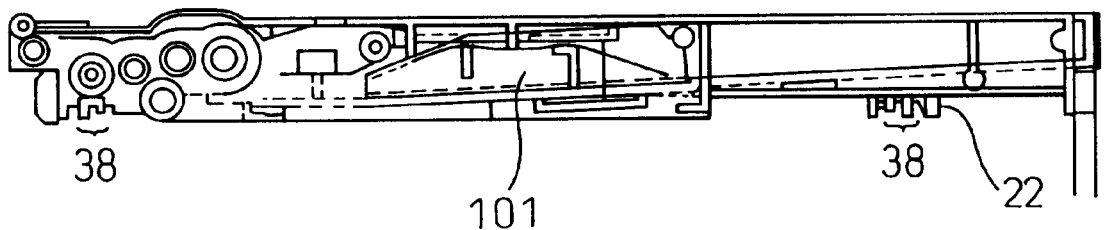
FIG. 35B is a side view of the hopper table of FIG. 35A.

The hopper table 1 has movable side guides to guide the documents on the hopper 1a. Side guides 101 and an associated rack-pinion mechanism 102 are shown in FIGS. 35A and 35B. The side guides are moved to reset them in accordance with the width of the document to be used, and this reset is possible when the hopper table 1 is in the open position. However, since the direction of the resetting movement of the side guides is in agreement with the direction of the open-close movement of the hopper table 1, a force for slidably moving the side guides is exerted on the hopper table 1, causing the hopper table 1 to move. When the side guides do not smoothly move, an excessive force is needed to move the side guides, and this excessive force is exerted on the hopper table 1 to move the latter.

Also, according to this image reading apparatus, it is possible to read the documents even when the hopper table 1 is in the open position, as described above. However, if the hopper table 1 is capable of being freely movable in the opening/closing direction, the hopper table 1 may be moved into the closed direction when an accidental force is applied to the hopper table. In particular, when the hopper table 1 is closed while the document is being read, the document being read out is caught and jammed between the hopper table 1 and the casing 100 and the document may be damaged. Also, if the hopper table in the closed position can be easily pulled out, a problem occurs that the document while it is being read may be caught between the hopper table 1 and the casing 100 and damaged.

Therefore, according to this embodiment, the image reading apparatus is constructed such that the hopper table 1 in the open position cannot be moved even if it is pushed toward the retracted position and that the hopper table 1 in the closed position cannot be moved even if it is attempted to pull it out.

Figure 18A:
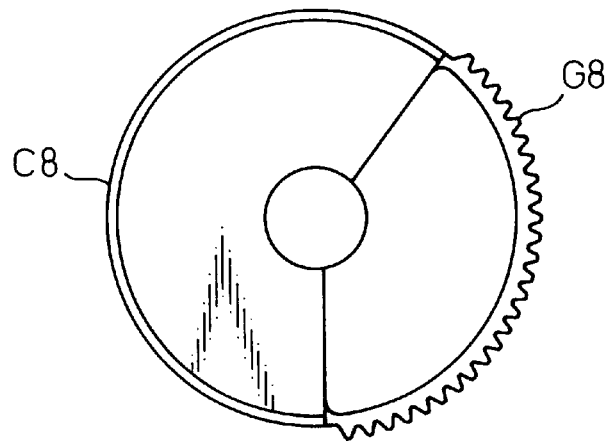
FIG. 18A is a plan view of the partially toothed gear.
Figure 18B:
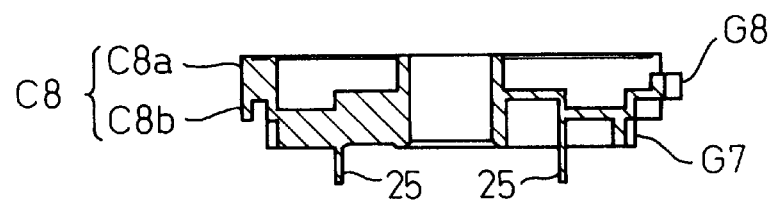
FIG. 18B is a cross-sectional view of the partially toothed gear of FIG. 18A.

FIG. 18A is a plan view of the partly toothed gear G8, FIG. 18B is a cross-sectional view of the partly toothed gear G8, and FIG. 18B is a bottom view of the partly toothed gear G8. The partly toothed gear G8 has a semi-circular cam C8 comprising an upper cam portion C8a located above the teeth of the partly toothed gear G8 and a lower cam portion C8b located below the teeth of the partly toothed gear G8.

Figure 18C:
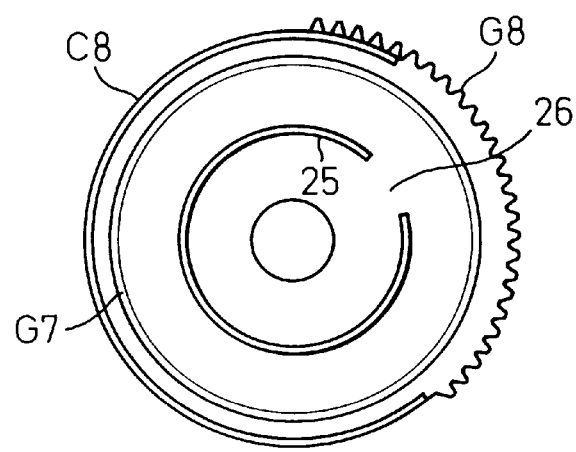
FIG. 18C is a bottom view of the partially toothed gear of FIG. 18A.
Figure 19A:
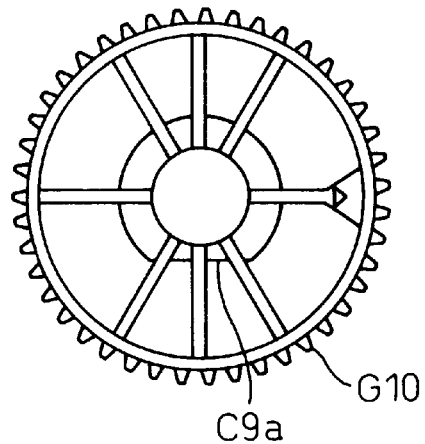
FIG. 19A is a plan view of the gear engaged with the partially toothed gear for driving the rack of the hopper table.
Figure 19B:
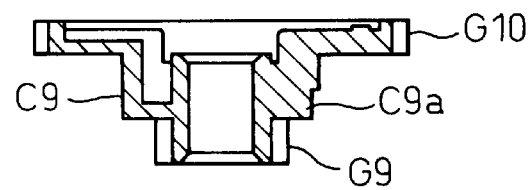
FIG. 19B is a cross-sectional view of the gear of FIG. 19A.
Figure 19C:
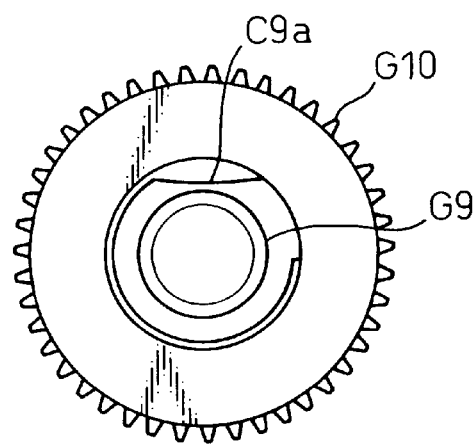
FIG. 19C is a bottom view of the gear of FIG. 19A.

FIGS. 19A to 19C are similar views to FIGS. 18A to 18C, but illustrating the gear G9. The gear G9 has a concave cam C9a having a complementary contour to that of the upper cam portion C8a of the partly toothed gear G8. The cam C9a of the gear G9 comes in contact with the upper cam portion C8a of the partly toothed gear G8 when the gear G8 is not engaged with the gear G9, i.e., when the hopper table 1 is at the home position or at the front end. When the cam C9a comes in contact with the upper cam portion C8a, the rotation of the gear G9 is prohibited, although the rotation of the gear G8 is allowed (see FIGS. 12 and 14, for example). Therefore, even if the hopper table 1 in the open position is pushed by an external force, the gear G9 does not turn and the hopper table 1 cannot be moved.

Similarly, the gear G11 has a concave cam C11a having a complementary contour to that of the lower cam portion C8b of the partly toothed gear G8, as shown in FIG. 14. The cam C11a of the gear G11 can make a contact with the lower cam portion C8b of the partly toothed gear G8, when the gear G8 is not engaged with the gear G9, i.e., when the pusher member 18 is at the front end or at retracted position. Therefore, the pusher member 18 cannot be moved by an external force.

The cam C8 is interrupted approximately at a circumferential portion where the teeth of the partly toothed gear G8 exist. Therefore, when the teeth of the partly toothed gear G8 is engaged with the gear G9 or G11, the concave cam C9a or C11a does not contact the cam C8a or C8b any more and the gear G9 or G11 is not obstructed by the cam C8a or C8b, so the gear G9 or G11 can rotate whereby the gear G8 can drive the gear G9 or G11.

There is a possibility that when the hopper table 1 is moved back, a finger or the document may be pinched between the hopper table 1 and the casing 100 and a load is exerted on the motor 21 to cause high current flowing in the motor. The motor may be damaged. A solution is provided to prevent such an occurrence, as shown in FIG. 20.

Figure 20:
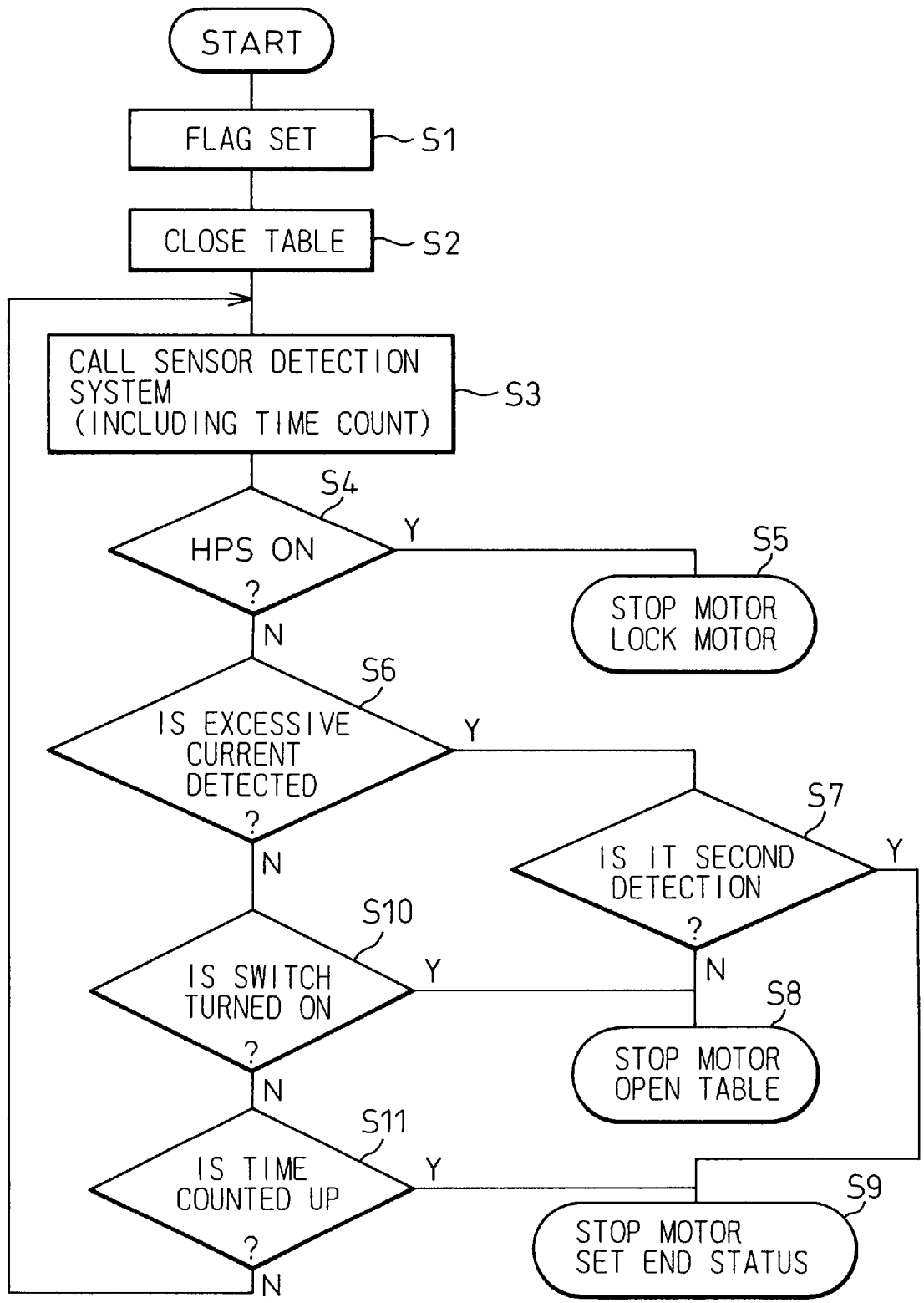
FIG. 20 is a flow chart for controlling the motor when an excessive current is detected.

FIG. 20 is a flow chart illustrating the control of the hopper table 1, in which current flowing in the motor 21 is detected and the direction of the movement of the hopper table 1 is reversed depending upon the detected current. First, when it is desired to move the hopper table 1 in the closing direction, a flag indicating the rotational direction flag is set to CLOSE (S1). The flag can be provided in a processor that controls the image reading apparatus. The motor control register used for controlling the motor 21 is set so that the hopper table 1 is moved in the closing direction (S2). A system call for detecting a change in the output of the sensor is then delivered (S3). The system call includes a time count. It is then determined whether HPS is on or not (S4). When HPS outputs the "ON" signal, it means that the hopper table 1 is closed, so the motor 21 is stopped and the motor locking procedure is carried out (S5).

When HPS does not output the "ON" signal, it is determined whether an excessive current is detected or not (S6). When an excessive current is detected, it is determined whether the excessive current is detected for the second time (S7). When the excessive current is detected for the second time, the motor 21 is stopped, and the program ends by setting an end status (S9). When the excessive current is not detected for the second time, the motor is once stopped and is then driven in the reverse direction so as to open the hopper table 1 (S8).

When an excessive current is not detected, it is determined whether the switch is turned on by the operator or not (S10). When the switch is turned on, the motor is stopped and the hopper table 1 is moved in the opening direction (S8). When the switch is not turned on, it is determined whether the time has been counted up or not (S11). The time count is set depending upon a period of time required for completely closing the hopper table 1. In case the time has been counted up, it means that the time required for closing the hopper table 1 has elapsed. In this case, therefore, the motor 21 is stopped to end the operation (S9). When the time has not been counted out, the system for detecting a change in the output of the sensor is called again to repeat the above-mentioned processings.

In the case of FIG. 20, the motor 21 is driven in the reverse direction. However, it is possible to control such that the motor is no longer driven.

Figure 21:
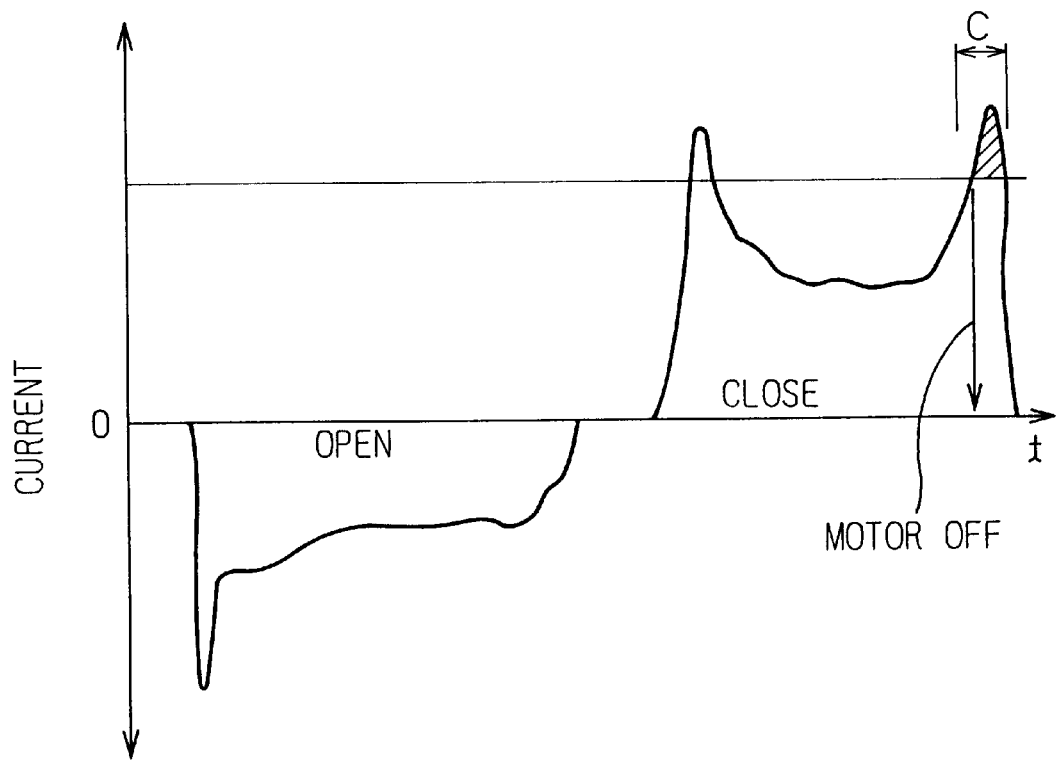
FIG. 21 is a view illustrating the control of the motor when the finger is pinched by the hopper table and the housing.

FIG. 21 shows the relationship between the opening and closing operation of the hopper table 1 and the current, wherein the ordinate represents the current. Referring to FIG. 21, when a hand is caught by the hopper table 1 being closed, an abnormally increased current flows into the motor 21 (see the range C). The current is monitored and when it is detected that the current is abnormally high, the motor is no longer driven.

Figure 22:
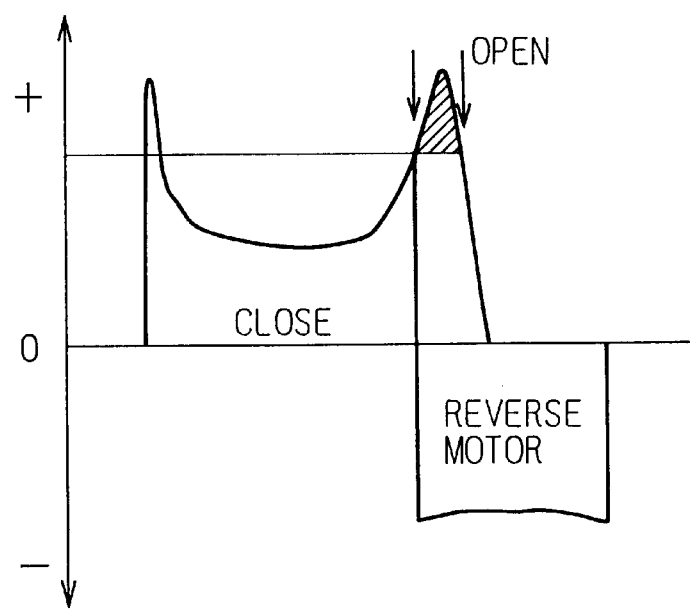
FIG. 22 is a view illustrating the control of the motor when the finger is pinched by the hopper table and the housing.

FIG. 22 shows another control method, wherein the ordinate represents the current. In the case of FIG. 22, when an abnormally high current flows due to the fact that a hand is caught by the hopper table 1 being closed, for example, the motor 21 is driven in the reverse direction to open the hopper table 1.

Figure 23A:
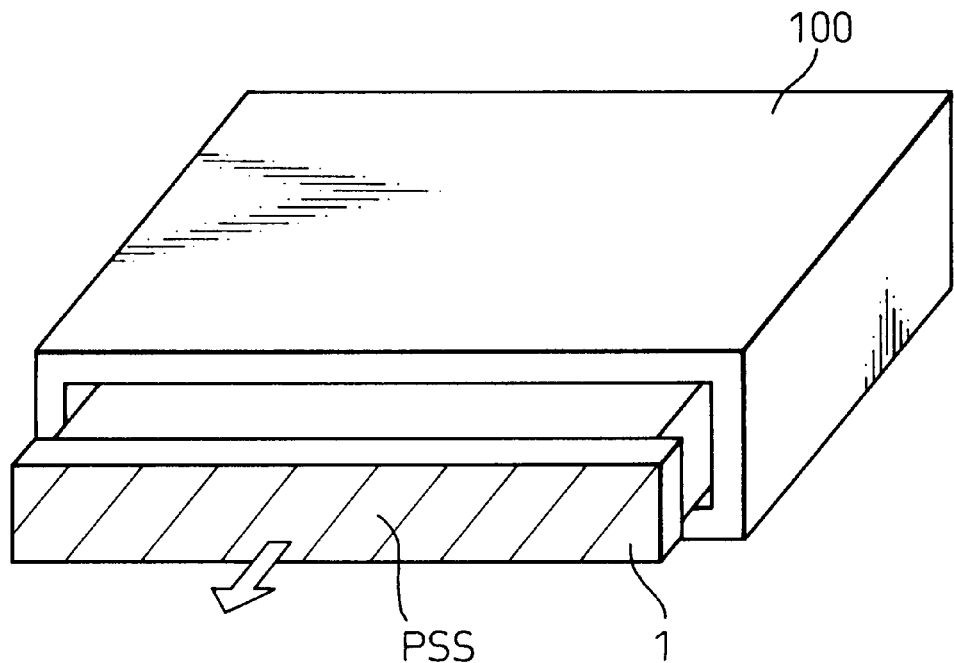
FIG. 23A is a perspective view of an example of the image reading apparatus having a pressure sensor on the front surface of the hopper table.
Figure 23B:
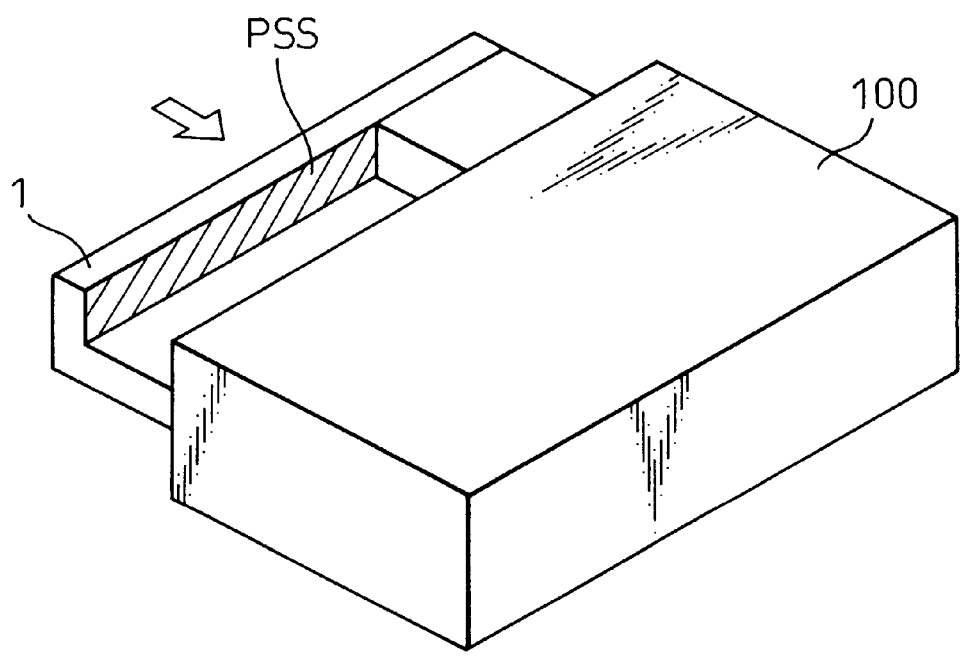
FIG. 23B is a perspective view of an example of the image reading apparatus having a pressure sensor on the inner surface of the hopper table.

It is also possible to arrange a sensor sheet (PSS) such as a pressure sensor on the front surface or the interior surface of the hopper table 1, in place of detecting the excessive current of the motor, so that the motor is stopped or driven in the reverse direction in response a signal output from PSS, as shown in FIGS. 23A and 23B. In this way, it is possible to control the hopper table by detecting whether anything is contacting the hopper table 1, without using a circuit for detecting over-current.

Figure 24:
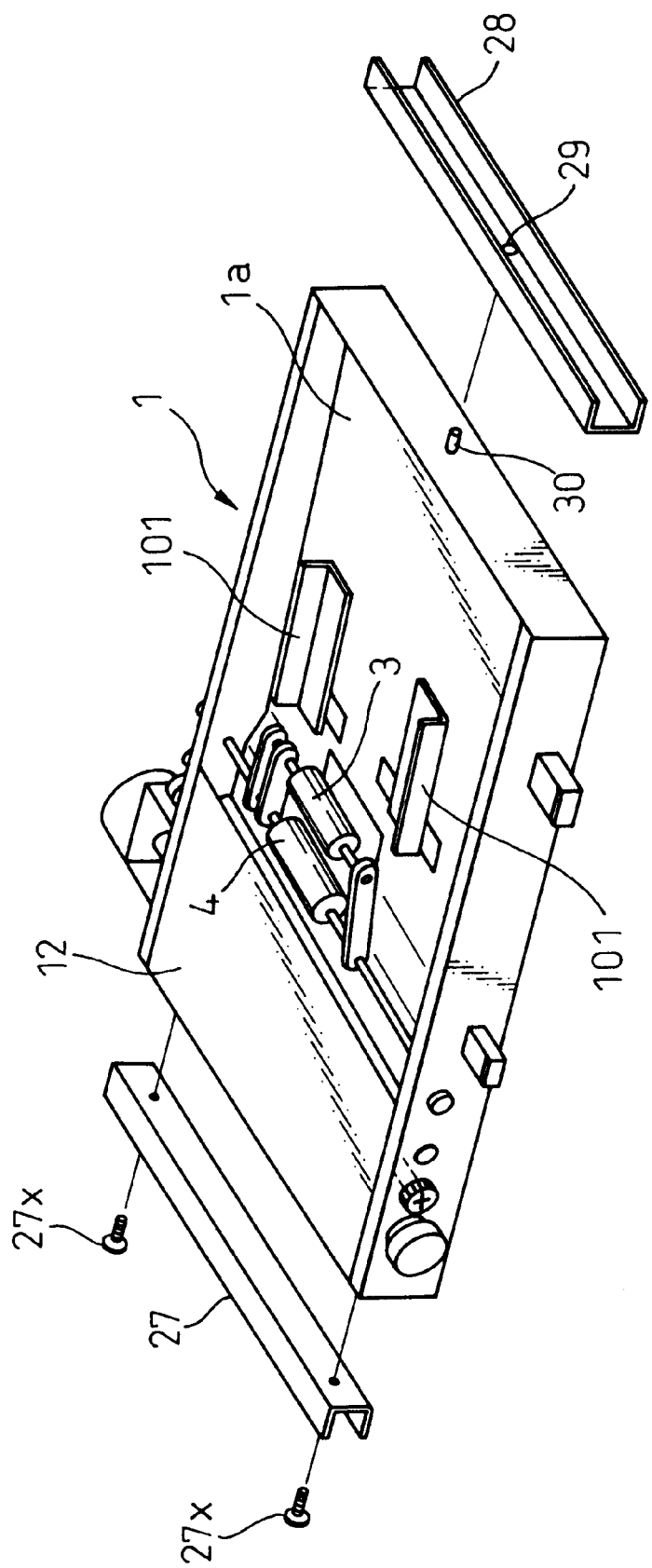
FIG. 24 is a perspective view of an example of the hopper table having guide rails.

FIG. 24 shows an example of the supporting structure by which the hopper table 1 is slidably supported by the casing 100. A guide rail 27 of a curved metal sheet is attached to the left side of the hopper table 1 and fixed thereto at two points by screws 27x. A guide rail 28 of a curved metal sheet is attached to the right side of the hopper table 1. The guide rail 28 has a hole 29 perforated nearly at the center thereof, and a pin 30 is provided nearly at the center of the right side of the hopper table 1. The pin 30 can be loosely fitted in the hole 29, so that the hopper table 1 is pivotable relative the guide rail 28 and movable in the longitudinal direction thereof (in the direction of the pin 30) relative the guide rail 28. The casing 100 has guides or guide rails (not shown) to slidably receive the guide rail 27 and 28, respectively, so that the hopper table 1 is drawably moved in the casing 100, as described above.

The image reading apparatus can be used in such a condition that a personal computer including a display or the like equipment may be placed on the image reading apparatus (FIG. 2). Therefore, the casing 100 of the image reading apparatus will be sometimes subjected to a heavy load and may be distorted. The hopper table 1 includes the reading head 12, and conveying rollers, etc. and an accuracy of the shape of the hopper table 1 affects the accuracy for conveying the documents. If the casing 100 is deformed due to the external force as described above, such deformation may be transmitted to the hopper table 1, making it no longer possible to maintain accuracy for conveying the documents. This problem is solved by the construction of FIG. 24, since the distortion of the casing 100 will be absorbed so as not to be directly transmitted to the hopper table 1 because of the floating support structure between the guide rail 28 and the hopper table 1 on the right side thereof.

Figure 25:
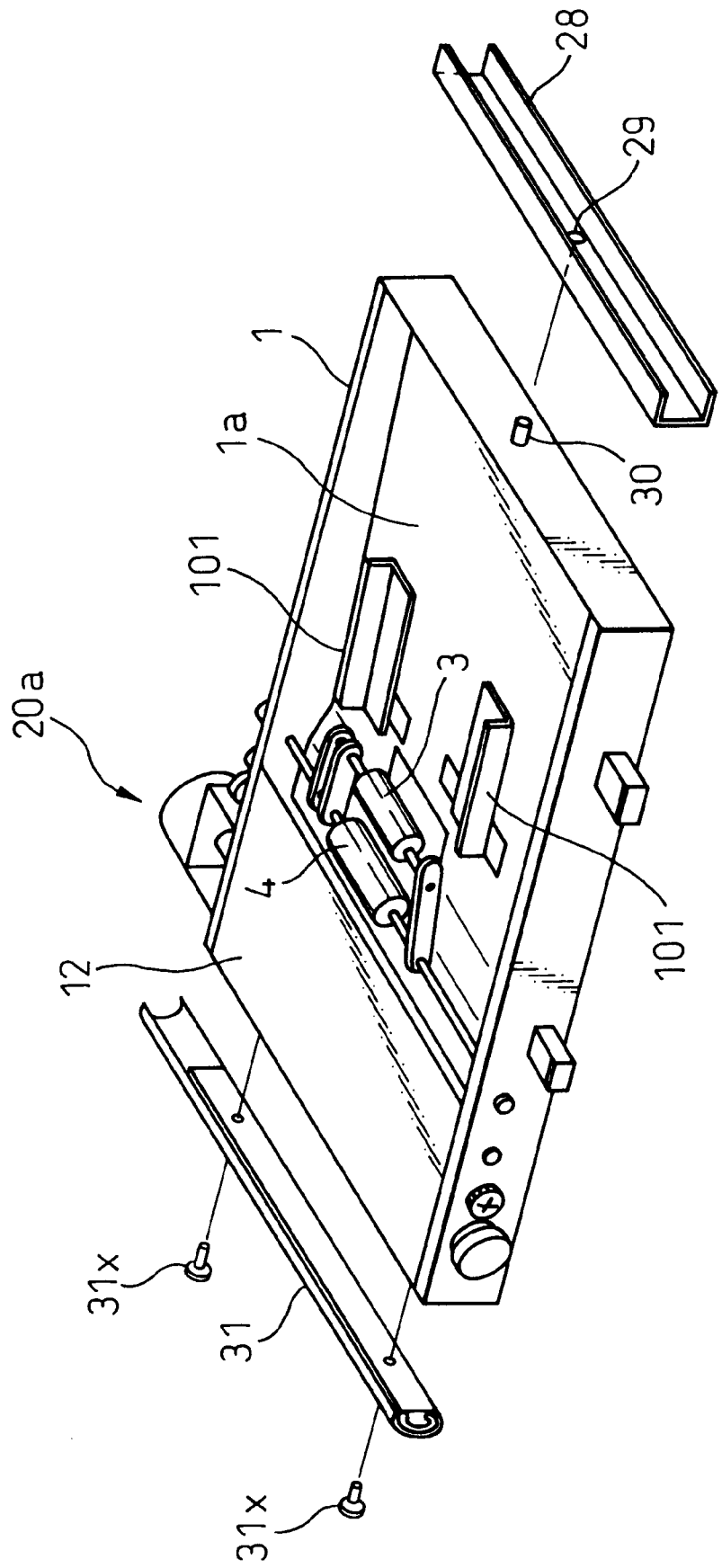
FIG. 25 is a perspective view of another example of the hopper table having guide rails.

FIG. 25 shows a modification of the supporting structure of FIG. 24. In FIG. 25, a slide rail 31 having a circular arcuate cross section is attached to the left side of the hopper table 1 and fastened to the hopper 1 at two points using screws 31x. The guide rail 28 is attached to the right side of the hopper table 1, in a manner similar to that of FIG. 24. As shown in FIG. 25, the hopper table 1 is provided on its left side with the reading head 12 and the actuating mechanism 20a for driving the conveying rollers, so the weight of the hopper table 1 is concentrated on the left side of the hopper table 1. Therefore, the relatively heavy left side of the hopper table 1 is supported by the fixed type slide rail 31 and the relatively light right side of the hopper table 1 is floatingly supported by the guide rail 28, so that load and resistance to the movement of the hopper table 1 are received mainly by the slide rail 31 to thereby decrease the burden of operation on the motor 21.

Figure 26:
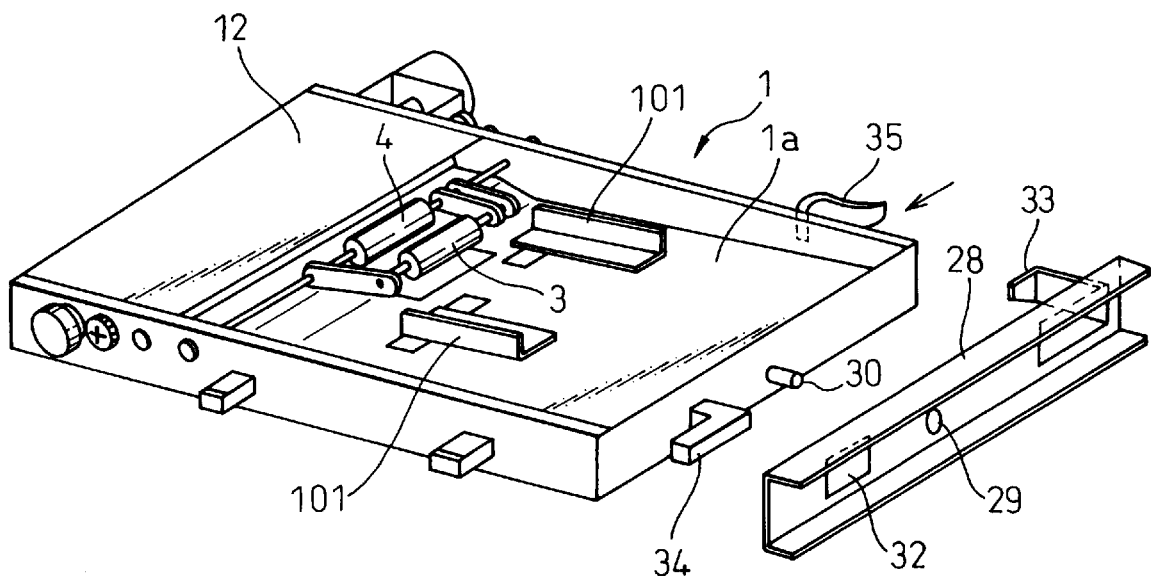
FIG. 26 is a perspective view of a further example of the hopper table having guide rails.

FIG. 26 shows a further modification of the supporting structure of FIG. 24. The conveying path for conveying the documents is formed on the left side of the hopper table 1, as shown in FIG. 1. When a part of the conveying path formed in the hopper table 1 is displaced from the remaining part of the conveying path formed in the casing 100, the documents are not only incorrectly conveyed but may also be damaged. Accordingly, the positioning of the parts of the conveying path of the hopper table 1 and the conveying path of the casing 100 must be precisely accomplished. By supporting the left side of the hopper using the slide rail 31, as shown in FIG. 25, the positioning is accomplished highly precisely between the hopper table 1 and the casing 100. On the right side of the hopper table 1, on the other hand, the precision mounting needs not be maintained as high as that of the left side of the hopper table 1. Accordingly, the floating guide rail 28 is satisfactory for supporting the right side of the hopper table 1.

There is a possibility that the guide rail 28 on the right side of the hopper table 1 may be accidentally detached from the hopper table 1 if it is attached only with the pin 30 and hole 29, as shown in FIGS. 24 and 25. In order to prevent the guide rail 28 from being detached, it is necessary to provide fastening means such as screws or the like. However, such a measure may result in an increase in the number of parts to be used and deteriorate the effect to absorb deformation of the casing 100.

Therefore, the guide rail 28 is attached in a manner as shown in FIG. 26, so that it will not be detached from the hopper table 1 even without using a screw. In FIG. 26, the guide rail 28 has a hole 29 at the center, an elongated hole 32 at one end, and a hook 33 at the other end. The hopper table 1 has the pin 30 at the center, an L-shaped projection 34 at one end and a hook 35 on the back surface of the hopper table 1. The hook 35 on the back surface has resilience. The guide rail 28 is mounted to the hopper table 1 as follows. First, the L-shaped projection 34 of the hopper table 1 is fitted in the elongated hole 32 of the guide rail 28. Next, the pin 30 at the center of the hopper table 1 is fitted in the hole 29 at the center of the guide rail 28. Then, the hook 35 on the back surface of the hopper table 1 is deformed in the direction of the arrow in the drawing to allow the hook 33 of the guide rail 28 to engage with it. Thus, the guide rail 28 is not easily removed from the hopper table 1 owing to the action of the L-shaped projection 34 and the hook 35 on the back surface having resilience.

Figure 27A:
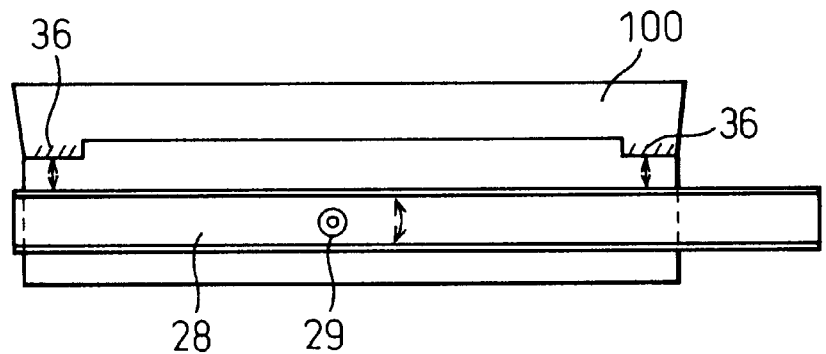
FIG. 27A is a side view of an example of the guide rail and the housing of the apparatus having the stopper for the guide rail.
Figure 27B:
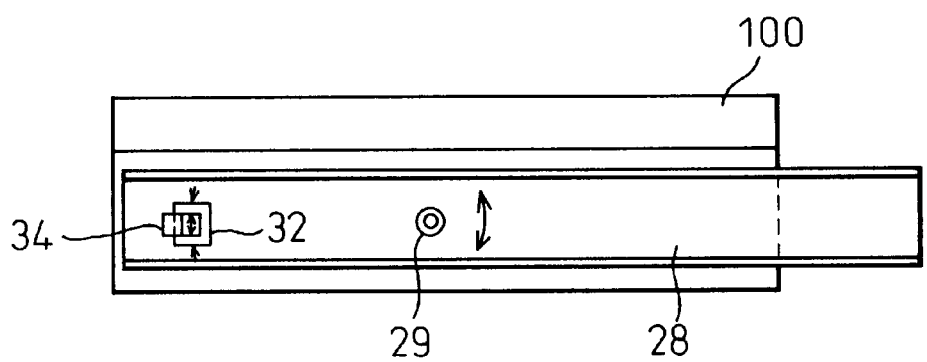
FIG. 27B is a side view of another example of the guide rail and the stopper.
Figure 27C:
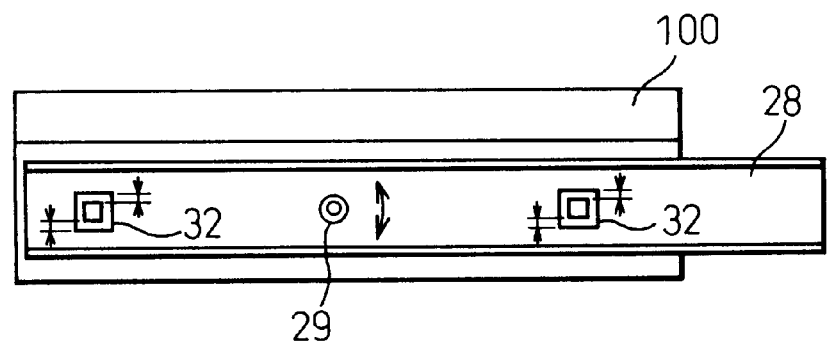
FIG. 27C is a side view of a further example of the guide rail and the stopper.

FIGS. 27A to 27C show further modifications of the supporting structure of FIG. 24. As mentioned already, the guide rail 28 is supported at one point to pivot about the pin 30. If the guide rail 28 is pivotable without any limit, the leading end of the hopper table 1 may tilt down when the hopper table 1 is opened, and the hopper table 1 interferes with the casing 100 and the opening and closing operation of the hopper table 1 is impaired. Therefore, the pivotable range of the guide rail 28 is limited.

FIG. 27A illustrates an example by which the pivotable range of the guide rail 28 is limited. The hopper table 1 has stoppers 36 on the side surface thereof to limit the turn of the guide rail 28.

As shown in FIG. 27b, the elongated hole 32 in which the protrusion 34 of the hopper table 1 is fitted may provide a stopper function. If the elongated hole 32 has a vertical dimension greater than that of the protrusion 34, the guide rail 28 is freely pivotable within this range.

As shown in FIG. 27c, it is also possible to arrange two pairs of elongated holes 32 and the projections 34 on either side of the pin 30 and the hole 29, and to provide stoppers on front and rear sides of the rotary fulcrum (hole) 29. By providing the stopper on either side of the pin 30 and the hole 29, it is possible to decrease the amount of change in the stopper positions caused by deformation of the hopper table 1 and the guide rail 28 under the loaded condition. The permissible amount of pivot of the guide rail 28 should be determined by taking into consideration the amount of deformation to be absorbed for the casing 100.

Figure 28:
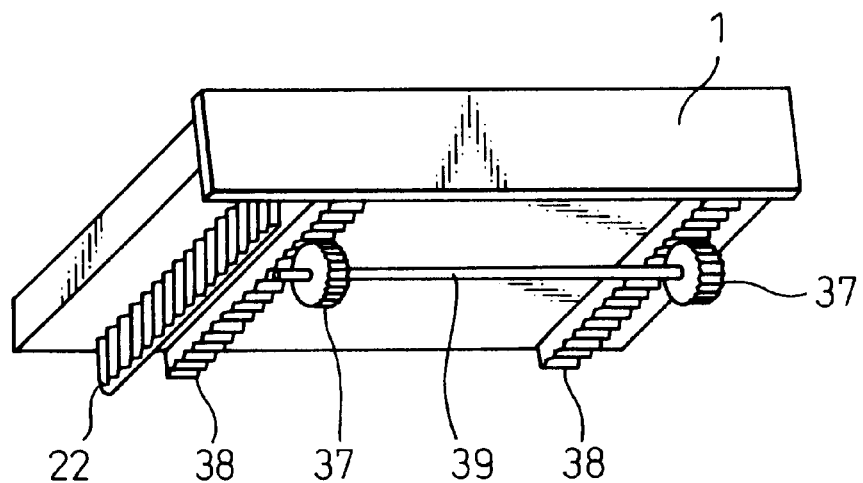
FIG. 28 is a perspective bottom view of the hopper table having the driving rack and the additional racks.

FIG. 28 shows the lower surface of the hopper table 1, which has the rack 22 in mesh with the gear 23 (G10) of the loading mechanism 20b to transfer the driving force of the motor 21 to the hopper table 1. The hopper table 1 also has a pair of second racks 38 extending parallel to the first rack 22 and parallel to each other. The first rack 22 is arranged on the lower surface of the hopper table 1 near one side thereof at which the pivotable guide rail 28 (not shown in FIG. 28) is arranged. (The first rack 22 is shown on the left side of the hopper table 1 in FIGS. 28 and 29, in a similar manner to FIG. 10.)

One of the second racks 28 is arranged near the first rack 22 and the other rack 28 is arranged near the opposite side of the hopper table 1, and the distance between the second racks 28 is greater than the width of the hopper table 1. The second racks 38 are engaged with pinions 37 carried by a common and free pinion shaft 39 which is rotatably supported by the casing 100.

The hopper table 1 receives a driving force at only one side thereof by the first rack 22 and tends to be distorted when the hopper table 1 is moved to open and close. Therefore, it is difficult to move the hopper table 1 while maintaining both its sides in the parallel relationship if the second racks 38 are not provided. However, in this embodiment, any force acting on one side of the hopper table 1, which may be derived from the first rack 22, is transmitted to the opposite side of the hopper table 1 via the second racks 38, the pinions 37 and the pinion shaft 39, so the hopper table 1 can be stably moved without distortion, even if the hopper table 1 receives a driving force at only one side thereof from the first rack 22.

Figure 29:
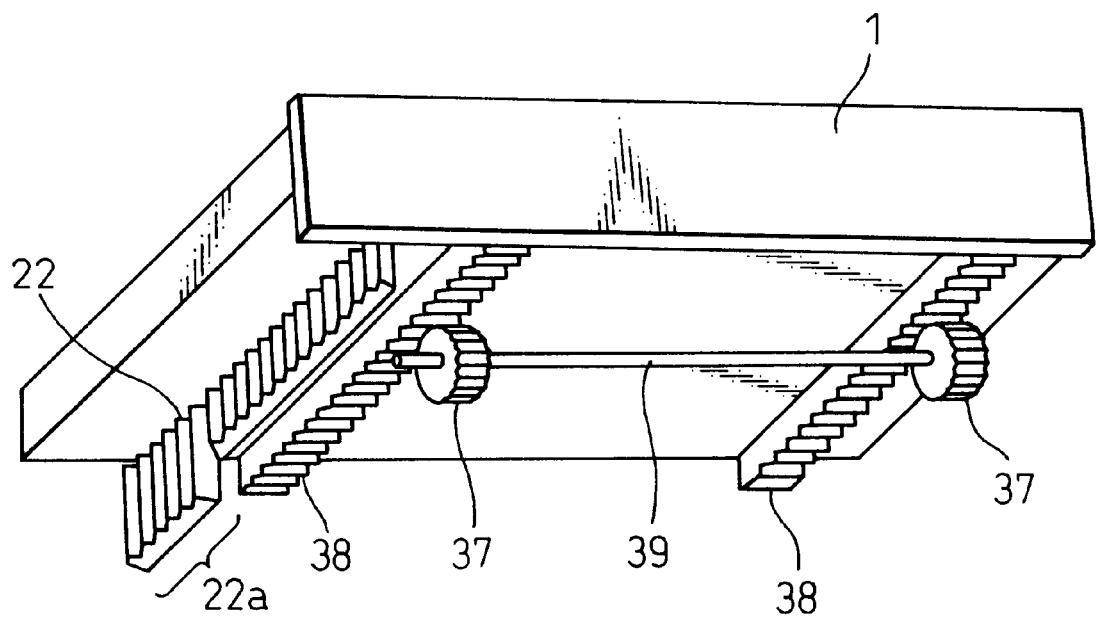
FIG. 29 is a perspective bottom view of the hopper table having the rack with different height portions and the additional racks.
Figure 30:
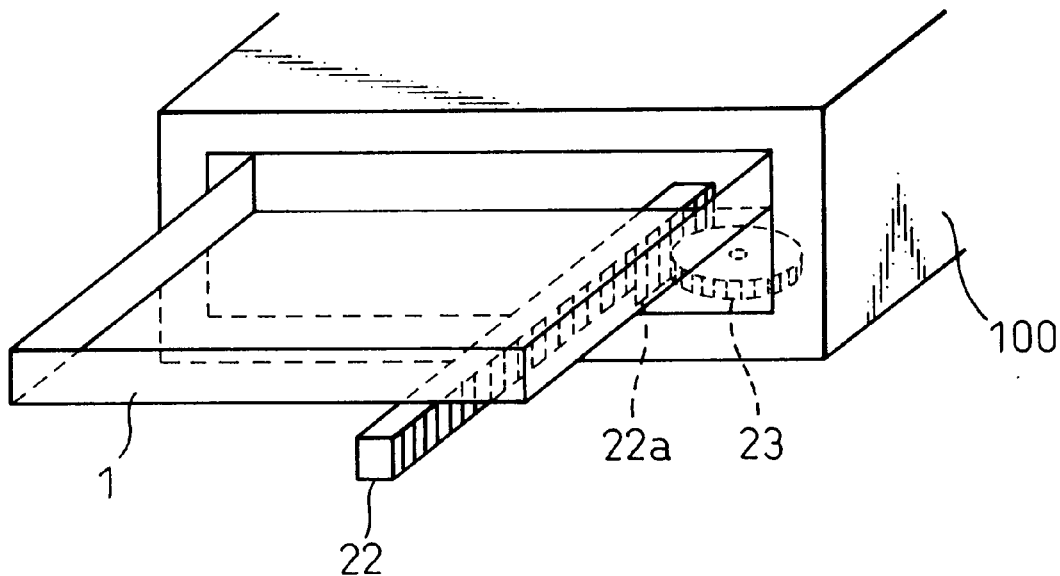
FIG. 30 is a perspective view of the apparatus having the rack of FIG. 29.
Figure 31:
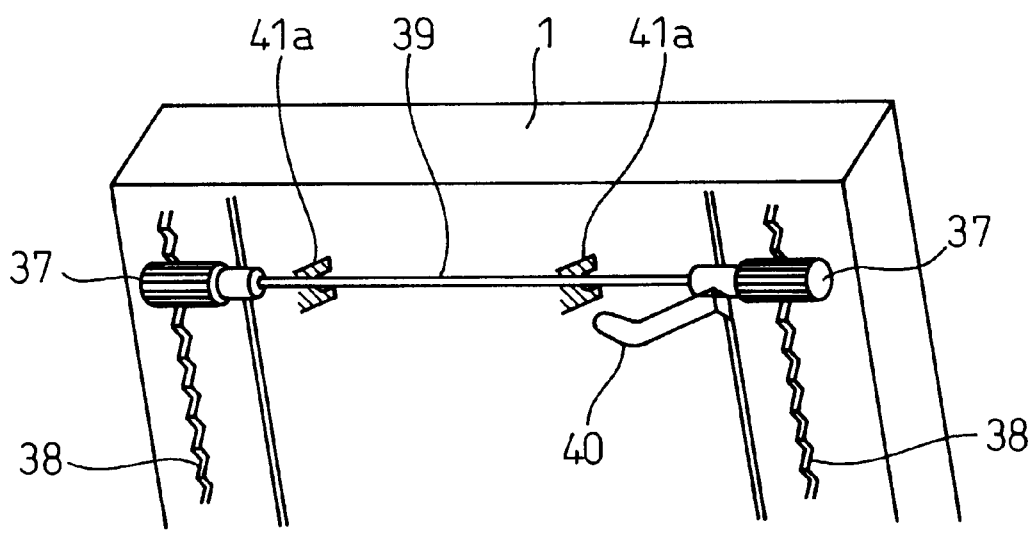
FIG. 31 is a perspective view of the hopper table with the pinion shaft and the leaf spring for upwardly urging the pinion shaft.
Figure 33A:
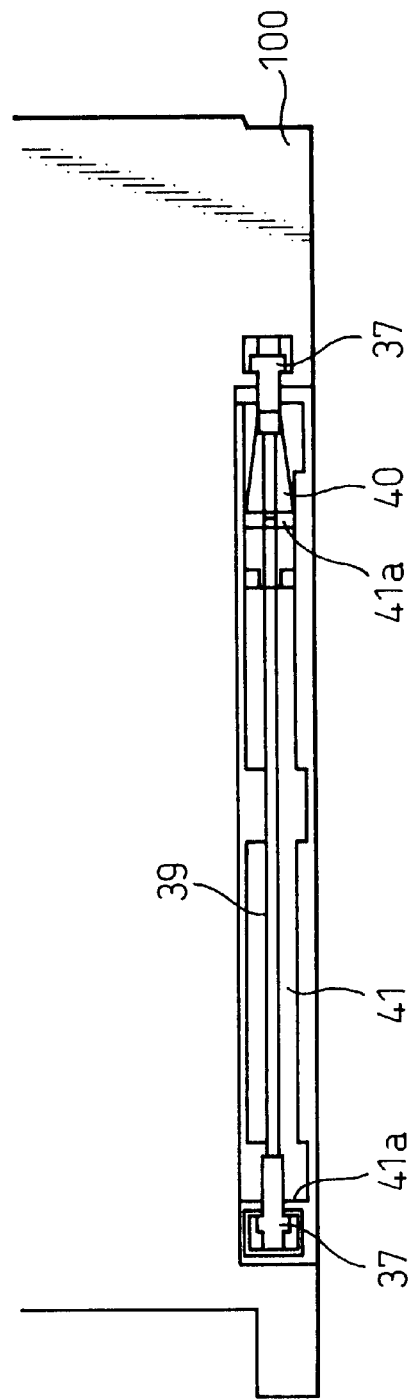
FIG. 33A is an enlarged plan view of a portion of the apparatus of FIG. 32.
Figure 33B:
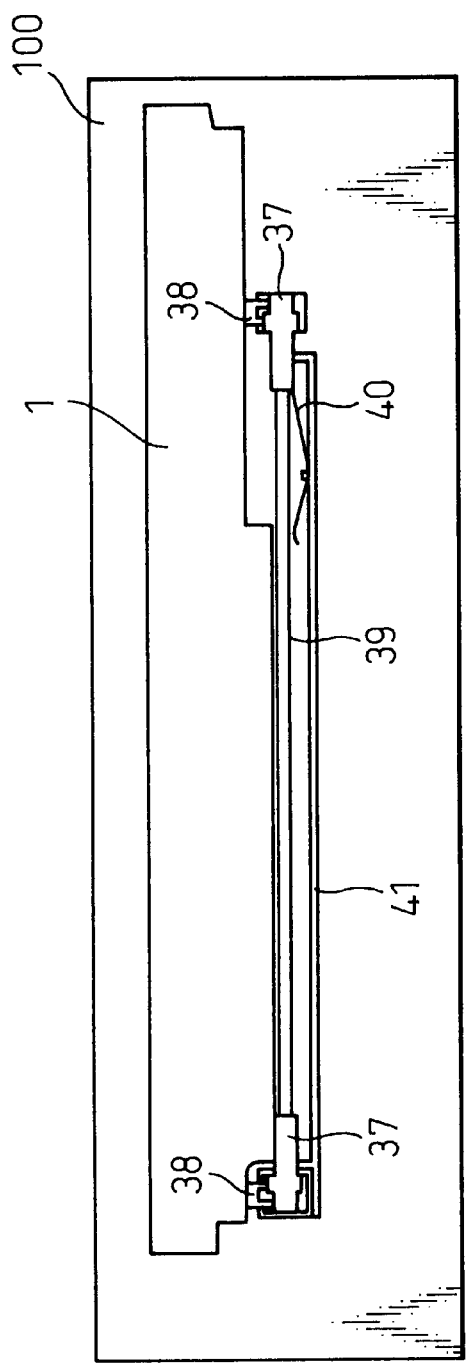
FIG. 33B is a view of the apparatus of FIG. 33A.

FIGS. 29 and 30 show a modification of the hopper table 1 of FIG. 28. The first rack 22 is shown on the left side of the hopper table 1 in FIG. 29, as described above, but the first rack 22 is correctly shown on the right side of the hopper table 1 in FIG. 30. In this case, the first rack 22 comprises a rear portion 22a having a height greater than that of the remaining portion of the first rack 22. The rear portion 22a stays inside the casing 100 when the hopper table 1 is completely opened. Since the guide rail 28 is pivotable relative to the hopper table 1, as described above, the front end of the hopper table 1 may tilt down and the rear end of the hopper table 1 may tilt up when the hopper table 1 is opened. If the first rack 22 has a small height, the rear end of the rack 22 may be disengaged from the driving gear 23. The first rack 22 should have an increased height to prevent this problem, but it is desirable to decrease the height of the first rack 22 to obtain the hopper table 1 in a compact design. Therefore, it is not possible to increase the height of the first rack 22 too much.

In this embodiment, the first rack 22 has an increased height in the rear portion 22a thereof that stays in the casing 100 and the remaining portion of the first rack 22 has a decreased height and it is possible to decrease the height or the thickness of the hopper table 1. The first rack 22 is less likely to be disengaged from the gear 23 when the hopper table is completely opened, and the hopper table 1 is not tilted compared with when the hopper table is retracted into the casing 100.

Figure 34A:
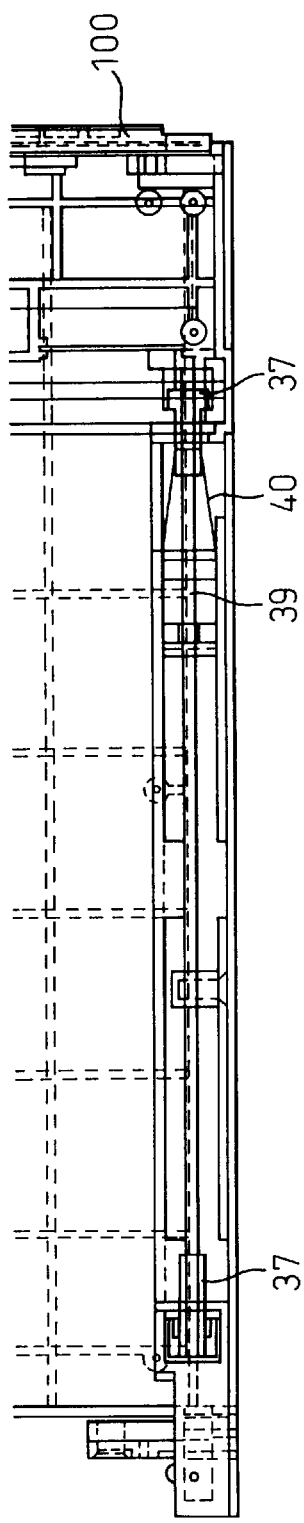
FIG. 34A is a view corresponding to FIG. 33A, illustrating the apparatus in a greater detail.
Figure 34B:
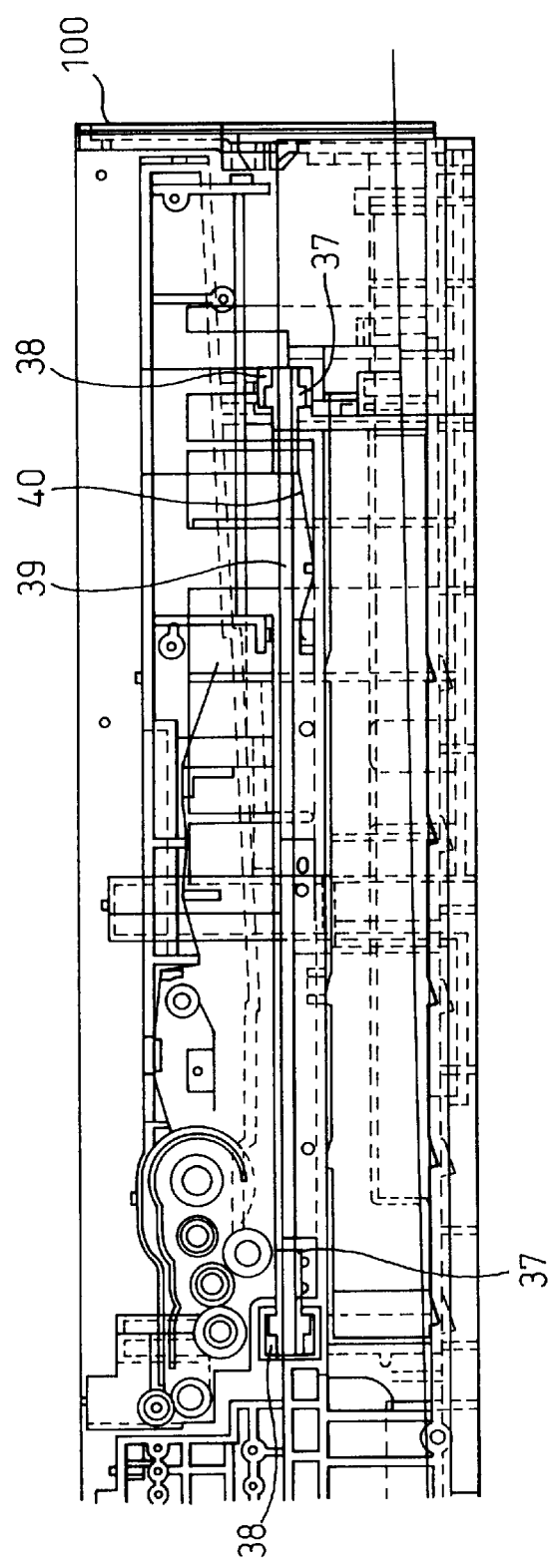
FIG. 34B is a side view of the apparatus of FIG. 34A.

FIGS. 31 to 33B show a further modification of the image reading apparatus. FIGS. 34A and 34B show the apparatus in a greater detail. In this case, pushing means 40 such as a spring or the like is arranged to push the pinion shaft 39 at a position on the side of the guide rail 28, so that the pinions 37 are pushed against the racks 38. The racks 38 are reliably engaged with the pinions 37 even when the hopper table 1 is opened, and the hopper table 1 can be stably opened and closed. The pushing means 40 comprises a leaf spring in the illustrated embodiment. The pushing means 40 may be mounted on both sides of the pinion shaft 39.

In FIGS. 32 to 34B, the casing 100 has a groove 41 to accommodate the pinion shaft 39 at the front area of the casing 100 above the stacker 2. The groove 41 includes bearing portions 41a to rotatably support the pinion shaft 39, and openings 41b through which the second racks 38 pass to engage with the pinions 37. The pinion shaft 39 is pushed upwards by the leaf spring 40. Owing to this constitution, the second racks 38 and the pinions 37 are not disengaged from each other even when the hopper table 1 is completely opened and the end of the hopper table 1 moves down accompanying the rotation of the guide rail 28.

FIGS. 35A and 35B show the hopper table 1 in the greater detail. The hopper table 1 has the first rack 22 and the second racks 38. The side guides 101 and the rack-and-pinion mechanism 102 are also shown in FIGS. 35A and 35B.

Figure 36A:
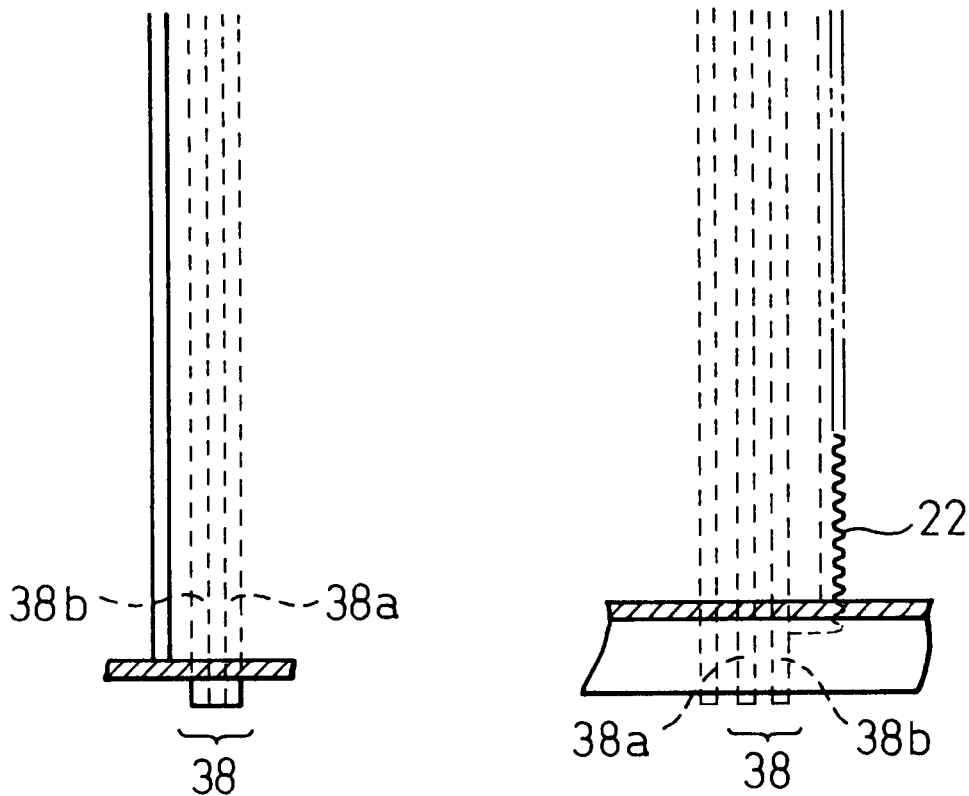
FIG. 36A is a plan view of the driving rack and the double-row racks.
Figure 36B:
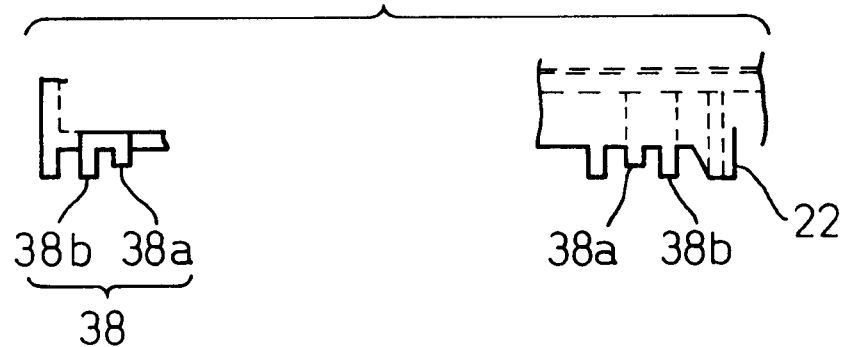
FIG. 36B is a front view of the driving rack and the double-row racks of FIG. 36A.
Figure 37A:
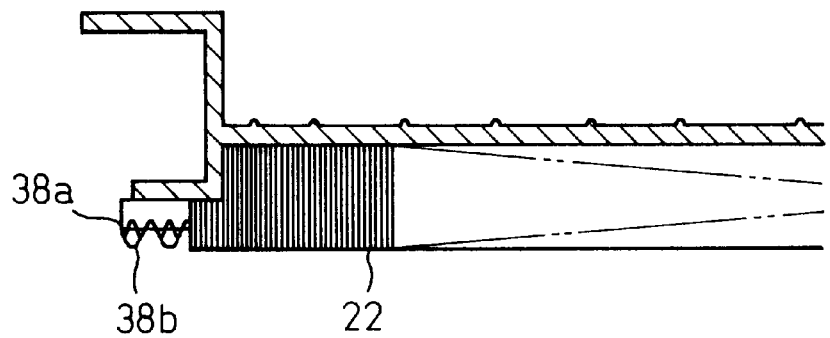
FIG. 37A is an enlarged side view of a portion of the driving rack and the double-row rack of FIG. 36A.
Figure 37B:
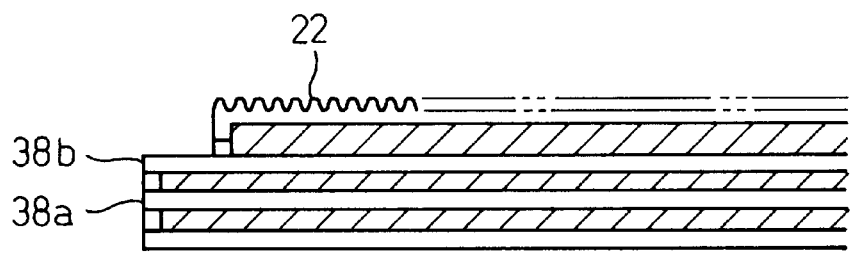
FIG. 37B is a plan view of the driving rack and the double-row rack of FIG. 37A.

FIGS. 36A to 37B show the second racks 38 in the greater detail. FIG. 36A is a plan view of the hopper table 1 and FIG. 36B is a front view of the hopper table 1. FIG. 37A is a side view of the first and second racks 22 and 38 and FIG. 37B is a bottom view of the first and second racks 22 and 38.

Each of the second racks 38 comprises a double-row rack comprising an inner rack 38a and an outer rack 38b extending adjacent to and parallel to each other. That is, teeth are provided in each of the inner and outer racks 38a and 38b. The inner rack 38a has a height lower than that of the outer rack 38b, i.e., the outer rack 38b is formed as a high-groove rack.

Figure 38:
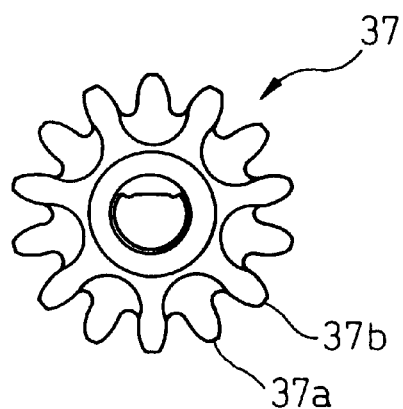
FIG. 38 is a plan view of the gear for engaging with the double-row rack of FIGS. 36A to 37B.

FIG. 38 shows the pinion 37 having two concentric teeth portions 37a and 37b adapted to engage with the inner and outer racks 38a and 38b of the second rack 38. One teeth portion 37a comprises an ordinary involute gear to be in mesh with the inner rack 38a and the other teeth portion 37a comprises a high-toothed gear having teeth of a large height to be in mesh with the outer rack 38b. The pitch of the high-toothed gear 37b corresponds to that of the outer rack 38b. The height of teeth of the outer rack 38b is higher than the height of teeth of the inner rack 38a, and the pitch of teeth of the outer rack 38b is larger than the pitch of the inner rack 38b. In the embodiments the pitch of teeth of the outer rack 38b is almost twice as great as the pitch of the inner rack 38b.

The second racks 38 may be still disengaged from the pinions 37 when the hopper table 1 is forcibly pushed down, even if the above mentioned pushing means 40 is used. By constructing the second racks 38 and the pinions into two rows of teeth 38a–38b and 37a–37b, it is possible to enhance the engaging relationship between the racks and the pinions. At least the high-groove outer rack 38b and the high teeth portion 37b are not disengaged from each other, and thus the teeth of the racks do not become detached from and jump over the teeth of the pinions even when the hopper table 1 is forcibly pushed down in the open position.

In addition, the allowable pivot angle of the guide rail 28 is controlled by the stopper (such as those shown in FIGS. 27A to 27C) and is set depending upon the height of the teeth of the rack and the pinion so as to prevent the teeth of the racks and the pinions from jumping from each other. That is, the allowable pivot angle of the guide rail 28 is set so that the jumping of the teeth will not occur between the rack and the pinion. Thus, the jumping of the teeth of the rack and the pinion is prevented.

Figure 39:
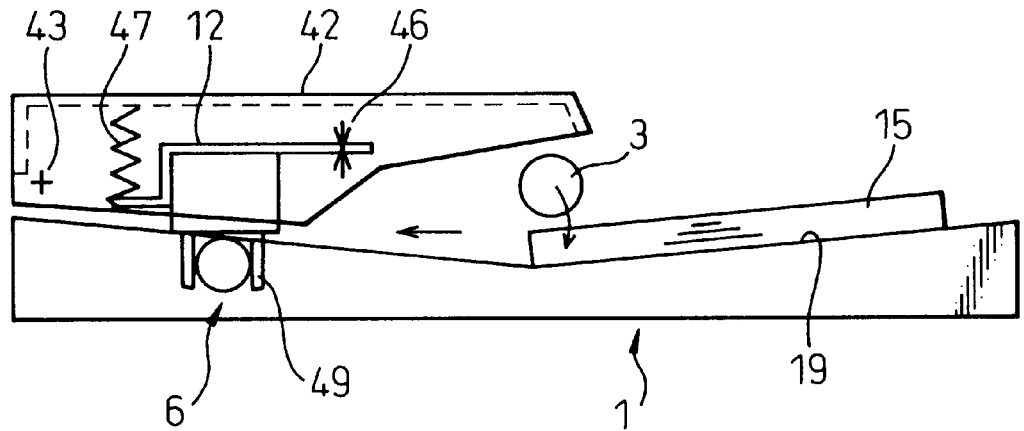
FIG. 39 is a front view of the hopper table having the pivotable top cover.
Figure 40:
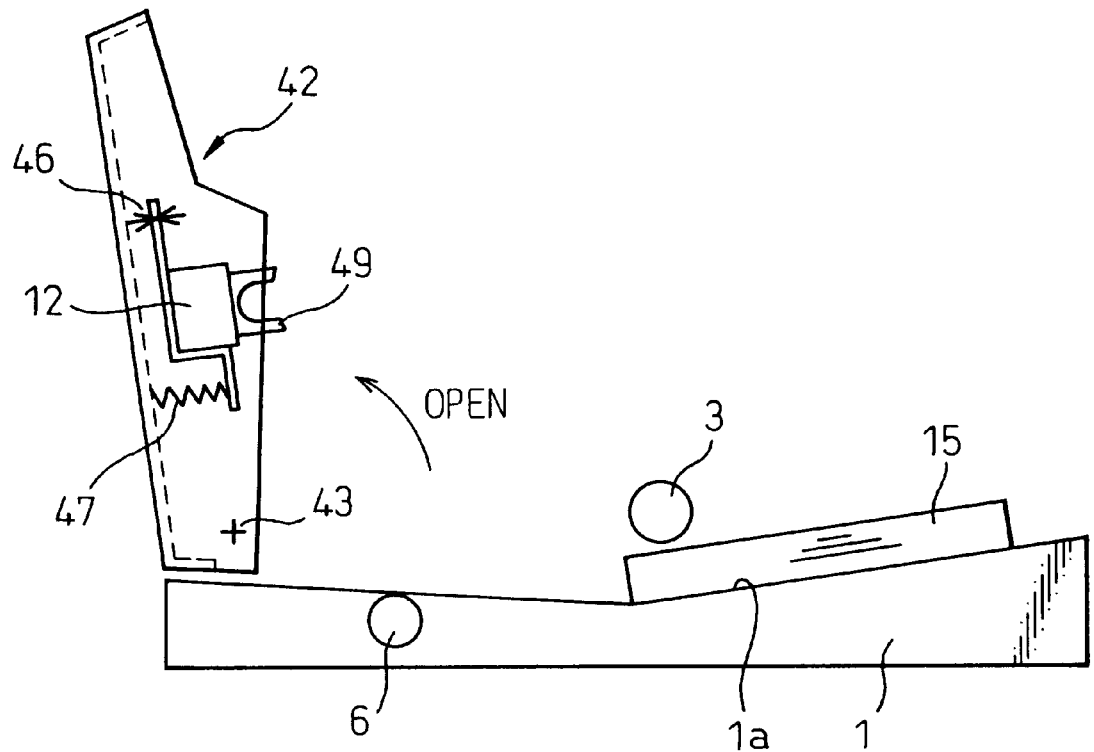
FIG. 40 is a front view of the hopper table with the top cover opened.

FIGS. 39 and 40 show the structure for attaching the reading head 12 to the hopper table 1. The reading head 12 is supported by a top cover 42 which is pivotally mounted to the hopper table 1. The top cover 42 can be pivotably about a pivot 43 between the closed position (FIG. 39) and the open position (FIG. 40). Since the pivot 43 is positioned near one end of the hopper table 1 on the opposite side from the hopper 1a, the conveying path in the hopper table 1 can be fully revealed to obtain access to jammed documents by opening the top cover 42. Therefore, it is possible to easily remove the documents if the documents are jammed in the hopper table 1. On contrast, if the pivot 43 of the top cover 42 is located near the hopper 1a, the conveying path cannot be completely revealed and the jammed documents are not easily removed.

The reading head 12 is supported by the top cover 42 via a fulcrum 46 and biassed downwards (toward the conveying roller 6) by a spring 47. Therefore, it is possible to bring the head 12 into the open position by a single operation of the top cover 42. The conveying roller 6 is arranged on the hopper table 1 below the reading head 12 in an opposed relationship with the reading head 12 when the top cover 42 is closed and acts as a platen. The documents 15 to be read are fed along the conveying path between the conveying roller 6 and the reading head 12. The reading head 12 is stationary and may provide an uncontrollable braking effect to the conveying force while the documents are being conveyed. The fulcrum 46 is arranged at one end of the reading head 12 on the side of the hopper 1a, and this arrangement is advantageous in reducing the braking effect or load, compared with the case where the fulcrum 46 is arranged on the opposite side of the hopper 1a, i.e., near the pivot 43. Therefore, the arrangement of FIGS. 39 and 40 is advantageous in fully revealing the conveying path when a jam occurs as well as in reducing the braking effect.

Figure 41:
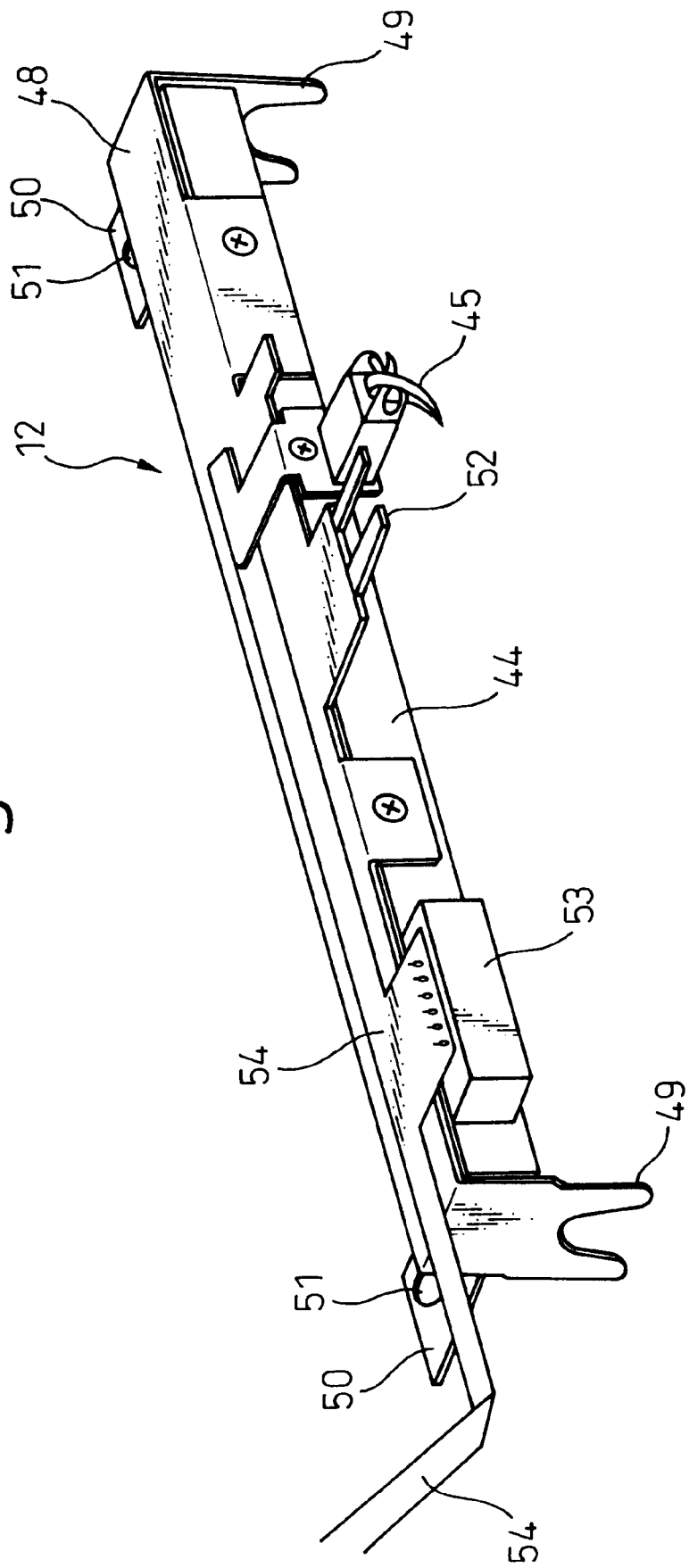
FIG. 41 is a perspective view of the reading head.
Figure 42:
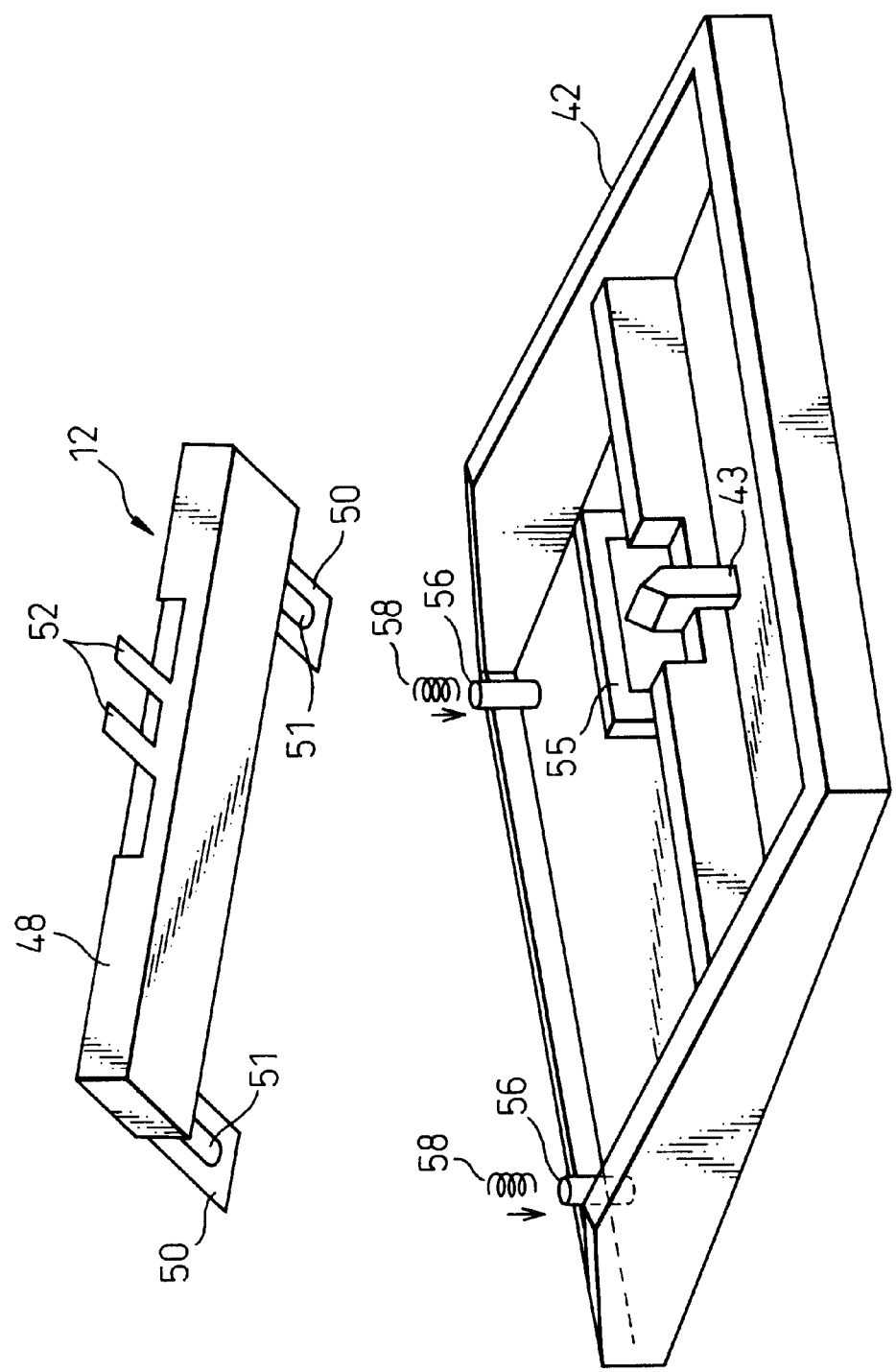
FIG. 42 is a perspective view of the top cover and the reading head in a vertically inverted position.
Figure 43:
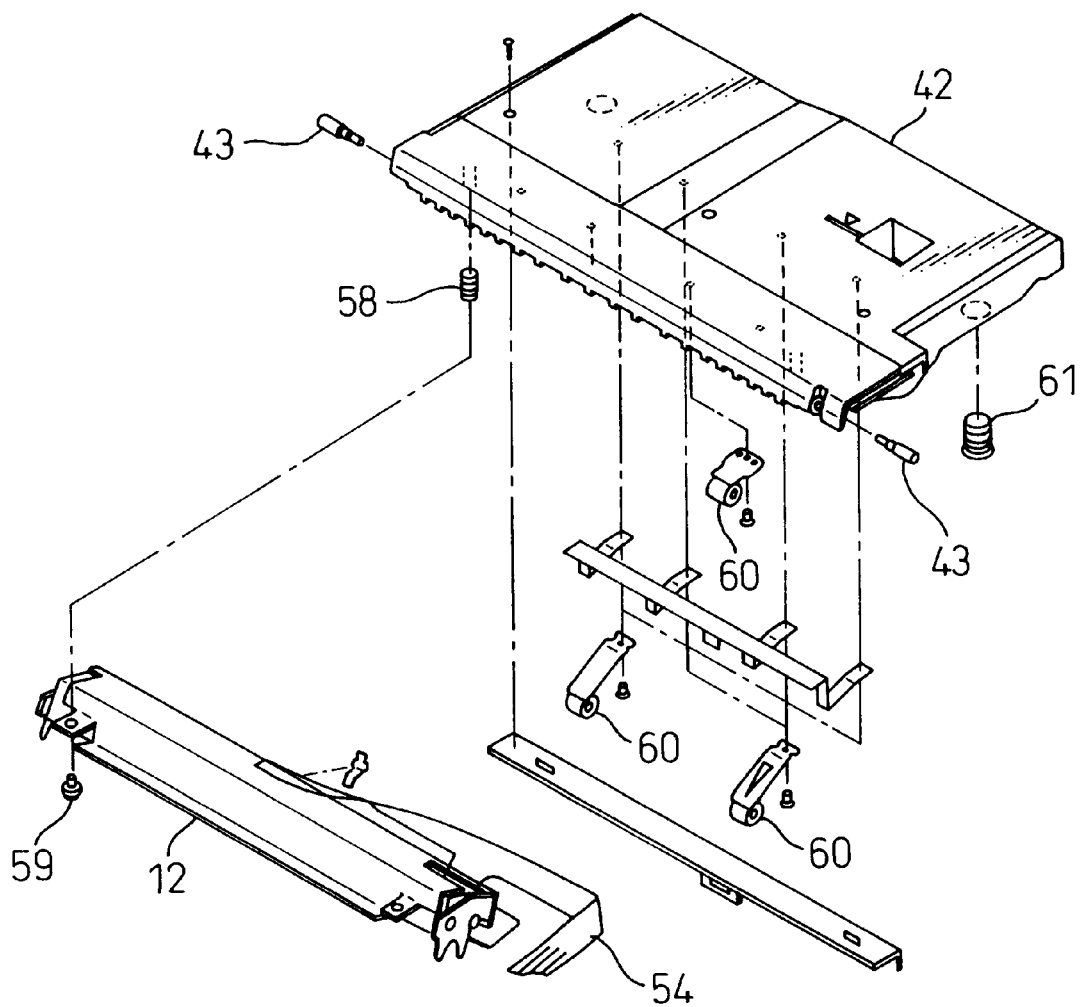
FIG. 43 is a perspective view of the top cover and the reading head.

FIGS. 41 to 43 show the detailed arrangement of the reading head 14 and the top cover 42. The reading head 12 comprises an elongated frame 48, an image sensor 44 and a paper sensor 45 attached to the frame 48. The image sensor 44 is of a known type which can read information on the document, and the paper sensor 45 detects the position of the document to determine the timing according to which the reading head 12 reads information on the document. The reading operation can be carried out in a known manner, and the detail thereof is not described here.

The frame 48 is made from a bent steel plate or the like, and has depending tongues 49 in the shape of claws at both ends of the elongated frame 48 and stoppers 50. The depending tongues 49 are designed, in the assembled condition, to cover the shaft of the conveying roller 6 so that the claws of the depending tongues 49 pinch the shaft of the conveying roller 6 to position the reading head 12 in the sub-scanning direction (lengthwise direction of the document). The stoppers 50 are arranged near the depending tongues 49 and extend generally parallel to and perpendicular to the frame 48, and have elongated holes 51. The frame 48 also has a stopper 52 at the central region of the frame 48. The stopper 52 comprises a pair of ribs forming a groove therebetween and serves as a fulcrum when the reading head 12 is mounted to the top cover 42.

The image sensor 44 is attached to the frame 48 by screws, and has an output terminal 53 which is connected to a flexible printed circuit cable (FPC cable) 54. The paper sensor 45 is attached to the frame 48 by screws, and has an output terminal which is also connected to the FPC cable 54.

The timing for starting the reading operation by the image sensor 44 is determined based upon the output of the paper sensor 45, as described above. It is therefore necessary to arrange the image sensor 44 and the paper sensor 45 at an exact positional relationship therebetween. However, the reading head 12 in the embodiment is not fixed to the hopper table 1 but is floatingly supported. If the paper sensor 45 is attached to the hopper table 1, it is not possible to ensure an exact positional relationship between the paper sensor 45 and the image sensor 44. In the embodiment, the image sensor 44 and the paper sensor 45 are attached to the common frame 48, so it is possible to enhance the positional precision between the image sensor 44 and the paper sensor 45. By forming the frame 48 using a highly rigid material such as a steel plate, it is possible to prevent deterioration in the positional precision caused by distortion of the frame 48.

As shown in FIG. 42, the top cover 42 has a protrusion 46 having a triangular shaped top serving as a fulcrum, a head restraining member 55, and guide pins 56. The top cover 42 further has holes (not shown) at the ends of its side walls to receive the pivot 43 for mounting the top cover 42 on the hopper table 1. For assembling the reading head 12 onto the top cover 42, the stopper 52 of the reading head 12 is passed through the head restraining member 55 so that the reading head 12 will not be suddenly-disengaged during operation, and fitted on the triangular protrusion 43. Compression springs 58 are fitted around the guide pins 56 so that the image sensor 44 is pushed against the conveying roller 6 with a suitable pressure, and the stoppers 50 of the reading head 12 are applied to the guide pins 56 of the top cover 42 so as to insert the guide pins 56 in the elongated holes 51. Screws 59 are then fitted in the guide pins 56. The reading head 12 is thus mounted to the top cover 42 so that the reading head 12 will not be removed. The protrusion 43 and the springs 58 correspond to the fulcrum 46 and the spring 47 in FIGS. 39 and 40.

The stopper 52 of the reading head 12 that is fitted to the protrusion 46 restricts the motion of the reading head 12 in the main scanning direction (direction of the width of the paper), but freedom of movement in the sub-scanning direction (lengthwise direction of the paper or the conveying direction) is imparted. Similarly, since the stoppers 50 are provided with the elongated hole 51, the reading head 12 is allowed to have freedom of movement in the sub-scanning direction at the acting points of the springs 58. In order that the document can be read in an optimum condition, the image sensor 44 must be located at a predetermined position. The illustrated embodiment makes it possible to ensure an exact positional relationship between the image sensor 44 and the conveying roller (platen) 6. Owing to the action of the springs 58 fitted around the guide pins 56, the image sensor 44 is pushed against the conveying roller 6 at all times.

FIG. 43 shows the reading head 12 and the top cover 42, viewed from above the top cover 42, and the top cover 42 with the reading head 12 is attached to the hopper table 1 in this position. The reading head 12 is attached to the top cover 42 by screws 59. The top cover 42 is pivotally attached to the hopper table 1 by the pivots 43. The top cover 42 includes pinch rollers 60. In addition, a magnet catch 61 is embedded in the top cover 42.

Figure 44A:
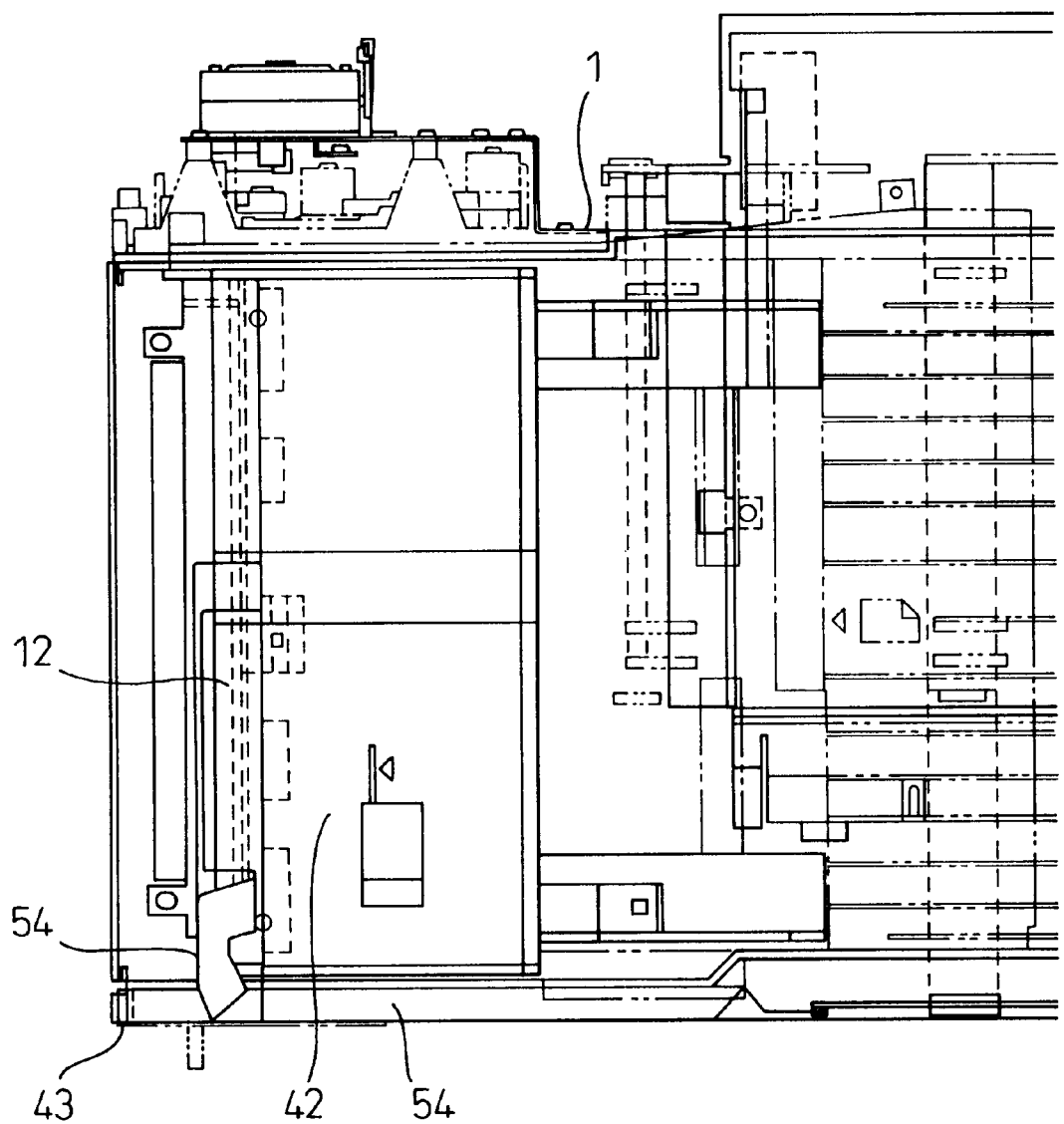
FIG. 44A is a plan view of the hopper table having the guide for the FPC cable.
Figure 44B:
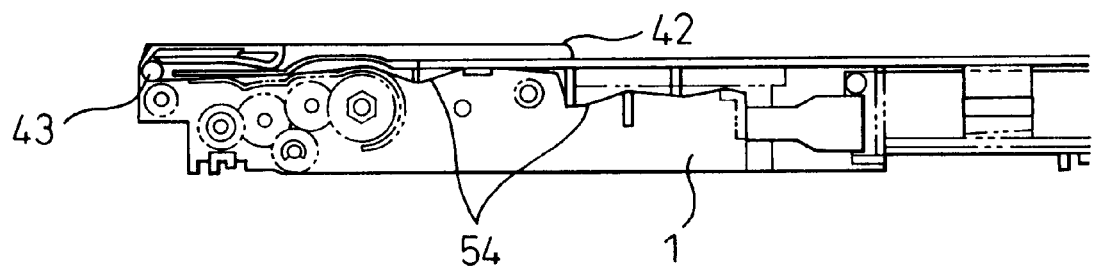
FIG. 44B is a side view of the hopper table of FIG. 44A.

FIGS. 44A and 44B show the detailed structure of the top cover 42 and the hopper table 1. The FPC cable 54 is connected to the image sensor 44 and the paper sensor 45 and extends along the upper surface of the frame 48 of the reading head 12 beyond one end of the frame 48, as shown in FIGS. 41 and 43. The FPC cable 54 then extends along the lower surface of the top cover 42 (or along the groove formed in the top cover 42) toward the pivot 43, and is bent around the pivot 43 between the top cover 42 and the hopper table 1, as shown in FIGS. 44A and 44B. The FPC cable 54 then extends rightwards in the drawing. The FPC cable 54 is thus passed around the pivot 43 of the top cover 42 and is drawn from the top cover 42. Therefore, when the top cover 42 is opened or closed, any undesirable load is not exerted on the FPC cable 54 and thus the FPC cable 54 is not damaged. The FPC cable 54 further extends from the top cover 42 to the casing 100.

Figure 45:
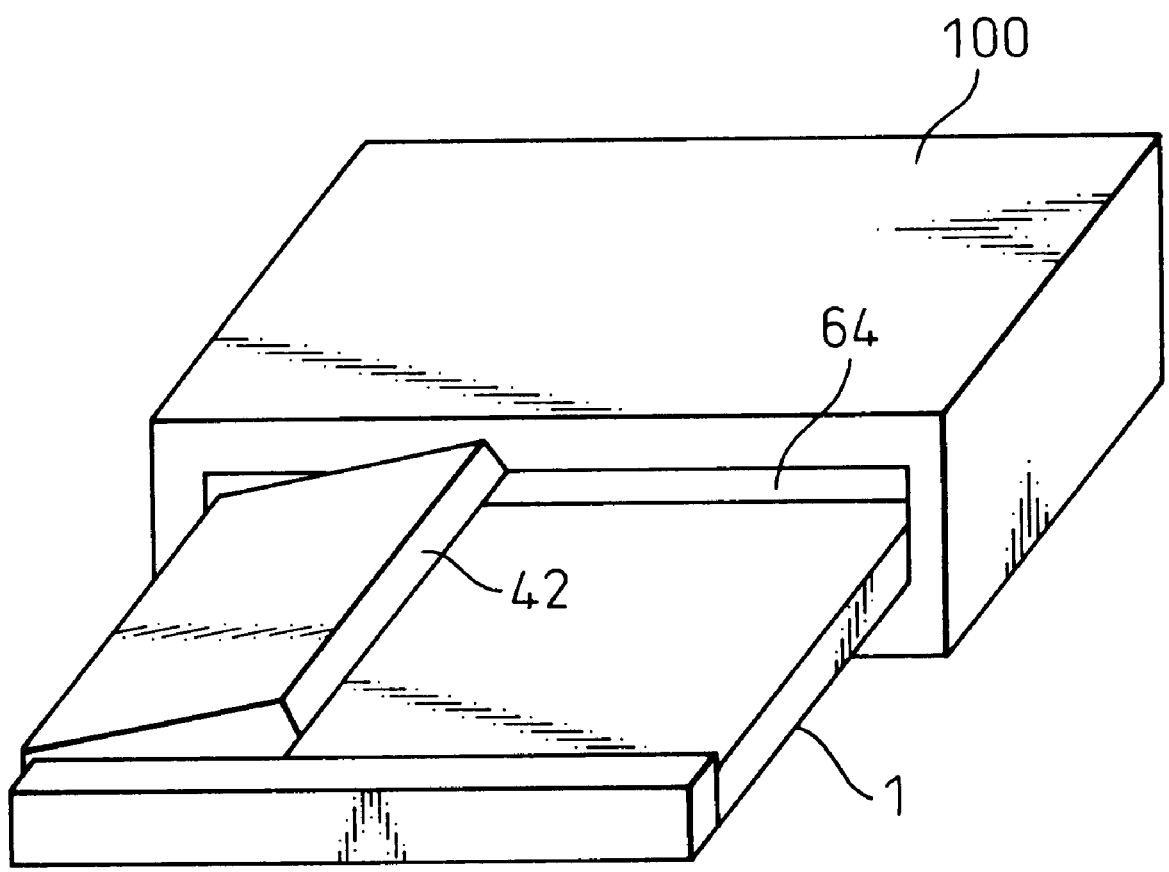
FIG. 45 is a perspective view of an example of the image reading apparatus having the top plate.

The top cover 42 of the hopper table 1 always receives an upward reaction force due to the pressure of the pinch rollers, and tends to be moved up. The top cover 42 may remain in a slightly tilted-up position, as shown in FIG. 45. If the top cover 42 remains in such a position, the top of the top cover 42 comes into contact with the wall of the cavity 64 of the casing, and it is difficult to close the hopper table 1. In addition, if the top cover 42 is in a slightly tilted-up position when the hopper table 1 is inside the casing 100, there is a possibility that the documents are not be appropriately conveyed due to a lack of pinching pressure, and jamming may occur. Moreover, if the top cover 42 opens within the casing 100 due to vibration or any other reason, the top cover 42 is caught by the mechanism inside the casing 100 and it may become difficult to pull out the hopper table 1.

Figure 46A:
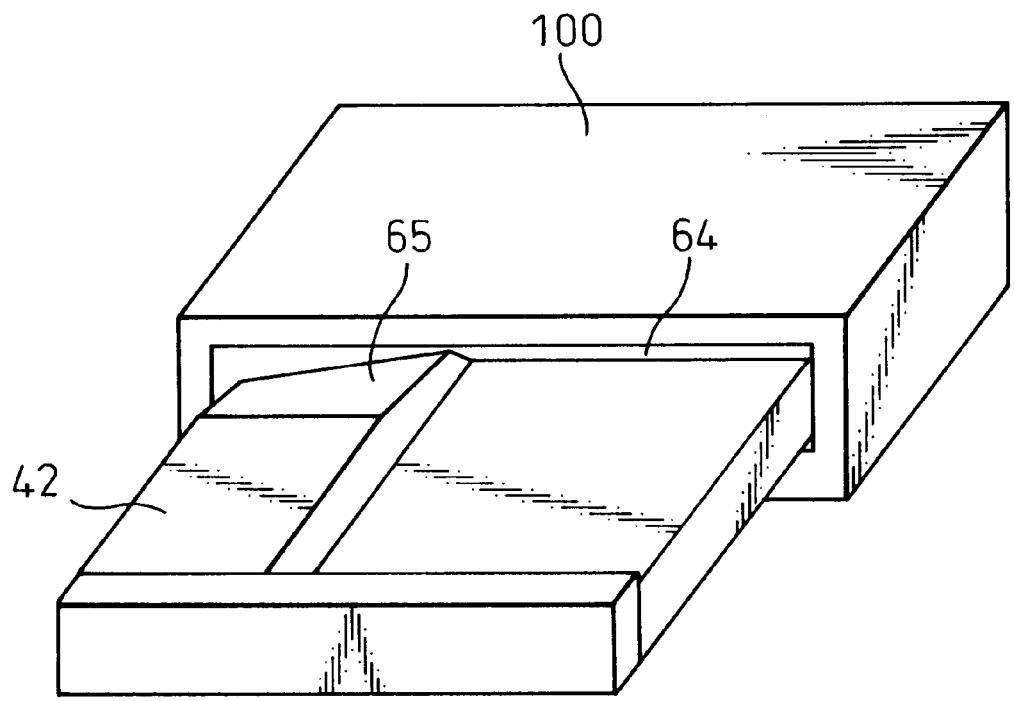
FIG. 46A is a perspective view of an example of the image reading apparatus and the top cover having the top plate with a tapered upper surface.
Figure 46B:
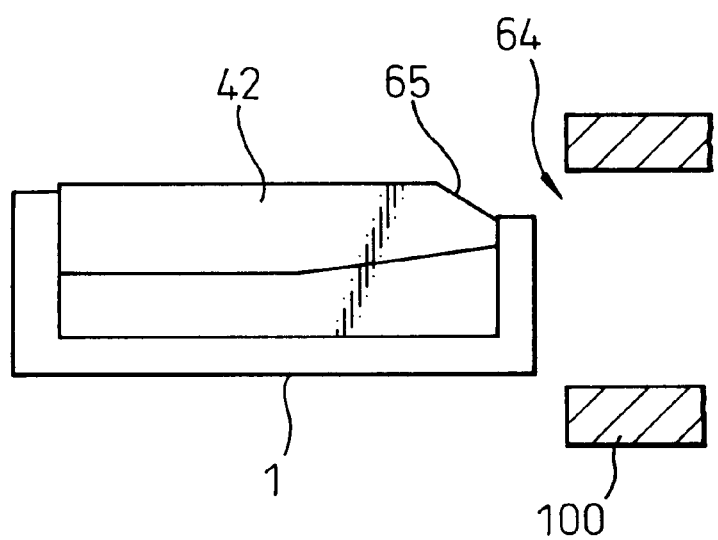
FIG. 46B is a side view of the apparatus of FIG. 46A.

FIGS. 46A and 46B illustrate means for solving such a problem. FIG. 46A is a perspective view of the apparatus and FIG. 46B is a side view of the apparatus when the hopper table 1 is inserted into the casing 100. A taper 65 is formed on the upper surface of the top cover 42 at a rear portion thereof. Therefore, the taper 65 of the top cover 42 allows the hopper table 1 to be smoothly and easily inserted into the cavity 64, even if the top cover 42 is in a slightly tilted-up position.

Figure 47A:
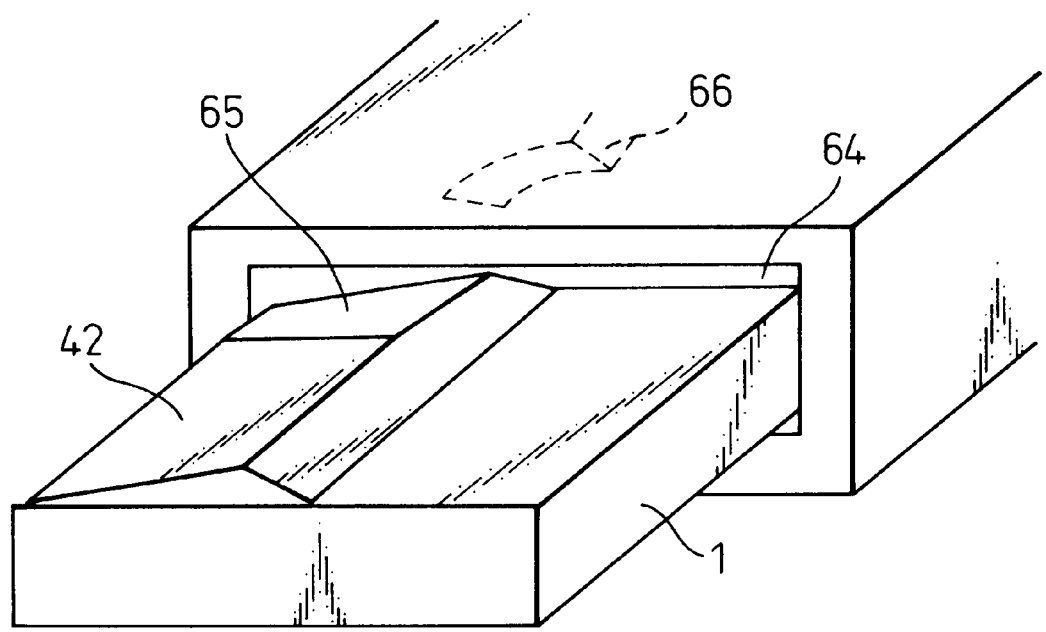
FIG. 47A is a perspective view of another example of the image reading apparatus having the top plate and the spring.
Figure 47B:
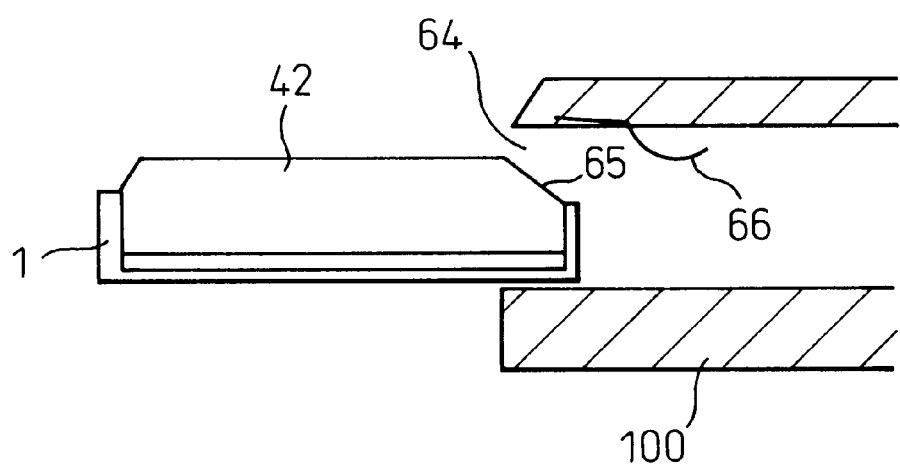
FIG. 47B is a side view of the apparatus of FIG. 47A.

Referring to FIGS. 47A and 47B, a taper 65 is formed on the upper surface of the top cover 42, and in addition, a spring 66 is arranged on the upper wall of the cavity 64 of the casing 100. The spring 66 exerts a downward pressure to overcome the reaction force prevailing in the top cover 42. The spring 66 pushes the top cover 42 down so that an appropriate pinching pressure is maintained between the conveying and pinch rollers to properly convey the documents. The spring 66 also functions so that the cover can be properly opened without the cover being clogged by the mechanism inside the casing 100.

The pressure of the spring 66 gradually increases from the rear side toward the front side of the top cover 42 according to the taper 65 thereof, and does not cause any load on the loading mechanism 20b when the hopper table 1 is pushed into the casing 100. The spring 66 is preferably a leaf spring but any other spring can be used.

When the hopper table 1 is opened and closed, the spring 66 may slide on the upper surface of the top cover 42 and traces may be produced. In particular, when the top cover 42 is made from a molded product the surface thereof is scraped. The scraped surface may be damaged.

Figure 48:
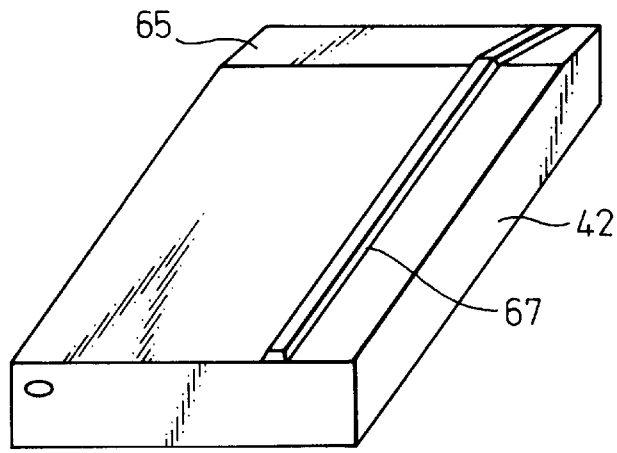
FIG. 48 is a perspective view of a further example of the top cover having the top plate with a tapered upper surface.

As shown in FIG. 48, therefore, a linear pad 67 is formed on the upper surface of the top cover 42 at a position where the spring 66 comes into contact, so that traces will not appear so conspicuously. The patch 67 is raised from the scraped surface of the top cover 42 and the portion of the pad 67 is not scraped.

Figure 49A:
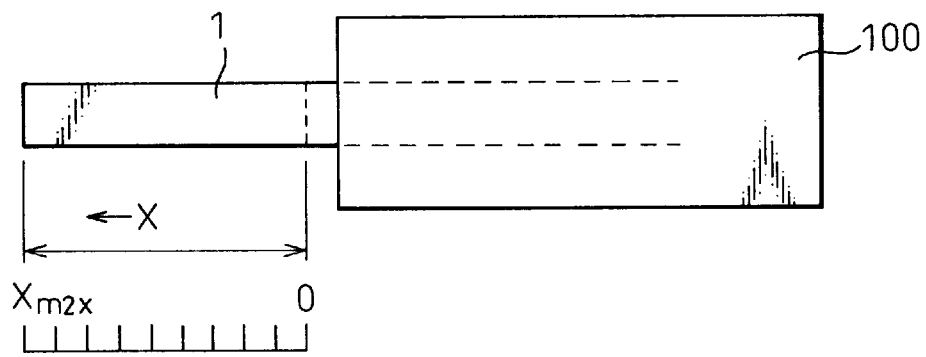
FIG. 49A is a view illustrating the stroke of the hopper table.
Figure 49B:
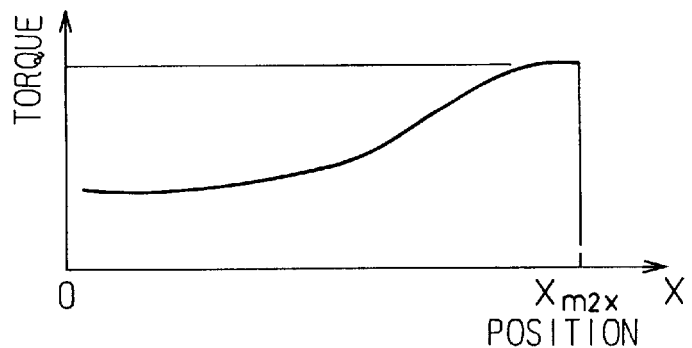
FIG. 49B is a view illustrating the relationship between the stroke of the hopper table and the load torque of the motor.

FIGS. 49A and 49B illustrate a relationship between the position of the hopper table 1 and the load torque of the motor 21 necessary to move the hopper table 1. These figures show that the load torque of the motor 21 changes depending upon the position of the hopper table 1 when the hopper table is automatically loaded. The load torque increases when the hopper table 1 is near the fully open position. Therefore, if the force of the spring 66 or the like is exerted on the hopper table 1 when it is near the fully open position, the torque margin of the motor 21 is considerably consumed. This is a problem from the standpoint of safety.

Figure 50A:
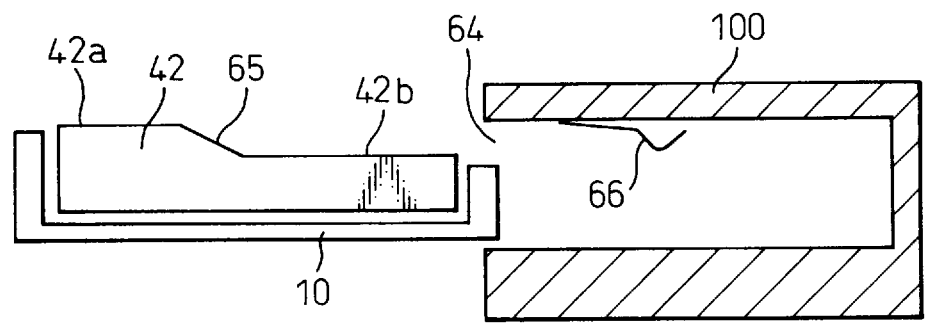
FIG. 50A is a side view of a further example of the image reading apparatus having the top plate with a tapered upper surface.
Figure 50B:
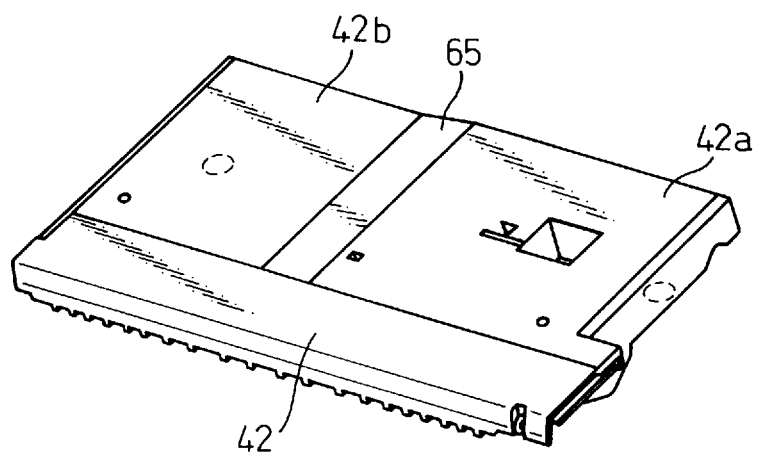
FIG. 50B is a perspective view of the hopper table of FIG. 50A.

As shown in FIGS. 50A and 50B, therefore, the top cover 42 is formed in such a shape that the upper surface of the top cover 42 comprises a first portion 42a, the second portion corresponding to the taper 65, and the third portion 42b. The third portion 42b, which is on the leading side when the top cover 42 is closed, is lower than the first portion 42a. Therefore, the force of the spring 66 is not so great on the top cover 42 when the third portion 42b is brought into the position of the spring 66, and the force of the spring 66 is greater on the top cover 42 when the first portion 42a is brought into the position of the spring 66. In addition, when the third portion 42b is brought into the position of the outer edge of the wall of the cavity 64 of the device body, the top cover 42 may not slide against the wall. Therefore, the opening and closing operation of the top cover 42 can be effected by the motor 21.

Figure 51:
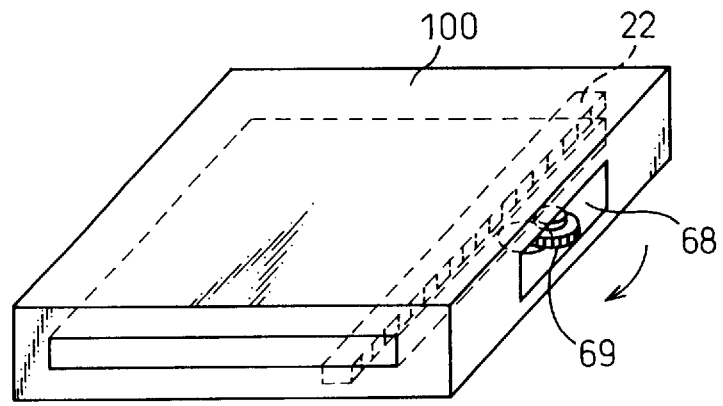
FIG. 51 is a perspective view of an example of the image reading apparatus having the access opening and the manually operable member.

In addition, if the motor 21 becomes defective, it is no longer possible to move the hopper table 1. In particular, it is difficult to pull out the hopper table 1 from its closed position. Therefore, an access opening 68 is formed in the side wall of the casing and a manually operable toothed disk member 69 that is engaged with one of the gears of the loading mechanism 20 is arranged in the casing 100, as shown in FIG. 51. The hopper table 1 can be thus moved front and rear by turning the toothed disk member 69 to draw the hopper table 1 from the closed position as required.

In incorporating the hopper table and the loading mechanism in the device body, cumbersome operation is required for positioning the gears of the loading mechanism, hopper table, rack of the document pusher plate, second racks and pinion shaft.

In addition, the hopper table 1 and document pusher member 18 should be arranged in phase with the partly toothed gear G8 in the loading mechanism 20b, and the assembly work for these members is sometimes cumbersome. According to the embodiment, means to facilitate the assembly work is incorporated.

Figure 52:
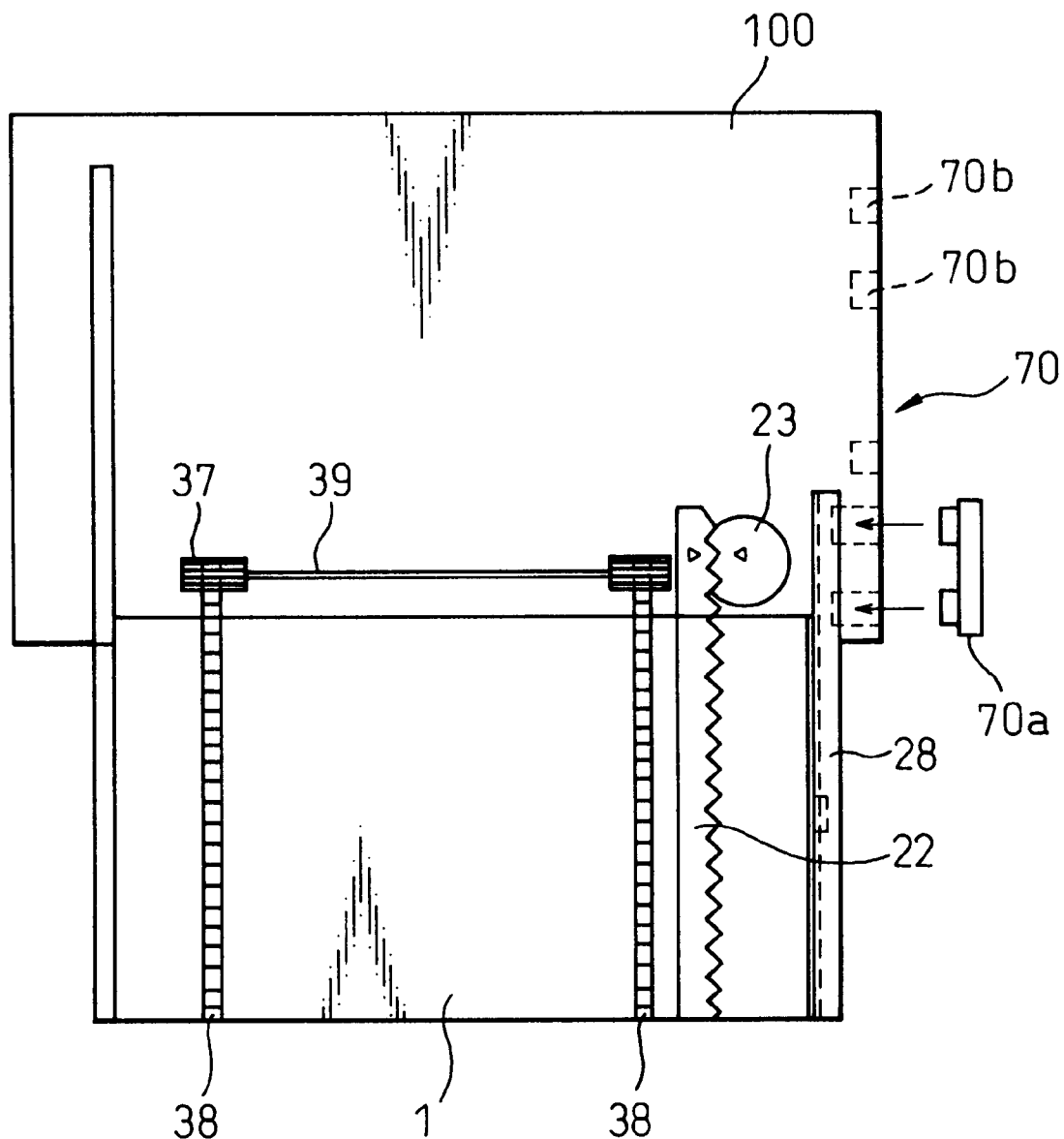
FIG. 52 is a plan view of the image reading apparatus having the removable front guide member for illustrating the assembling operation of the hopper table and the actuating mechanism.

In FIG. 52, which illustrates how to assemble these members in the casing 100, the guide rail 28 is pivotally attached to the hopper table 1 and the guide rail 28 is guided by a guide 70 arranged in the casing 100. The guide 70 comprises a front guide member 70a and inner guide members 70b. The inner guide members 70b are fixedly arranged in the casing 100, but the front guide member 70a is removable. The front guide member 70a is arranged at the frontmost position of the casing 100 and can be attached to the side wall of the casing 100 after the hopper table 1 and the other members are assembled in the casing 100.

Figure 61:
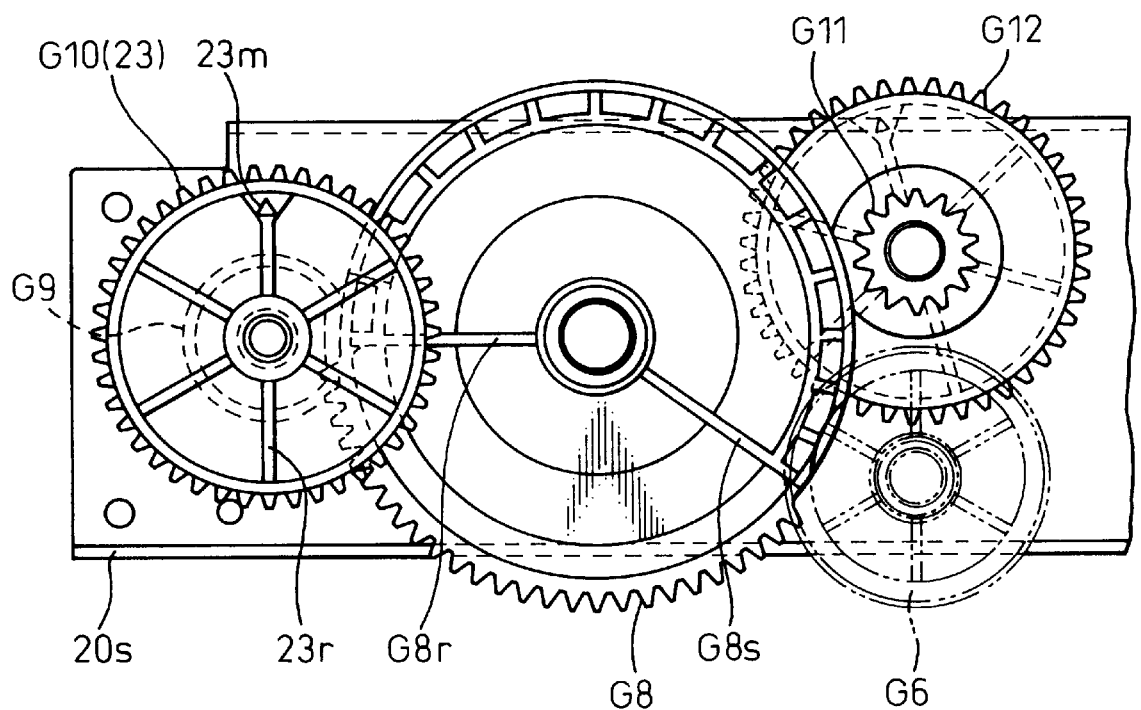
FIG. 61 is an enlarged plan view of several gears of the loading mechanism of FIG. 60.
Figure 62:
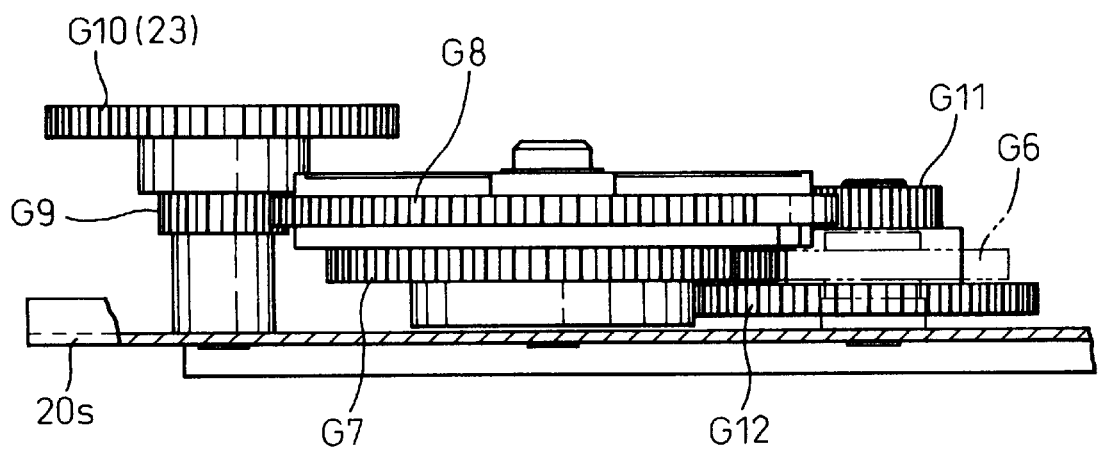
FIG. 62 is a side of the gears of FIG. 60.
Figure 63:
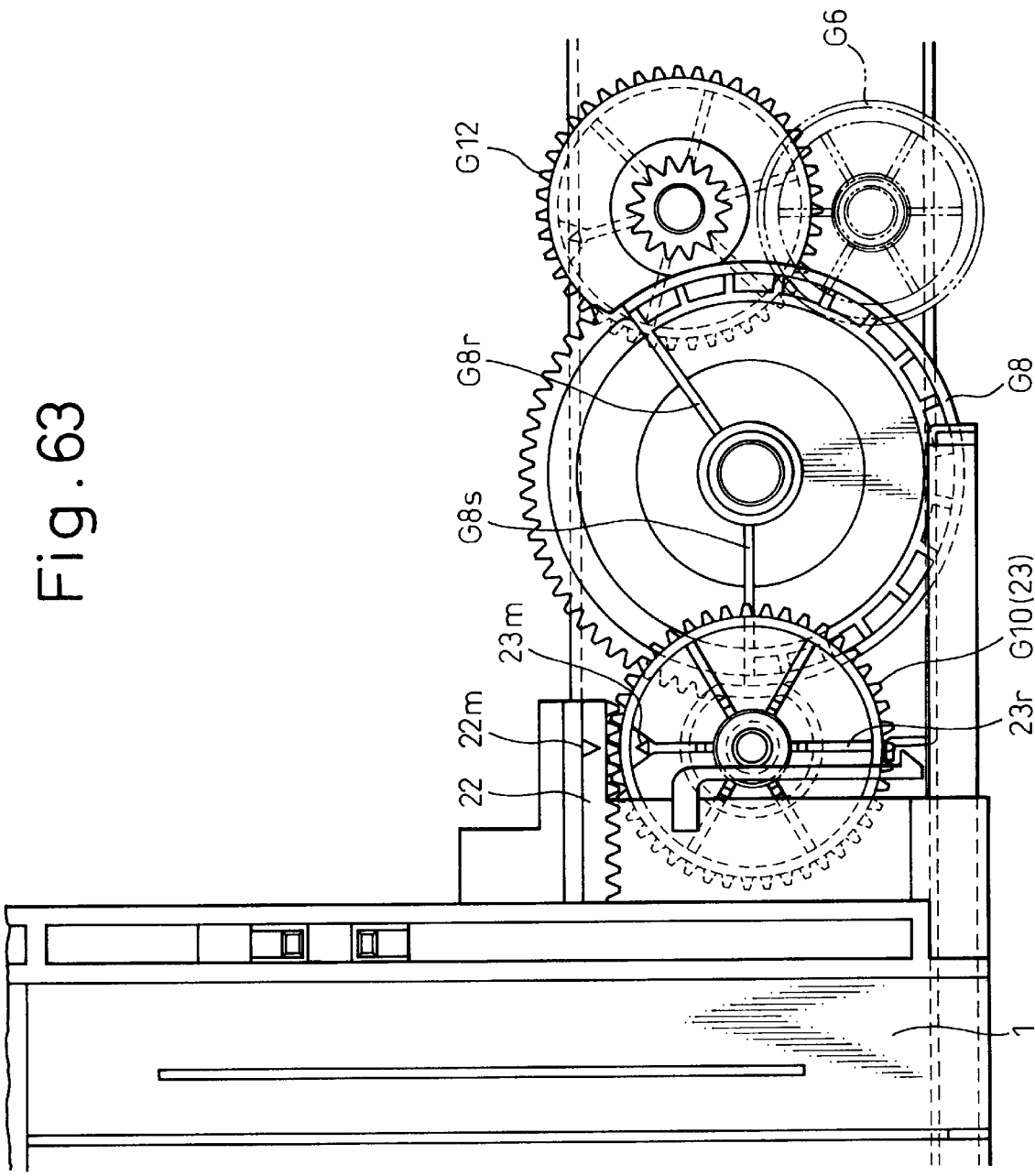
FIG. 63 is a plan view of the gears of FIG. 61 when the hopper table is assembled into the casing of the image reading apparatus.

FIGS. 59 to 63 show a further feature of the gears of the loading mechanism 20. As clearly shown in FIGS. 61 and 63, the gear G10 (23) has a linear rib 23r diametrically extending on the upper surface thereof and a positioning mark 23m at one end of the rib 23r. The partially toothed gear G8 has ribs G8r and G8m extending at an obtuse angle on the upper surface thereof. The rack 22 on the hopper table 1 has a positioning mark 22m. When the hopper table 1 is in the home position, the gears G8 and G10 (23) are positioned, as shown in FIG. 61. When the hopper table 1 is in the front end position, the gears G8 and G10 (23) are positioned, as shown in FIG. 63. The rack 18b of the L-shaped pusher member 18 is in the fully retracted position in FIG. 60, and the gear G13 (24) engages with the rack 18b, as shown.

The assembling steps are now described with reference to FIGS. 52, and 59–63.

The loading mechanism 20b is first incorporated into the casing 100. The loading mechanism 20b is set in the casing 100 such that the rack 18b of the document pusher member 18 is engaged with the gear G13. A frame member of the casing 100, on which the hopper table 1 is to be positioned, is then attached. The hopper table 100 is then set from above the casing 100. The leading end of the guide rail 28 is positioned at the position of the removed front guide member 70a, as shown in FIG. 52. Positioning is accomplished between the drive gear 23 and the rack 22 of the hopper table 1, by setting the positioning marks 23m and 22m of the drive gear 23 and the rack 22 at the mutually facing positions, as shown in FIG. 63, to thereby bring the drive gear 23 and the rack 22 in phase. Note that the rib G8s of the partially toothed gear H8 points the axis of the gear 23. The front guide member 70a is then attached to the side wall of the casing 100, so that the guide rail 28 can be guided by the guide 70. The above mentioned constitution makes it easy to assemble the hopper table 1 and the loading mechanism 20b in the casing 100.

Figure 53:
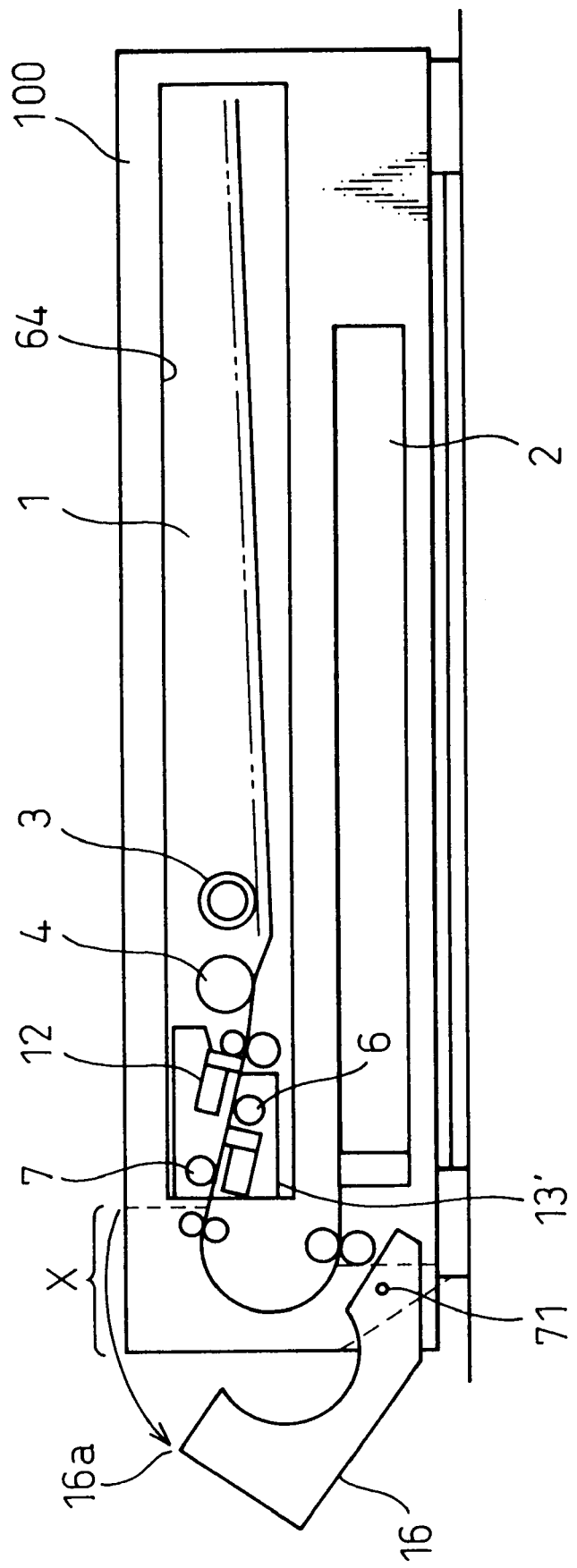
FIG. 53 is a cross-sectional view of an example of the image reading apparatus having the side cover.

In addition, there is a following problem regarding the side cover 16 of the casing 100. In FIG. 53, the side cover 16 is pivotable about a pivot 71, and the pivot 71 is positioned on the left side of the top edge 16a of the side cover 16 in the drawing. The locus of top edge 16a while the cover 16 is opened or closed is indicated by the arrow. As will be obvious from the drawing, the locus includes a region X where the top edge 16a deviates outwardly from the top surface of the casing 100. When a personal computer or the like equipment is placed on the casing 100, the side cover 16 interferes with the personal computer and cannot be opened or closed.

Figure 54:
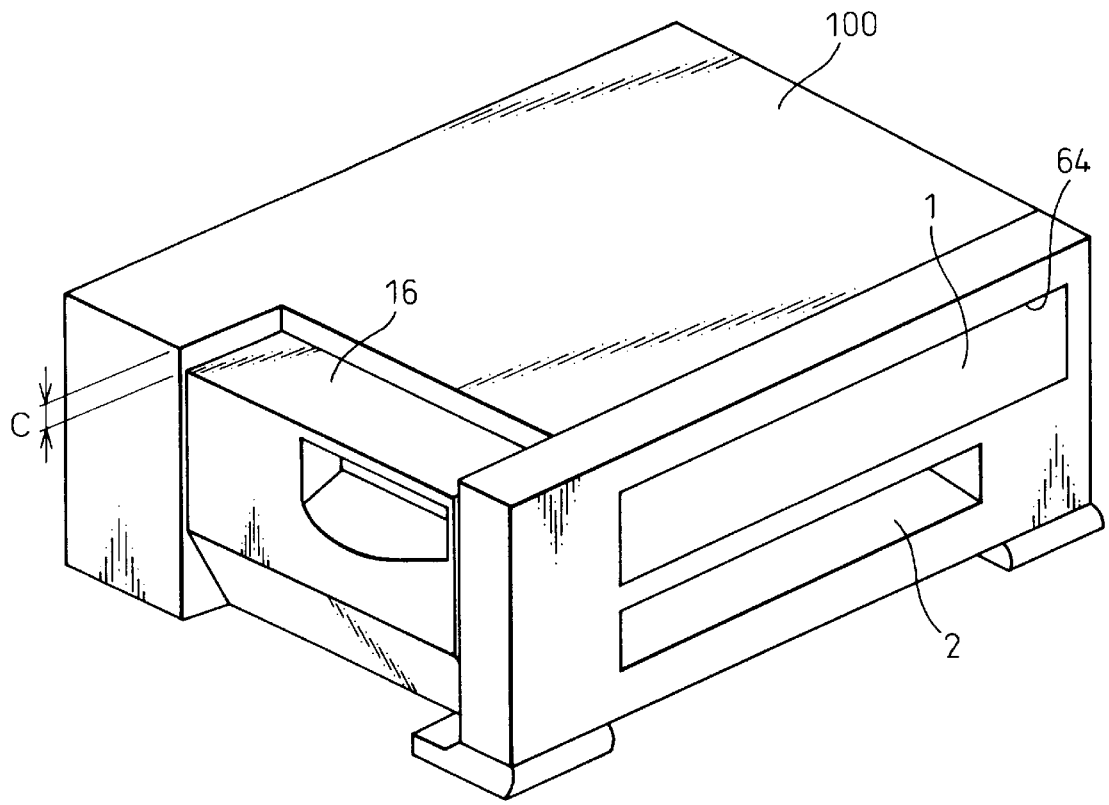
FIG. 54 is a perspective view of an example of the image reading apparatus having the modified side cover.
Figure 55:
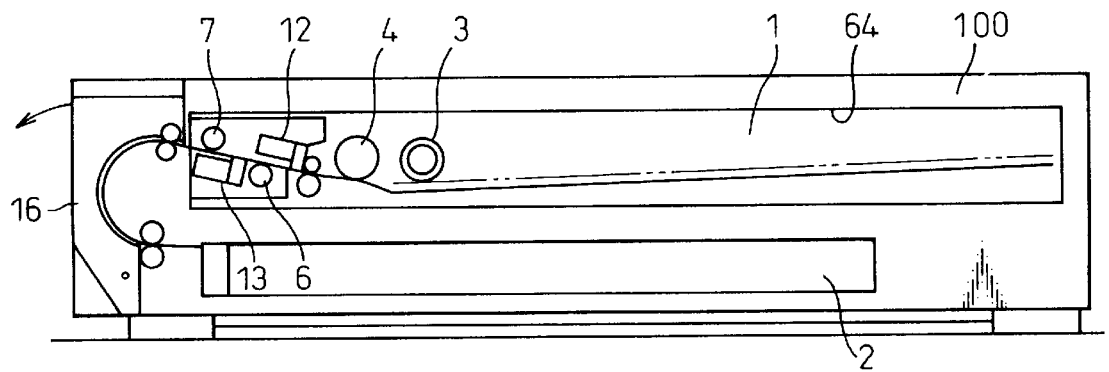
FIG. 55 is a cross-sectional view of apparatus of FIG. 54.
Figure 56:
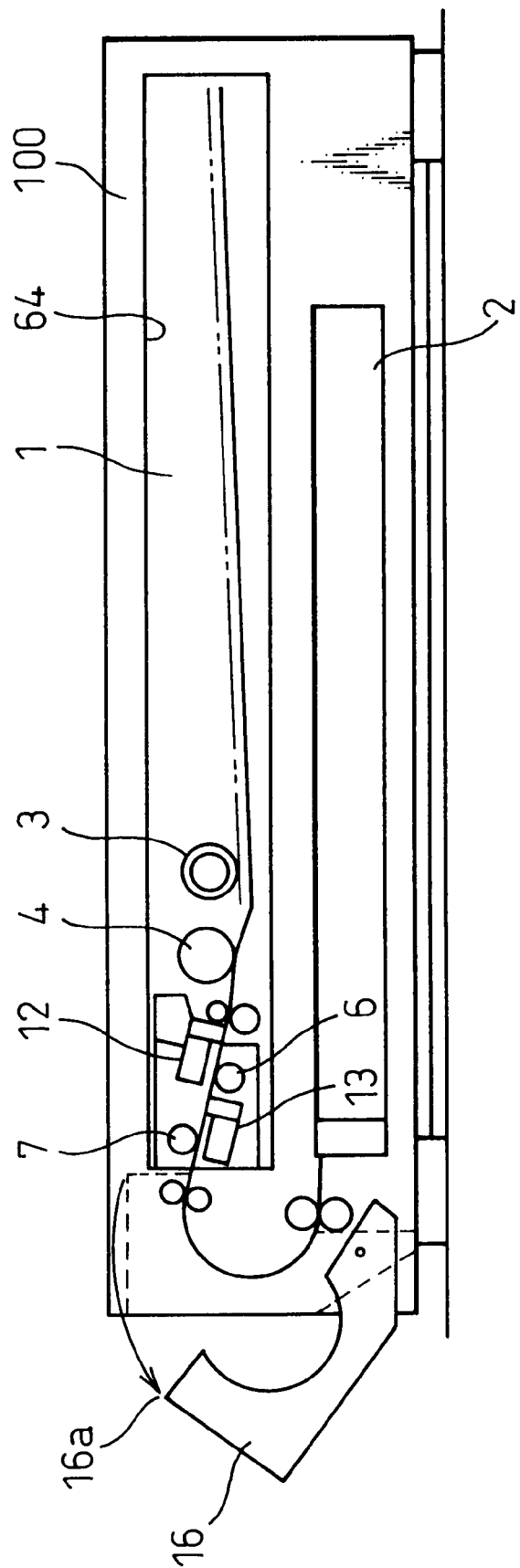
FIG. 56 is a cross-sectional view of apparatus of FIG. 54 when the side cover is opened.
Figure 57:
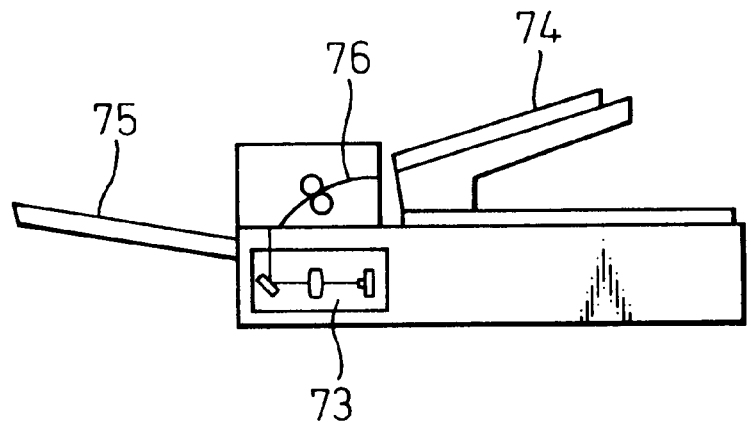
FIG. 57 is a side view of the ADF type image reading apparatus.
Figure 58:
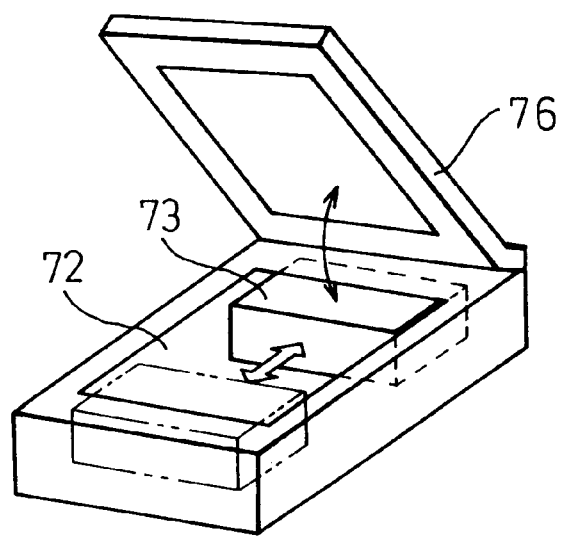
FIG. 58 is a perspective view of the flat bed type image reading apparatus.
Figure 59:
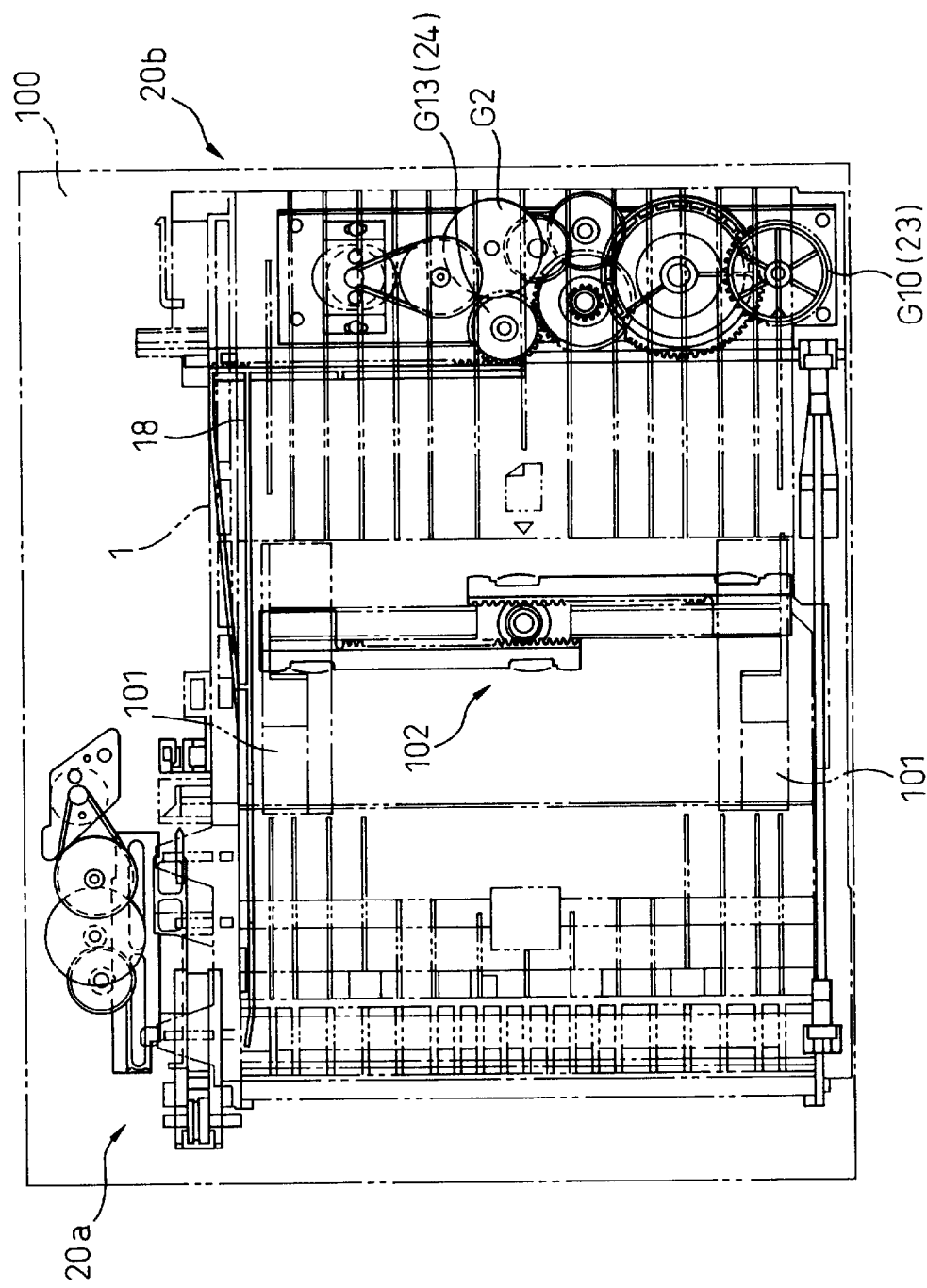
FIG. 59 is a plan view of the image reading apparatus of the present invention in the plane of the loading mechanism before the hopper table is assembled into the casing of the image reading apparatus.
Figure 60:
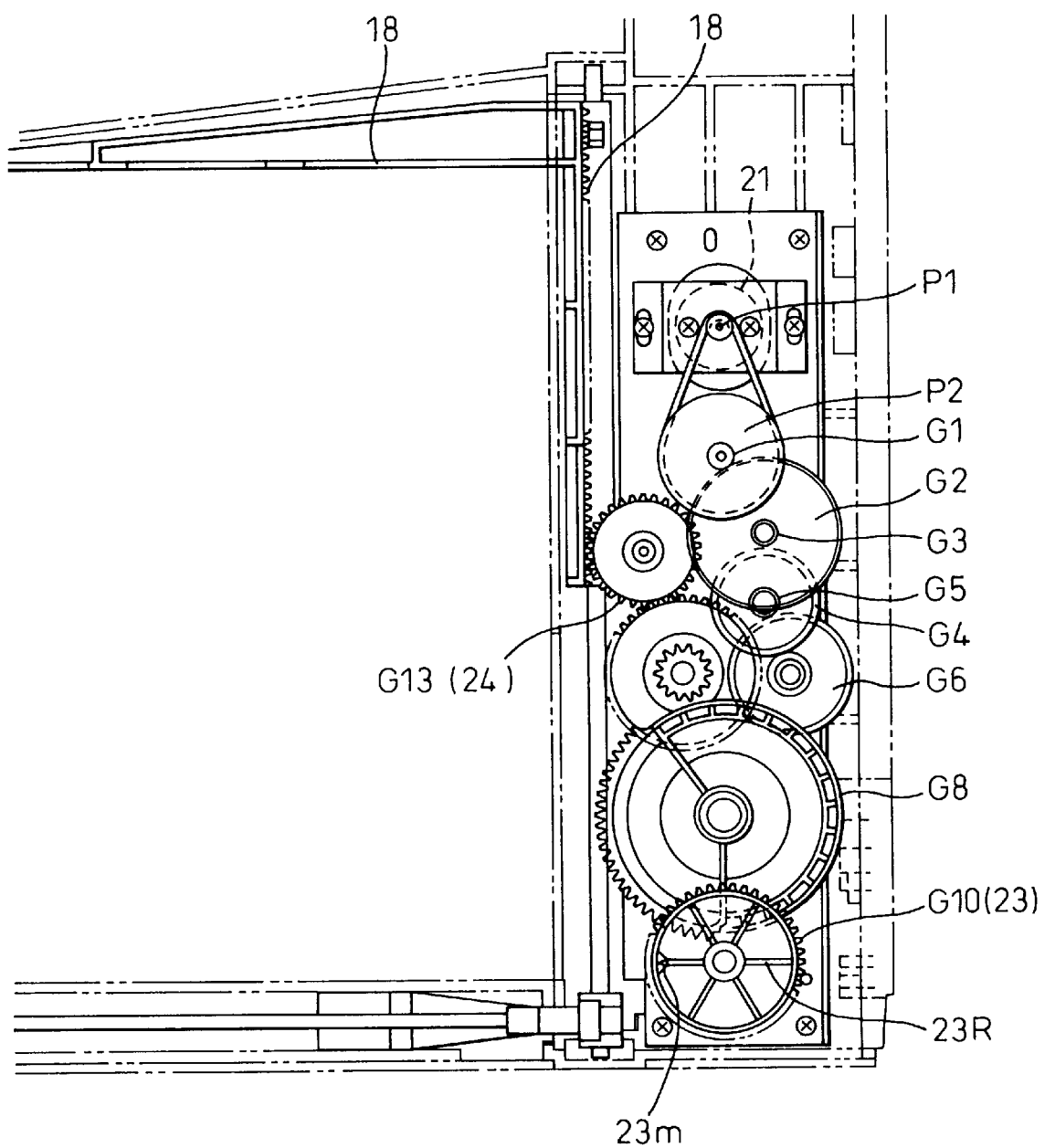
FIG. 60 is an enlarged plan view of a portion of the apparatus of FIG. 59.

Means for solving this problem is shown in FIG. 54 which is a perspective view of the image reading apparatus. In FIG. 54, the height of the side cover 16 is selected to be lower than the height of the casing by the distance "c", so that the side cover 16 that is opened or closed will not interfered with any equipment placed on the apparatus. FIG. 55 is a front cross-sectional view of the apparatus of FIG. 54. The height of the side cover 16 is lower than the height of the casing 100 by one step, as shown in FIG. 55. FIG. 56 shows the locus of the top edge 16a of the side cover 16 of FIGS. 54 and 55 while it is opened and closed. As shown in FIG. 56, since the height of the side cover 16 is lowered, the side cover 16 does not interfere with any equipment that is placed on the apparatus, and the operation for opening and closing the side cover 16 is not impaired. The height of the side cover should be suitably selected depending upon the position of the pivot 71 of the side cover 16 and the top edge 16a of the side cover 16.

I claim:

1. A data processing apparatus comprising
    a casing (100) having a first cavity (64) and a second cavity (2) arranged in a vertically spaced relationship;
    a hopper table (1) drawably arranged in the first cavity (64), the hopper table having a hopper (1a) for accommodating sheets (15) stacked thereon and data processing means (12, 13);
    the second cavity being a stacker (2) and having a discharge member (18) therein for discharging the sheet from the stacker;
    sheet conveying means (3, 4, 5, 6, 7, 8, 9) for conveying sheets from the hopper (1a) through the data processing means (12, 13) to the stacker (2), along a predetermined conveying path (10);
    an actuator (21) for moving the hopper table (1) and the discharge member (18); and
    movement transferring means (20b) for transferring the actuating force of the actuator (21) to the hopper table (1) and the discharge member (18).

2. A data processing apparatus according to claim 1, wherein said movement transferring means (20b) comprises means for changing the transfer of the actuating force of the actuator to the hopper table and to the discharge member.

3. A data processing apparatus according to claim 2, wherein said actuator comprises a motor (21), and said movement transferring means (20b) comprises a partially toothed gear (G8) having an outer circumference and teeth only on a portion of the outer circumference, a first gear (G9) for engagement with the partially toothed gear (G8) for moving the hopper table (1), and a second gear (G11) arranged at a different position from the first gear for engagement with the partially toothed gear (G8) for moving the discharge member (18), the partially toothed gear and the first and second gears being constructed so that when one of the first and second gears is engaged with the teeth of the partially toothed gear, the other of the first and second gears is not engaged with the teeth of the partially toothed gear.

4. A data processing apparatus according to claim 3, wherein the partially toothed gear (G8) and the first and second gears (G9, G11) are constructed so that the teeth of the partially toothed gear (G8) can possess a first position in which the teeth of the partially toothed gear (G8) is not engaged with the first and second gears (G9, G11), a second position in which the teeth of the partially toothed gear (G8) is engaged only with the first gear (G9), and a third position in which the teeth of the partially toothed gear (G8) is engaged only with the second gear (G11).

5. A data processing apparatus according to claim 4, wherein said movement transferring means (20b) includes a first sensor (HPS) for detecting whether the partially toothed gear (G8) is at the first position or not.

6. A data processing apparatus according to claim 4, wherein said movement transferring means (20b) includes a first sensor (HPS) for detecting whether the partially toothed gear is at the first position or not, and a second sensor (HFS) for detecting whether the partially toothed gear (G8) is at a position corresponding to a front end of one of the hopper table (1) and the discharge member (18) or not.

7. A data processing apparatus according to claim 3, wherein the hopper table (1) has a rack (22) for engagement directly or indirectly with the first gear (G9) for moving the hopper table (1), and the discharge member (18) has a rack (18b) for engagement directly or indirectly with the second gear (G11) for moving the discharge member (18).

8. A data processing apparatus according to claim 7, wherein the forward and reverse movement of the hopper table (1) and the forward and reverse movement of the discharge member (18) are changed by changing the moving direction of the actuator (21).

9. A data processing apparatus according to claim 7, wherein the rack (22) of the hopper table (1) is operatively connected to the partially toothed gear (G8) via at least one first intermediate gear (G9, G10 (23)) including the first gear, and the rack (18b) of the discharge member (18) is operatively connected to the partially toothed gear (G8) via at least one second intermediate gear (G11, G12, G13 (24)) including the second gear, the number or teeth of the first intermediate gear being different from that of the second intermediate gear.

10. A data processing apparatus according to claim 7, wherein the stacker (2) has a bottom having at least one groove (2c), and the discharge (18) member has a bottom having at least one protrusion (18c) in correspondence with the at least one groove.

11. A data processing apparatus according to claim 7, wherein the hopper table (1) has a pair of parallel racks (38) parallel to said rack (22) driven by the partially toothed gear (G8), a freely rotatable pinion shaft (39) being provided in the casing (100) and having pinions (37) engaged with the parallel racks (38).

12. A data processing apparatus according to claim 11, further comprising means (40) for urging the pinion shaft (39) to bias the pinions (37) toward the parallel racks (38).

13. A data processing apparatus according to claim 12, wherein each of the racks (38) is formed as a double-row rack comprising a first row of teeth (38a) and a second row of teeth (38b), and each of the pinions (37) is formed as a double-toothed pinion having two sets of teeth (37a, 37b) corresponding to the first and second rows of the teeth.

14. A data processing apparatus according to claim 7, wherein said rack (22) driven by the partially toothed gear (G8) comprises a first portion (22a) having a first width and a second portion having a second width.

15. A data processing apparatus according to claim 14, wherein said first portion (22a) remains in the casing (100) when the hopper table (1) is in the open position, the first width being greater than the second width.

16. A data processing apparatus according to claim 3, wherein the partially toothed gear (G8) has a first cam (C8), the first and second gears (G9, G11) have respective second and third cams (C9, C11) engagable with the first cam of the partially toothed gear depending upon the position of the partially toothed gear, the second cam of the first gear being engagable with the first cam of the partially toothed gear to prohibit the rotation of the first gear when the teeth of the partially toothed gear are not engaged with the first gear, the third cam of the second gear being engagable with the first cam of the partially toothed gear to prohibit the rotation of the second gear when the teeth of the partially toothed gear are not engaged with the second gear.

17. A data processing apparatus according to claim 1 wherein the data processing means (12, 13) comprises one of a reading head for reading information on the sheet and a printing head for printing data onto the sheet.

18. A data processing apparatus according to claim 1, further comprising a pressure sensor (PSS) provided on the hopper table for detecting whether an abnormal pressure is exerted on the hopper table or not, said actuator being stopped or driven in reverse when said pressure sensor detects an abnormal pressure.

19. A data processing apparatus according to claim 1, further comprising detecting means for detecting a current flowing through said actuator, said actuator being stopped or driven in reverse when said detecting means detects a current higher than a predetermined value.

20. A data processing apparatus according to claim 1, wherein the hopper table (1) includes guide rails (27, 28) attached to the sides thereof, one of the guide rails (28) being pivotally attached to the hopper table (1) by a pivot (30).

21. A data processing apparatus according to claim 20, further comprising a stopper (32, 34, 36) for restricting the amount of the pivotal movement of the pivotally attached guide rail (28).

22. A data processing apparatus according to claim 1, wherein said hopper table (1) has a top cover (42) for covering at least the data processing means (12).

23. A data processing apparatus according to claim 22, wherein said top cover (42) is pivotally attached to the hopper table (1) and carries said data processing means (12).

24. A data processing apparatus according to claim 23, wherein said top cover (42) has an upper surface with the tapered portion (65) to facilitate the insertion of the hopper table (1) into the first cavity (64) when the hopper table (1) is closed.

25. A data processing apparatus according to claim 24, wherein said casing (100) has urging means (66) in the first cavity (64) for biasing the top cover (42) downward.

26. A data processing apparatus according to claim 25, wherein a portion (42a) of the upper surface of the top cover (42) contacting the urging means (66) is higher than the other (42b) portion of the upper surface of the top cover.

27. A data processing apparatus according to claim 25, wherein said portion (42a) of the upper surface of the top cover (42) contacting the urging means is on the front side of the top cover, and the other portion (42b) of the upper surface of the top cover (42) that is lower than said first portion is on the inner side of the top cover.

28. A data processing apparatus according to claim 1, wherein said movement transferring means (20b) includes gears and said casing (100) has an access opening (68) at the side wall thereof and a manually operable member (69) arranged in the access opening, the manually operable member (69) being engaged with on of the gears in the movement transferring means (20b), whereby the hopper table (1) can be moved front and rear by operating the manually operable member (69).

29. A data processing apparatus according to claim 28, wherein the manually operable member (69) comprises a gear.

30. A data processing apparatus according to claim 1, wherein the hopper table (1) includes guide rails (27, 28) attached to the sides thereof, and the casing (100) includes guide members (70a, 70b) to guide the guide rails with the hopper table (1) in the casing (100), at least one of the guide members (70a) being removably attached to the casing (100).

31. A data processing apparatus according to claim 30, wherein said at least one of the guide members (70a) can be attached to the casing (100) after the hopper table (1) is arranged in the casing (100).

32. A data processing apparatus according to claim 31, wherein the hopper table (1) has a rack (22) for engagement with a gear (23) belonging to the movement transferring means (20b), said at least one (70a) of the guide members being attached to the casing (100) after the hopper table (1) is arranged in the casing (100) and the rack (22) is positioned relative to the gear (23) belonging to the movement transferring means.

33. A data processing apparatus according to claim 1, wherein said hopper table (1) has a top cover (42) for covering at least the data processing means (12), the top cover (42) being pivotally attached to the hopper table (1) about a pivot (43) arranged on one side of the top cover (42) remote from the hopper (1a), said data processing means (12) being pivotally attached to the top cover (42) about a fulcrum (46) arranged on one side of the top cover (42) near the hopper (1a).

34. A data processing apparatus according to claim 33, wherein said data processing means (12) is biased by an urging means (47) toward a sheet to be processed.

35. A data processing apparatus according to claim 33, wherein said top cover (42) has a fulcrum (46) having a triangular cross section, said data processing means (12) has a pair of ribs (52) arranged to pinch the fulcrum.

36. A data processing apparatus according to claim 33, wherein said data processing means (12) has a sheet detecting sensor (44) for detecting the passage of a sheet therethrough.

37. A data processing apparatus according to claim 1, wherein said casing (100) has an upper surface and a side cover (16) pivotally attached to the casing (100) about a pivot (71) arranged at a lower portion of the casing (100), the side cover (16) having an upper edge (16a) arranged so that the upper edge (16a) is lower than the upper surface of the casing (100).

38. A data processing apparatus comprising:
a casing (100) having a first cavity (64) and a second cavity (2) arranged in a vertically spaced relationship;
a hopper table (1) drawably arranged in the first cavity (64), the hopper table (1) having a hopper (1a) for accommodating sheets stacked thereon and data processing means (12, 13);
the second cavity being a stacker (2);
sheet conveying means (3, 4, 5, 6, 7, 8, 9) for conveying sheets from the hopper (1a) through the data processing means (12, 13) to the stacker (2) along a predetermined conveying path (10);
an actuator (21) for moving the hopper table (1);
movement transferring means (20b) for transferring the actuating force of the actuator to the hopper table, the movement transferring means including first and second rotatable members (G8, G9); and
movement prohibiting means comprising a first cam (C8) provided on the first rotatable member (G8) and a second cam (C9) provided on the second rotatable member (G9) so that the second cam is engagable with the first cam to prohibit the rotation of the second rotatable member when the hopper table is in its most opened position.

39. A data processing apparatus according to claim 38, wherein said first rotatable member comprises a partially toothed gear (G8) having an outer circumference and teeth only on a portion of the outer circumference, and said second rotatable member comprises a gear (G9) engeable with the partially toothed gear (G8).

40. A data processing apparatus according to claim 39, wherein the partially toothed gear (G8) and the gear (G9) engaged therewith are constructed so that the teeth of the partially toothed gear (G8) can possess a first position in which the teeth of the partially toothed gear (G8) are not engaged with the gear (G9) and the first cam (C8) is engaged with the second cam (C9), and a second position in which the teeth of the partially toothed gear (G8) are engaged with the first gear (G9).

41. A data processing apparatus comprising:
a casing (100) having a first cavity (64) and a second cavity (2) arranged in a vertically spaced relationship;
a hopper table (1) drawably arranged in the first cavity (64), the hopper table having a hopper (1a) for accommodating sheets stacked thereon and data processing means (12, 13);
the second cavity being a stacker (2);
sheet conveying means (3, 4, 5, 6, 7, 8, 9) for conveying sheets from the hopper (1a) through the data processing means (12, 13) to the stacker (2) along a predetermined conveying path (10);
an actuator (21) for moving the hopper table; and
a pressure sensor (PSS) provided on the hopper table for detecting whether an abnormal pressure is exerted on the hopper table or not, said actuator (21) being stopped or driven in reverse when said pressure sensor detects an abnormal pressure.

42. A data processing apparatus comprising:
a casing (100) having a first cavity (64) and a second cavity (2) arranged in a vertically spaced relationship;
a hopper table (1) drawably arranged in the first cavity (64), the hopper table having a hopper (1a) for accommodating sheets stacked thereon and data processing means (12, 13);
the second cavity being a stacker (2);
sheet conveying means (3, 4, 5, 6, 7, 8, 9) for conveying sheets from the hopper (1a) through the data processing means (12, 13) to the stacker (2) along a predetermined conveying path (10);
an actuator (21) for moving the hopper table; and
detecting means for detecting a current flowing through said actuator, said actuator (21) being stopped or driven in reverse when said detecting means detects a current higher than a predetermined value.

43. A data processing apparatus comprising:
a casing (100) having a first cavity (64) and a second cavity (2) arranged in a vertically spaced relationship;
a hopper table (1) drawably arranged in the first cavity (64), the hopper table having a hopper (1a) for accommodating sheets stacked thereon and data processing means (12, 13);

the second cavity being a stacker (2);

sheet conveying means (3, 4, 5, 6, 7, 8, 9) for conveying sheets from the hopper (1a) through the data processing means (12, 13) to the stacker (2) along a predetermined conveying path (10);

an actuator (21) for moving the hopper table; and guide rails (27, 28) attached to the sides of the hopper table (1), one of the guide rails (28) being pivotally attached to the hopper table (1) by a pivot (30).

44. A data processing apparatus according to claim 43, further comprising a stopper (32, 34, 36) for restricting the amount of the pivotal movement of the pivotally attached guide rails (28).

45. A data processing apparatus according to claim 43, further comprising a pair of parallel racks (38) provided on the hopper table (1);

a freely rotatable pinion shaft (39) provided in the casing (100) and having pinions (37) engaged with the parallel racks (38), and means (40) for urging the pinion shaft (39) to bias the pinions (37) toward the parallel racks (38).

46. A data processing apparatus comprising:

a casing (100) having a first cavity (64) and a second cavity (2) arranged in a vertically spaced relationship;

a hopper table (1) drawably arranged in the first cavity (64), the hopper table having a hopper (1a) for accommodating sheets stacked thereon and data processing means (12, 13);

the second cavity being a stacker (2);

sheet conveying means (3, 4, 5, 6, 7, 8, 9) for conveying sheets from the hopper (1a) through the data processing means (12, 13) to the stacker (2) along a predetermined conveying path (10);

an actuator (21) for moving the hopper table; and a pair of parallel racks (38) provided on lower surface of the hopper table;

a freely rotatable pinion shaft (39) provided in the casing (100) and having pinions (37) engaged with the parallel racks; and each of the racks (38) being formed as a double-row rack comprising a first row of teeth (38a) and a second row of teeth (38b), each of the pinions (37) being formed as a double-toothed pinion having two sets of teeth (37a, 37b) corresponding to the first and second rows of the teeth.

47. A data processing apparatus comprising:

a casing (100) having a first cavity (64) and a second cavity (2) arranged in a vertically spaced relationship;

a hopper table (1) drawably arranged in the first cavity (64), the hopper table having a hopper (1a) for accommodating sheets stacked thereon and data processing means (12, 13);

the second cavity being a stacker (2);

sheet conveying means (3, 4, 5, 6, 7, 8, 9) for conveying sheets from the hopper (1a) through the data processing means (12, 13) to the stacker (2) along a predetermined conveying path (10);

an actuator (21) for moving the hopper table (2);

movement transferring means (20b) for transferring the actuating force of the actuator (21) to the hopper table (1), the movement transferring means including at least a gear (23) and rack (22) engaged with the gear; and said rack (22) comprising a toothed side surface with a first portion (22a) having a first width and a second portion having a second width different from said first width.

48. A data processing apparatus according to claim 47, wherein said first portion (22a) remains in the casing (100) when the hopper table (1) is in the open position, the first width being greater than the second width.

49. A data processing apparatus comprising:

a casing (100) having a first cavity (64) and a second cavity (2) arranged in a vertically spaced relationship;

a hopper table (1) drawably arranged in the first cavity (64), the hopper table having a hopper (1a) for accommodating sheets stacked thereon and data processing means (12, 13);

the second cavity being a stacker (2);

sheet conveying means (3, 4, 5, 6, 7, 8, 9) for conveying sheets from the hopper (1a) through the data processing means (12, 13) to the stacker (2) along a predetermined conveying path (10);

an actuator (21) for moving the hopper table (1);

a top cover (42) pivotally attached to said hopper table (1) about a pivot axis extending parallel to an insertion direction of said hopper table, for covering at least the data processing means (12); and said top cover (42) having an upper surface with a tapered portion (65) to facilitate the insertion of the hopper table (1) into the cavity (64) when the hopper table (1) is closed.

50. A data processing apparatus comprising:

a casing (100) having a first cavity (64) and a second cavity (2) arranged in a vertically spaced relationship;

a hopper table (1) drawably arranged in the first cavity (64), the hopper table having a hopper (1a) for accommodating sheets stacked thereon and data processing means (12, 13);

the second cavity being a stacker (2);

sheet conveying means (3, 4, 5, 6, 7, 8, 9) for conveying sheets from the hopper (1a) through the data processing means (12, 13) to the stacker (2) along a predetermined conveying path (10);

an actuator (21) for moving the hopper table (1);

a top cover (42) arranged on said hopper table (1) for covering at least the data processing means (12); and urging means (66) for biasing the top cover (42) downward.

51. A data processing apparatus according to claim 50, wherein a portion (42a) of the upper surface of the top cover (42) contacting the urging means (66) is higher than the other portion of the upper surface of the top cover.

52. A data processing apparatus according to claim 51, wherein said portion (42a) of the upper surface of the top cover (42) contacting the urging means (66) is on the front side of the top cover, and the other portion of the upper surface of the top cover that is lower than said portion is on the inner side of the top cover.

53. A data processing apparatus comprising:

a casing (100) having a first cavity (64) and a second cavity (2) arranged in a vertically spaced relationship;

a hopper table (1) drawably arranged in the first cavity (64), the hopper table having a hopper (1a) for accommodating sheets stacked thereon and data processing means (12, 13);

the second cavity being a stacker (2);

sheet conveying means (3, 4, 5, 6, 7, 8, 9) for conveying sheets from the hopper (1*a*) through the data processing means (12, 13) to the stacker (2) along a predetermined conveying path (10);

an actuator (21) for moving the hopper table;

a movement transferring means (20*b*);

an access opening (68) at the side wall of the casing; and a manually operable member (69) arranged in the access opening, the manually operable member (69) being engaged with a gear in the movement transferring means (20*b*), whereby the hopper table (1) can be moved front and rear by operating the manually operable member (69).

54. A data processing apparatus according to claim 53, wherein manually operable member (69) comprises a gear.

55. A data processing apparatus comprising:

a casing (100) having a first cavity (64) and a second cavity (2) arranged in a vertically spaced relationship;

a hopper table (1) drawably arranged in the first cavity (64), the hopper table having a hopper (1*a*) for accommodating sheets stacked thereon and data processing means (12, 13);

the second cavity being a stacker (2);

sheet conveying means (3, 4, 5, 6, 7, 8, 9) for conveying sheets from the hopper (1*a*) through the data processing means (12, 13) to the stacker (2) along a predetermined conveying path (10);

an actuator (21) for moving the hopper table;

guide rails (27, 28) attached to the sides of the hopper table; and guide members (70*a*, 70*b*) arranged to guide the guide rails (27, 28) with the hopper table (1) in the casing (100), at least one of the guide members (70*a*) being removably attached to the casing, said at least one of the guide members being removable when the hopper table is inserted in said casing.

56. A data processing apparatus according to claim 55, wherein said at least one (70*b*) of the guide members can be attached to the casing (100) after the hopper table (1) is arranged in the casing (100).

57. A data processing apparatus according to claim 56, further comprising a movement transferring means (20*b*), which includes a gear (23), for transferring the actuating force of the actuator (21) to the hopper table (1), and wherein the hopper table (1) has a rack (22) for engagement with the gear (23) belonging to the movement transferring means (20*b*), said at least one of the guide members (70*a*) being attached to the casing (100) after the hopper table (1) is arranged in the casing (100) and the rack (22) is positioned relative to the gear (23) belonging to the movement transferring means (20*b*).

58. A data processing apparatus comprising:

a casing (100) having a first cavity (64) and a second cavity (2) arranged in a vertically spaced relationship;

a hopper table (1) drawably arranged in the first cavity (64), the hopper table having a hopper (1*a*) for accommodating sheets stacked thereon and data processing means (12, 13);

the second cavity being a stacker (2);

sheet conveying means (3, 4, 5, 6, 7, 8, 9) for conveying sheets from the hopper (1*a*) through the data processing means (12, 13) to the stacker (2) along a predetermined conveying path (10);

an actuator (21) for moving the hopper table;

a top cover (42) attached to the hopper table (1) for covering at least the data processing means (12), the top cover (42) being pivotally attached to the hopper table (1) about a pivot (43) arranged on one side of the top cover remote from the hopper (1*a*), said data processing means (12) being pivotally attached to the top cover (42) about a fulcrum (46) arranged on one side of the top cover near the hopper (1*a*).

59. A data processing apparatus according to claim 58, wherein said data processing means (12) is biased by an urging means (47) toward a sheet to be processed.

60. A data processing apparatus according to claim 58, wherein said top cover (42) has a fulcrum (46) having a triangular cross section, said data processing means (12) has a pair of ribs (52) arranged to pinch the fulcrum.

61. A data processing apparatus according to claim 58, wherein said data processing means (12) has a sheet detecting sensor (45) for detecting the passage of a sheet therethrough.

\* \* \* \* \*